US012712215B2

(12) United States Patent
Beaston et al.

(10) Patent No.: US 12,712,215 B2
(45) **Date of Patent: *Aug. 18, 2026**

(54) BATTERY MODULES HAVING AN INTEGRATED BATTERY MANAGEMENT SYSTEM WITH SWELLING/PRESSURE DETECTORS, AND APPLICATIONS THEREOF

(71) Applicant: VLTRU Systems, LLC, Vestal, NY (US)

(72) Inventors: Virgil L. Beaston, Vestal, NY (US); David Middleton, Skaneateles, NY (US); Michael W. Allen, Phelps, NY (US); Howard Scott Ryan, Skaneateles, NY (US)

(73) Assignee: VLTRU Technologies, Inc., Tualatin, OR (US)

( * ) Notice: Subject to any disclaimer, the term of this patent is extended or adjusted under 35 U.S.C. 154(b) by 706 days.

This patent is subject to a terminal disclaimer.

(21) Appl. No.: 17/966,500

(22) Filed: Oct. 14, 2022

(65) Prior Publication Data

US 2023/0060396 A1 Mar. 2, 2023

Related U.S. Application Data

(63) Continuation-in-part of application No. 17/691,948, filed on Mar. 10, 2022, which is a continuation of (Continued)

(51) Int. Cl.

*H01M 10/50* (2006.01)
*H01M 10/613* (2014.01)
*H01M 50/24* (2021.01)

(52) U.S. Cl.

CPC ......... *H01M 10/613* (2015.04); *H01M 50/24* (2021.01); *H01M 2220/10* (2013.01)

(58) Field of Classification Search

CPC ............. H01M 10/613; H01M 10/615; H01M 10/617; H01M 10/62; H01M 50/24; H01M 50/236; H01M 50/233; H01M 2220/10

See application file for complete search history.

(56) References Cited

U.S. PATENT DOCUMENTS 9,331,497 B2 5/2016 Beaston
9,847,654 B2 12/2017 Beaston (Continued)

FOREIGN PATENT DOCUMENTS

CN 103403993 A 11/2013
CN 105939035 A 9/2016

(Continued)

OTHER PUBLICATIONS

Practical Strain Gage Measurements. Application Note 290-1, Aglient Technoligies 1999.

(Continued)

*Primary Examiner* — Raymond Alejandro
(74) *Attorney, Agent, or Firm* — Sterne, Kessler, Goldstein & Fox P.L.L.C.

(57) ABSTRACT

Provided is a battery module and battery rack having enhanced fire safety features. The battery module includes a swelling/pressure sensor that detects swelling of a battery cell. An output signal of the sensor is used to halt operation of a battery rack/battery system containing the battery module and prevent charging and discharging of the battery module. In an embodiment, the battery module uses an AC-to-AC power supply to provide AC frequency power for balancing battery cells of the battery module. In an embodiment, the battery rack includes an internal water fire sup- (Continued)

pression system that provides battery cooling in the event of a battery cell fire to prevent the spread and/or reigniting of the fire.

20 Claims, 87 Drawing Sheets

Related U.S. Application Data application No. PCT/US2022/013290, filed on Jan. 21, 2022, which is a continuation of application No. 17/531,378, filed on Nov. 19, 2021, now Pat. No. 11,901,532.

(60) Provisional application No. 63/211,732, filed on Jun. 17, 2021, provisional application No. 63/170,600, filed on Apr. 5, 2021, provisional application No. 63/164,502, filed on Mar. 22, 2021, provisional application No. 63/125,958, filed on Dec. 15, 2020, provisional application No. 63/123,458, filed on Dec. 9, 2020.

(56) References Cited

U.S. PATENT DOCUMENTS

| | | | | |
|---|---|---|---|---|
| 9,882,401 | B2 | 1/2018 | Beaston | |
| 9,923,247 | B2 | 3/2018 | Beaston et al. | |
| 10,040,363 | B2 | 8/2018 | Beaston et al. | |
| 10,122,186 | B2 | 11/2018 | Nystrom et al. | |
| 10,153,521 | B2 | 12/2018 | Beaston | |
| 10,254,350 | B2 | 4/2019 | Beaston | |
| 10,263,436 | B2 | 4/2019 | Beaston et al. | |
| 10,270,266 | B2 | 4/2019 | Beaston | |
| 10,536,007 | B2 | 1/2020 | Beaston et al. | |
| 10,637,108 | B1 | 4/2020 | Kaplan et al. | |
| 10,699,278 | B2 | 6/2020 | Beaston et al. | |
| 11,611,114 | B2 | 3/2023 | Song et al. | |
| 11,901,532 | B2 * | 2/2024 | Beaston | H01M 10/425 |
| 2003/0047366 | A1 | 3/2003 | Andrew et al. | |
| 2006/0093896 | A1 | 5/2006 | Hong et al. | |
| 2008/0185994 | A1 | 8/2008 | Altemose | |
| 2011/0089897 | A1 | 4/2011 | Zhang et al. | |
| 2012/0059527 | A1 | 3/2012 | Beaston et al. | |
| 2012/0286739 | A1 | 11/2012 | O'Brien et al. | |
| 2013/0328530 | A1 | 12/2013 | Beaston | |
| 2014/0015469 | A1 | 1/2014 | Beaston et al. | |
| 2015/0171410 | A1 | 6/2015 | Shin | |
| 2015/0349390 | A1 | 12/2015 | Aiba et al. | |
| 2016/0111900 | A1 | 4/2016 | Beaston et al. | |
| 2016/0141894 | A1 | 5/2016 | Beaston | |
| 2016/0336556 | A1 | 11/2016 | Okutani et al. | |
| 2017/0038433 | A1 | 2/2017 | Beaston | |
| 2017/0040646 | A1 | 2/2017 | Beaston | |
| 2017/0077558 | A1 | 3/2017 | Nystrom et al. | |
| 2017/0077559 | A1 | 3/2017 | Beaston | |
| 2017/0106764 | A1 | 4/2017 | Beaston et al. | |
| 2017/0126032 | A1 | 5/2017 | Beaston | |
| 2017/0324122 | A1 | 11/2017 | Poirier et al. | |
| 2017/0345101 | A1 | 11/2017 | Beaston | |
| 2018/0123357 | A1 | 5/2018 | Beaston et al. | |
| 2018/0181967 | A1 | 6/2018 | Beaston et al. | |
| 2018/0233931 | A1 | 8/2018 | Beaston | |
| 2020/0101335 | A1 | 4/2020 | Liu et al. | |
| 2020/0139178 | A1 | 5/2020 | Olivo et al. | |
| 2020/0365956 | A1 | 11/2020 | Jeon et al. | |
| 2021/0083329 | A1 | 3/2021 | Beaston | |
| 2021/0083505 | A1 | 3/2021 | Beaston | |
| 2021/0218094 | A1 | 7/2021 | Grenier et al. | |
| 2022/0181713 | A1 | 6/2022 | Beaston et al. | |
| 2022/0271357 | A1 | 8/2022 | Beaston et al. | |
| 2022/0344738 | A1 | 10/2022 | Beaston et al. | |
| 2023/0060396 | A1 * | 3/2023 | Beaston | H01M 50/24 |
| 2024/0170756 | A1 | 5/2024 | Beaston et al. | |
| 2024/0380046 | A1 * | 11/2024 | Beaston | G01L 1/25 |

FOREIGN PATENT DOCUMENTS

| | | | |
|---|---|---|---|
| CN | 106154178 | A | 11/2016 |
| CN | 106199447 | A | 12/2016 |
| CN | 106961114 | A | 7/2017 |
| CN | 107394296 | A | 11/2017 |
| CN | 107808988 | A | 3/2018 |
| CN | 207664114 | U | 7/2018 |
| CN | 209071439 | U | 7/2019 |
| CN | 209104213 | U | 7/2019 |
| CN | 110299574 | A | 10/2019 |
| CN | 110945710 | A | 3/2020 |
| CN | 111916596 | A | 11/2020 |
| JP | 2006-24445 | A | 1/2006 |
| KR | 20180049651 | A | 5/2018 |
| KR | 102034771 | B1 | 10/2019 |
| TW | 202017228 | A | 5/2020 |
| WO | WO 2017/087807 | A1 | 5/2017 |
| WO | WO-2019146999 | A1 | 8/2019 |

OTHER PUBLICATIONS

International Search Report and Written Opinion of the International Searching Authority directed to International Patent Application No. PCT/US2022/013290, mailed Apr. 18, 2022; 20 pages.

Ma et al., "Sensor and Signal Detection and Conversion Technology," with machine translation attached, Oct. 2016, pp. 33-36.

Anonymous: "Load Cell Central," from https://web.archive.Org/web/20250517001558/https://www.800loadcel.com/load-cell-and-strain-gauge-basics.html; 7 pages, May 17, 2025 (Year: 2025).

* cited by examiner

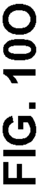
FIG. 10O
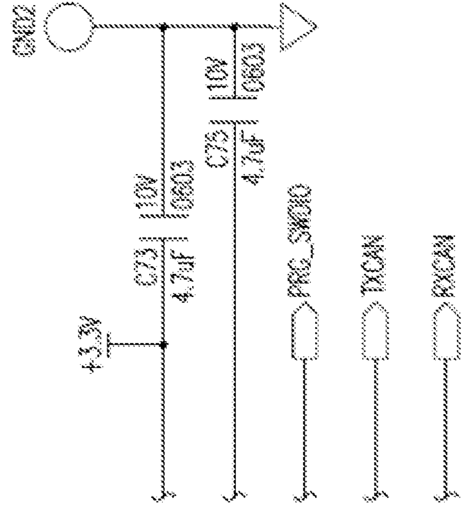
GND2
10V
0603
C75
4.7uF
10V
0603
C73
4.7uF
+3.3V
PRG_SWDIO
TXCAN
RXCAN

BATTERY MODULES HAVING AN INTEGRATED BATTERY MANAGEMENT SYSTEM WITH SWELLING/PRESSURE DETECTORS, AND APPLICATIONS THEREOF

CROSS-REFERENCE TO RELATED APPLICATIONS

This application is a continuation-in-part application of U.S. application Ser. No. 17/691,948, filed Mar. 10, 2022; which is a continuation application of PCT International Application No. PCT/US2022/013290, filed Jan. 21, 2022; which is a continuation application of U.S. application Ser. No. 17/531,378, filed Nov. 19, 2021, now U.S. Pat. No. 11,901,532; which claims the benefit of U.S. Provisional Patent Application 63/211,732, filed Jun. 17, 2021; U.S. Provisional Patent Application 63/170,600, filed Apr. 5, 2021; U.S. Provisional Patent Application 63/164,502, filed Mar. 22, 2021; U.S. Provisional Patent Application 63/125,958, filed Dec. 15, 2020; and U.S. Provisional Patent Application 63/123,458, filed Dec. 9, 2020. Each of the above applications is herein incorporated by reference as if fully reproduced below.

TECHNICAL FIELD

The present disclosure relates to battery modules, battery management systems, and battery energy storage systems.

BACKGROUND

Battery energy storage systems use a lot of batteries, which present a fire hazard if not properly managed. Conventional battery management systems typically just monitor battery cell voltages and temperatures. They do not monitor or indicate the internal state of the battery cells. Battery cell voltages as well as cell temperatures are not in themselves good indicators of changing conditions/pressure inside the cells that can lead to a battery fire.

SUMMARY

The embodiments featured herein help solve or mitigate the above-mentioned issues as well as additional shortcomings relating to battery storage systems.

Under certain circumstances, an embodiment of the invention includes a battery module having a sensor that detects swelling of a battery cell. An output signal of the sensor is used to halt operation of a battery rack/system containing the battery module and thereby halt charging and discharging of the battery cell until the battery module containing the battery cell can be replaced and the battery rack/system inspected to verify it is safe to operate.

In an embodiment, high frequency AC power is used as a power source for balancing the battery module cells. Using high frequency AC power permits the use of isolation transformers as a part of the cell balancing circuit.

In an embodiment, battery modules according to the invention include a top cover that collects water and directs this water to plates of the battery module to cool the battery.

In an embodiment, battery racks according to the present invention include a water fire suppression system having a cascading water flow among the battery modules, which provides cooling in the event of a battery cell fire and thereby controls and prevents the spread of a battery cell fire to neighboring cells and racks.

In an embodiment, battery racks according to the present invention include an exhaust duct to remove gases and/or heat and direct these gases and/or heat outside of the room, container, building, etc. that houses the battery rack.

Further features and advantages of the disclosure, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Together with the following detailed descriptions, the accompanying drawings illustrate a number of exemplary embodiments in addition to describing and demonstrating various aspects and/or principles set forth in the present disclosure. The accompanying drawings and the brief descriptions are provided to enable one of ordinary skill in the art to practice the various aspects and/or principles set forth in the present disclosure.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein as well as modifications thereof. Accordingly, various modifications and equivalents of the methods, apparatuses, and/or systems described herein will be apparent to those of ordinary skill in the art. Descriptions of well-known functions and constructions may be omitted for increased clarity and conciseness.

Figure 1:
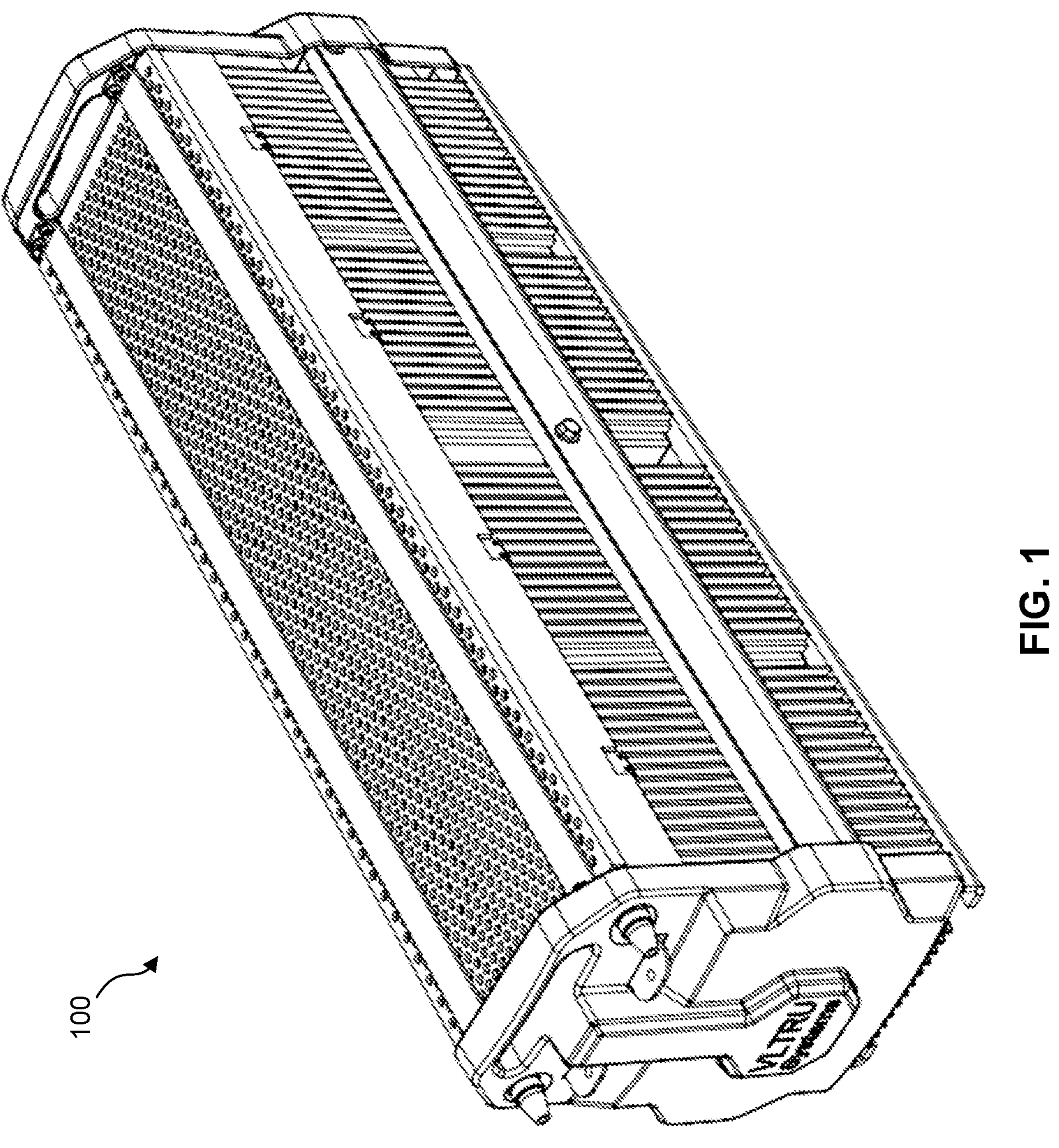
FIG. 1 illustrates an example battery module according to an embodiment of the present invention.

FIG. 1 illustrates an example battery module 100 according to an embodiment of the present invention. As shown more clearly in FIG. 3A, battery module 100 includes several features that enhance fire safety and can prevent a battery fire.

Over time, a battery cell within a battery module may become defective or damaged and begin to swell. This swelling is a very good indication of a change in the internal pressure of the cell and is a very good indicator that the cell might catch on fire if not replaced. The swelling can be caused, for example, by the formation of flammable and explosive gases inside the cell due to changes in the electrolyte and other active materials inside the battery cell. Cell swelling occurs before a cell vents and/or catches on fire.

As described herein, a new swelling/pressure sensor is designed and installed on battery modules according to embodiments of the present invention that can detect and quantify the amount of swelling/pressure in the battery cells. When swelling/pressure beyond normal aging and cycling changes is detected using firmware/software and data from the sensors, an alarm/warning is generated by the firmware/software so that action can be taken whereby the battery cells having the abnormal swelling/pressure can be replaced before the cells vent or can progress to a point where a fire is likely to occur. The alarm/warning can also be used to automatically disconnect, for example, the batteries or battery rack containing the battery cells having the abnormal swelling/pressure so that the battery cells are not further charged or discharged and thus further damaged, which could lead to the venting of the battery cells and/or a battery cell fire.

In one embodiment, as described in more detail below, one swelling/pressure sensor can be used to monitor several battery cells at once by attaching the sensor to plates of a battery assembly or battery module. In another embodiment, the swelling/pressure sensor(s) is/are attached to the battery cell(s) directly. As described herein, the detection of abnormal swelling/pressure in a battery cell can be used to shut down the battery system and make it safe until a cell having an issue is replaced and the system is inspected to make sure it is safe to operate again.

Figure 2:
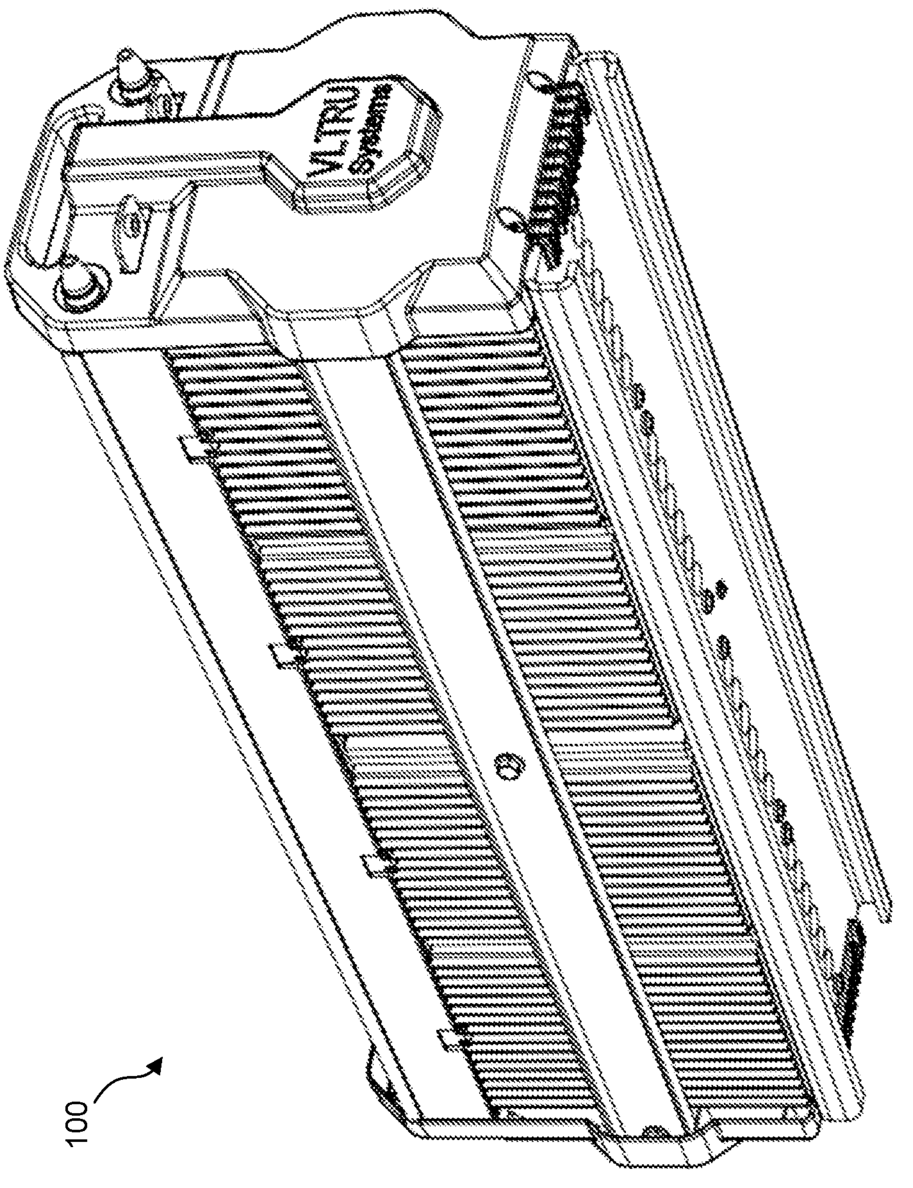
FIG. 2 illustrates an example battery module according to an embodiment of the present invention.

FIG. 2 illustrates another view of battery module 100. FIG. 2 shows the front, one side, and the bottom of battery module 100.

Figure 3A:
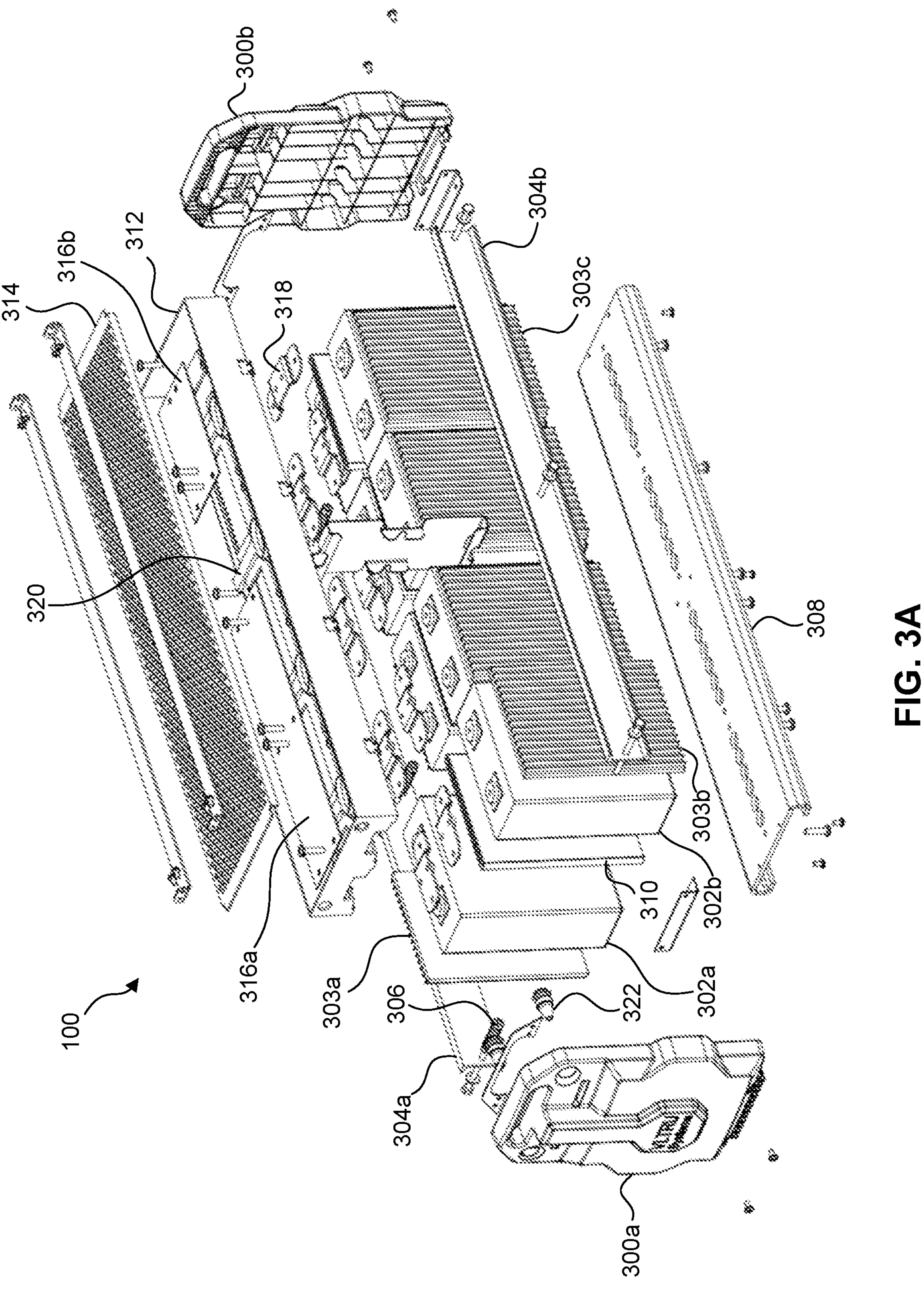
FIG. 3A illustrates an exploded view of the battery module in FIG. 1.

FIG. 3A illustrates an exploded view of battery module 100. As shown in FIG. 3, battery module 100 has a front cover 300*a* and a back cover 300*b*. Battery module 100 includes battery cells 302*a* and 302*b*. These battery cells have a predetermined amount of pressure applied to them using side plates 303*a*-303*c*, side bars 304*a* and 304*b*, and a spring 306. Applying a predetermined amount of pressure to battery cells 302 can increase the cycle life of battery cells 302. By using spring 306 to apply this pressure, the side plates 303 are still free to move due to swelling/expansion of battery cells 302. As described in more detail below, the movement of side plates 303 can be monitored and measured using sensors according to embodiments of the present invention.

As shown in FIG. 3A, battery module 100 also includes a bottom plate 308, center plates 310, top tray 312, and a cover 314, battery module controller circuit boards 316*a* and 316*b*, busbars 318, sensors 320, and connectors 322.

In an embodiment, battery module 100 includes eight battery cells 302. However, fewer or more battery cells may be included in battery module 100, such as two, four, six, ten, twelve, fourteen, sixteen, etc. Battery cells 302 are used for storing electrical energy. The eight battery cells 302 may be connected in series using busbars 318. A predetermined amount of pressure is applied to battery cells 302 using side plates 303, center plates 310, and side bars 304. Side plates 303 and center plates 310 also provide cooling for battery cells 302. Top tray 312 fits on top of battery cells 302 and provides several functions including providing a protective space for sensors 320 and battery module controller circuit boards 316*a* and 316*b*. Other functions of top tray 312 are described below. Cover 314 fits on top of top tray 312. Front cover 300*a* and back cover 300*b* are used, for example, to lift and carry battery module 100. Front cover 300*a* includes connectors 322 that allow for several battery modules 100 to be easily wired together to form larger battery systems. Battery module controller circuit boards, described in more detail below, provide battery management functions for battery module 100 such as, for example, monitoring the voltage, temperature, and pressure of battery cells 302.

Figure 3B:
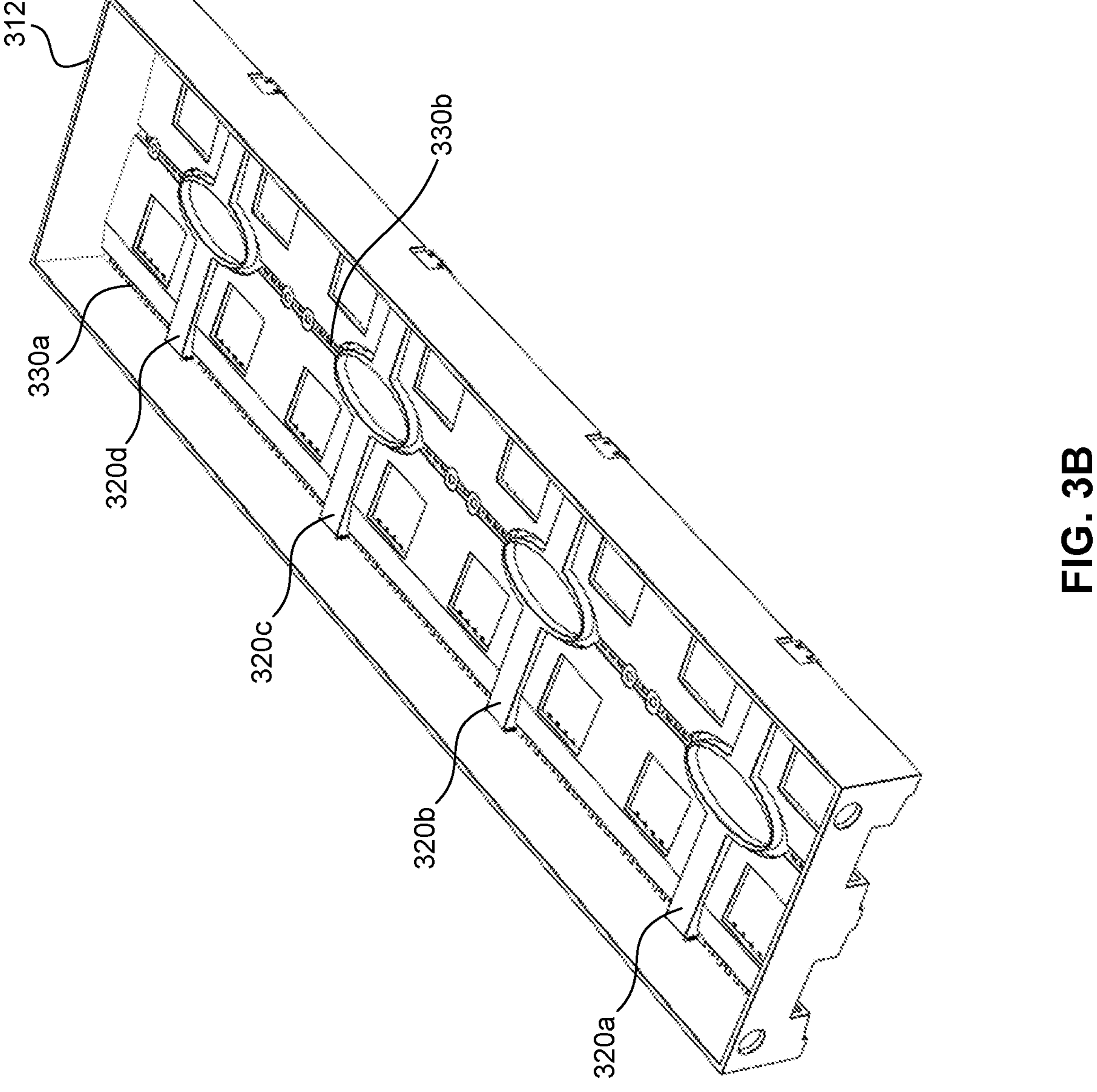
FIG. 3B illustrates an example top tray and example sensors for the battery module of FIG. 1.

FIG. 3B further illustrates top tray 312 and sensors 320*a*-320*d*. In an embodiment, top tray 312 includes four integrated swelling/pressures sensors 320*a*-320*d*. In other embodiments, the sensors 320*a*-320*d* are separate pieces from top tray 312. Integrating sensors according to the present invention into the top tray can, for example, reduce manufacturing costs, tooling costs, labor costs, etc. As shown and described below, sensors other than those shown in FIG. 3B can be used.

In an embodiment, top tray 312 has holes 330*a* and 330*b* that are used to direct water (or other fluid) to the side plates 303 and center plates 310 of battery module 100 according to the present invention in order to cool the battery cells 302 in the event of a battery cell fire.

Figure 4:
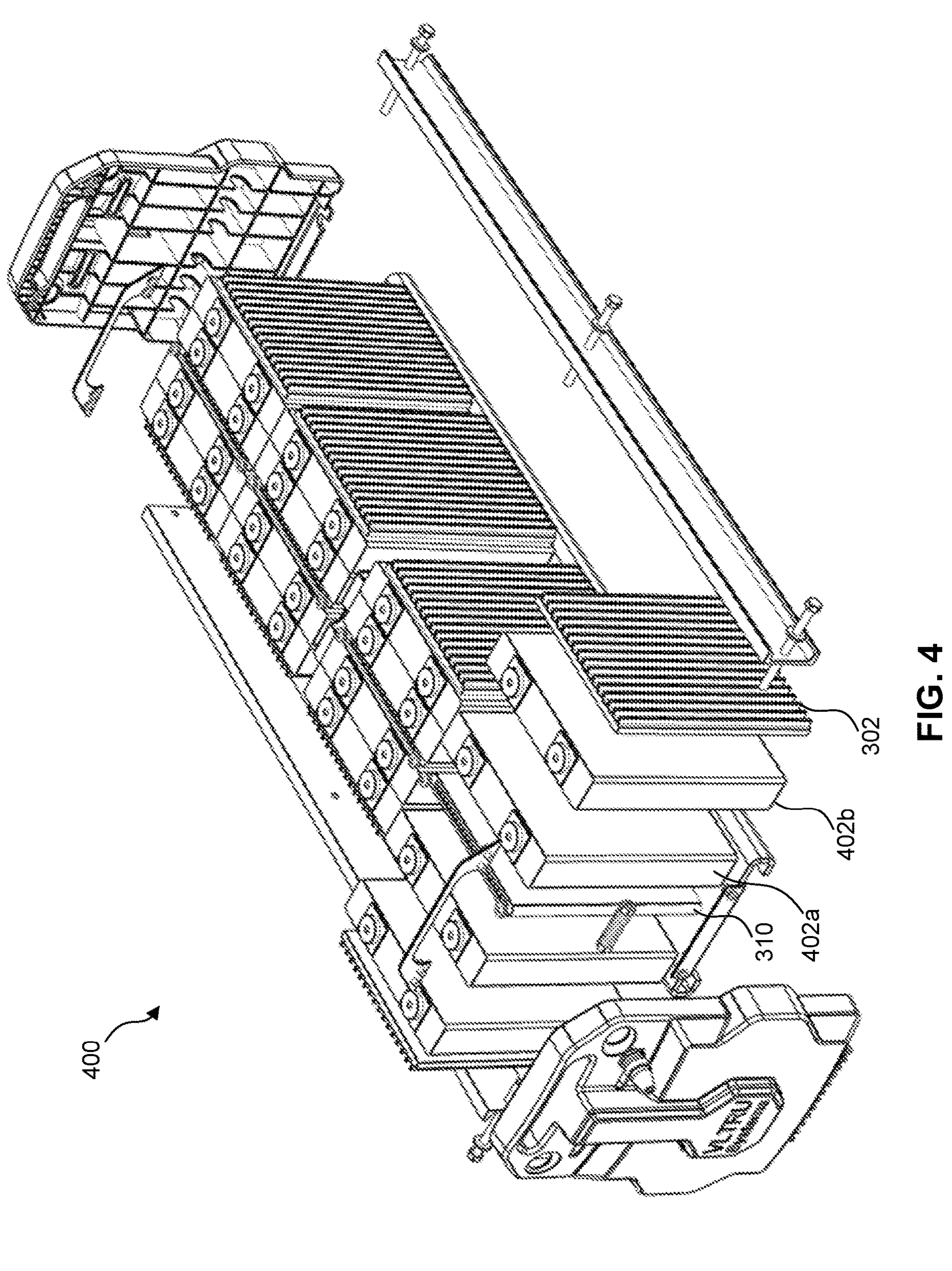
FIG. 4 illustrates an example battery module according to an embodiment of the present invention.

FIG. 4 illustrates battery module 400 according to an embodiment of the present invention. Battery module 400 is similar to battery module 100 except that it has more battery cells 402 than battery module 100. As shown in FIG. 4, battery module 400 has two battery cells 402*a* and 402*b* between the side plates 302 and the center plates 310. Using different numbers of battery cells and/or different sizes of battery cells (e.g., 40 AH, 50 AH, 100 AH, 200 AH, 280 AH, etc.) allows for battery modules that store different amounts of energy.

Figure 5:
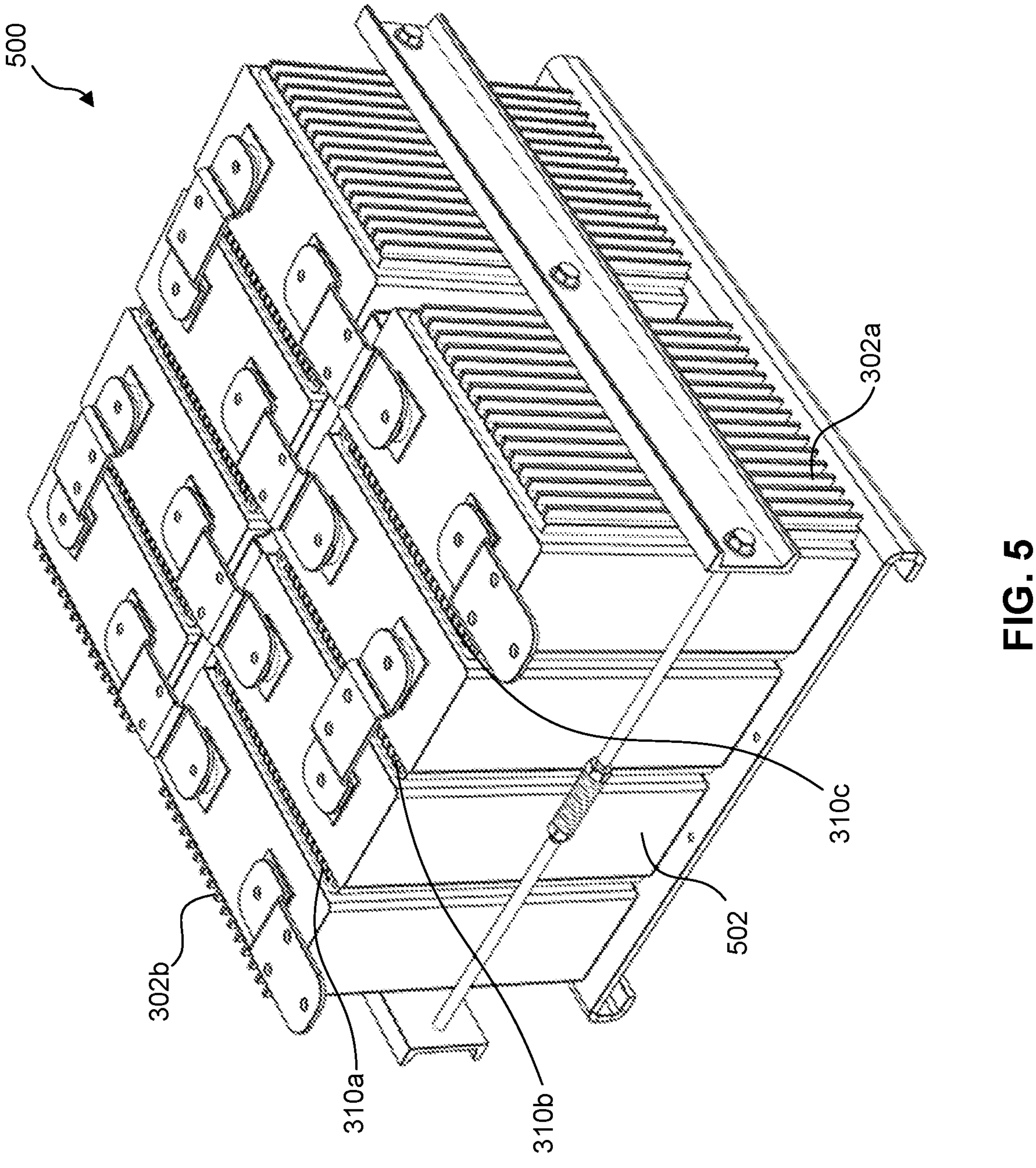
FIG. 5 illustrates an example battery module according to an embodiment of the present invention.

FIG. 5 shows a battery module 500 according to an embodiment of the present invention. Battery module 500 has battery cells 502. As shown in FIG. 5, the battery cells 502 are separated using side plates 302*a*-302*b* and center plates 310*a*-310*c*. As will be understood by those skilled in the relevant art, battery cell configurations other than those described herein are possible and contemplated.

Figure 6A:
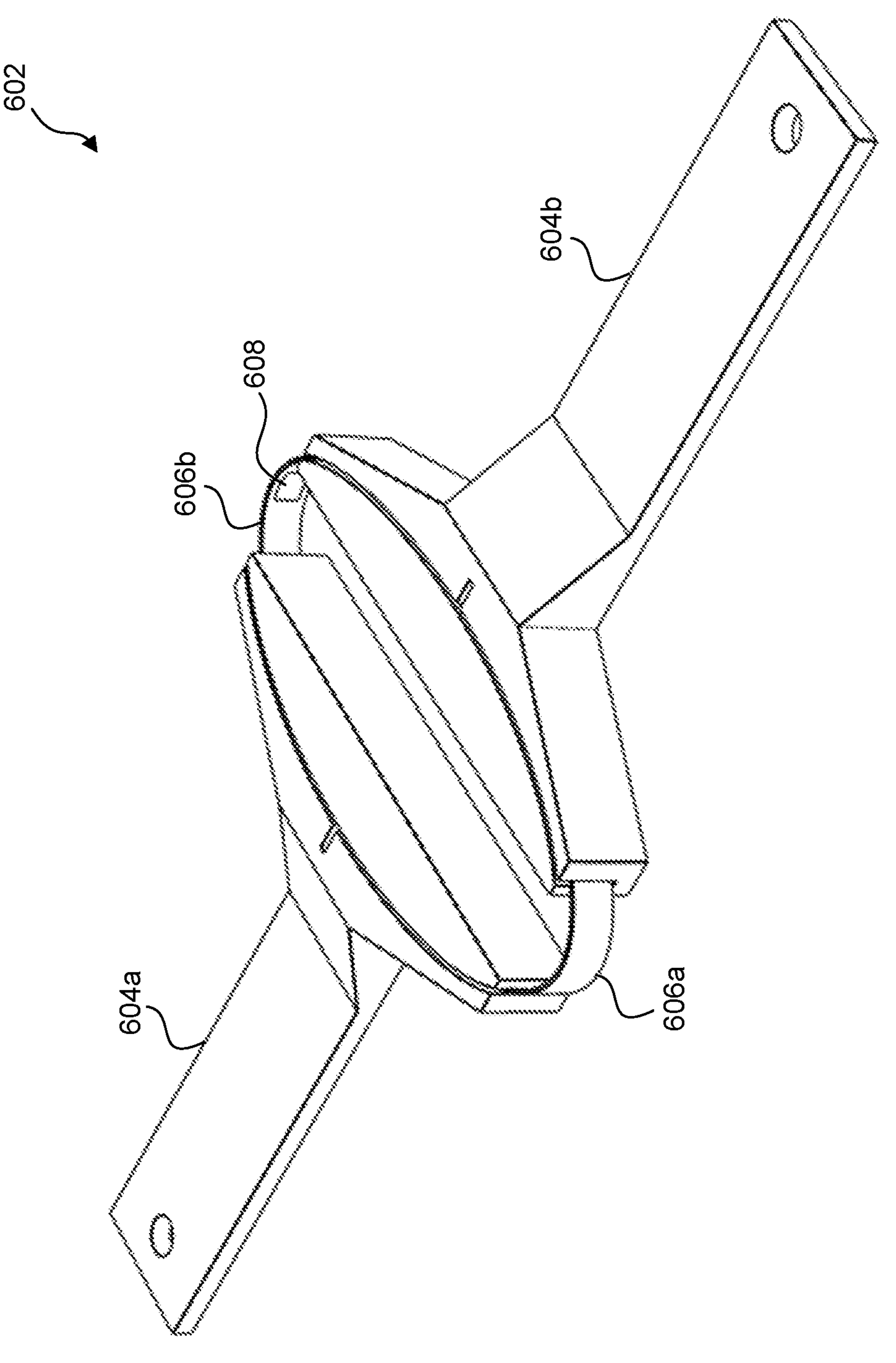
FIG. 6A-B illustrate example swelling/pressure sensors that may be used according to embodiments of the present invention.

FIG. 6A illustrates a swelling/pressure sensor 602 that may be used with battery modules according to embodiments of the present invention. As shown in FIG. 6A, in an embodiment sensor 602 has two plastic parts 604*a* and 604*b*, two metal parts 606*a* and 606*b*, and at least one strain gauge 608. The at least one strain gauge is attached to the metal parts 606. The strain gauge 608 can be attached using an adhesive or glue. The metal parts 606 are inserted into the plastic parts 604, which hold the metal parts and are used to attach sensor 602 to a battery module. When a force is applied to one or both of the plastic parts 604, e.g., due to the swelling of a battery cell, the metal parts 606 flex and apply a force to the strain gauge(s) 608. This change in sensor 602 is detected by the electrical circuits described herein, for example, with respect to FIGS. 10A-Q below. While parts 604*a*-604*b* and 606*a*-606*b* are described as plastic and metal, respectively, other materials may be used. Throughout this disclose, any part or component that is describes as a specific material (such as plastic or metal) may be constructed from other materials.

Figure 6B:
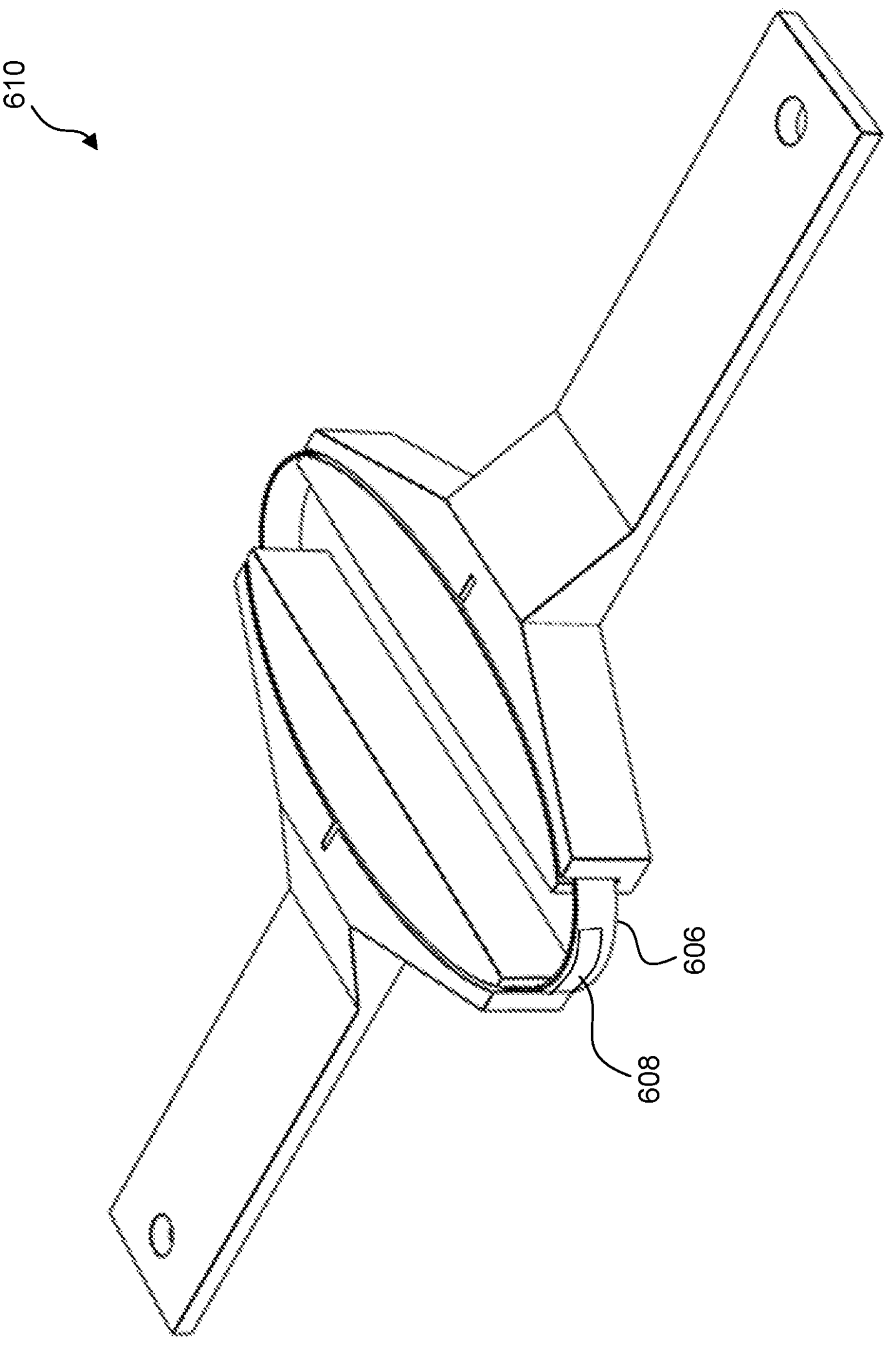

FIG. 6B illustrates a swelling/pressure sensor 610 that may be used with battery modules according to embodiments of the present invention. Sensor 610 is similar to sensor 602 except that the strain gauge(s) 608 are attached to an outside radius of the metal parts 606 rather than an inside radius.

Figure 7A:
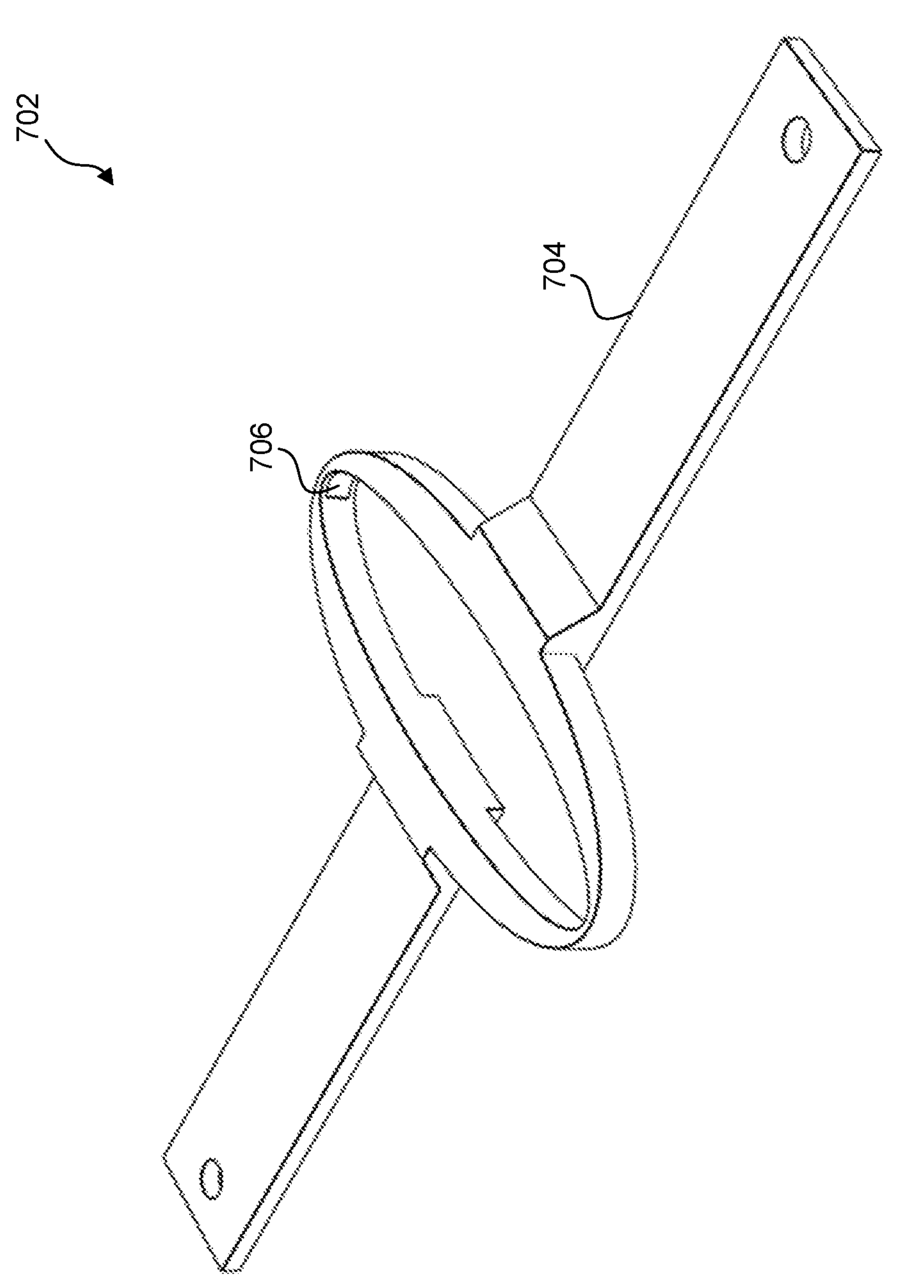
FIGS. 7A-C illustrate example swelling/pressure sensors that may be used according to embodiments of the present invention.

FIG. 7A illustrates a sensor 702 according to an embodiment of the present invention. Sensor 702 has a single plastic part 704 and at least one strain gauge 706 attached to an inside radius of the oval-shaped center section of plastic part 704. The strain gauge 706 can be attached using an adhesive or glue.

Figure 7B:
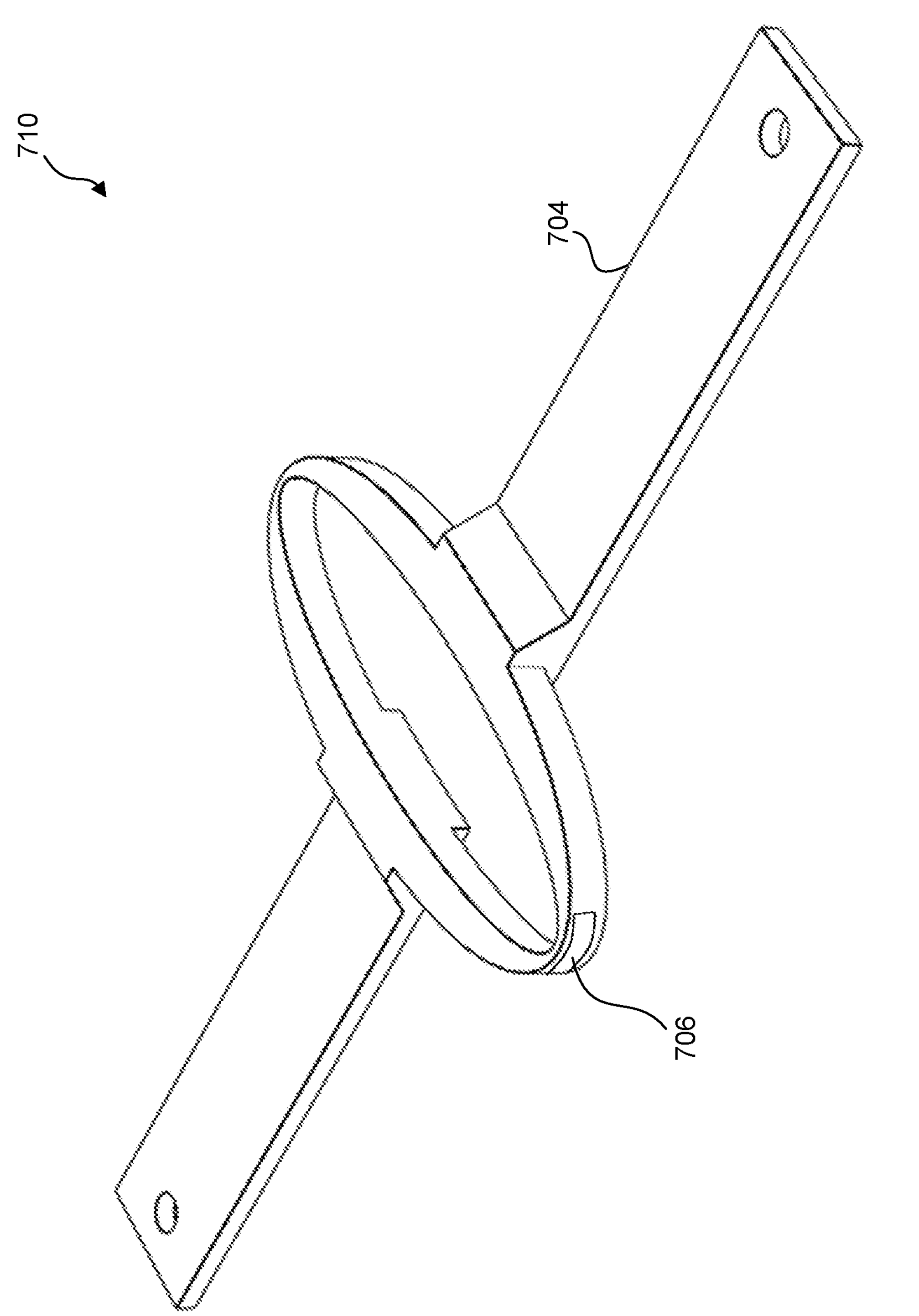

FIG. 7B illustrates a swelling/pressure sensor 710 that may be used with battery modules according to embodiments of the present invention. Sensor 710 is similar to sensor 702 except that the strain gauge(s) 706 are attached to an outside radius of plastic part 704 rather than an inside radius.

Figure 7C:
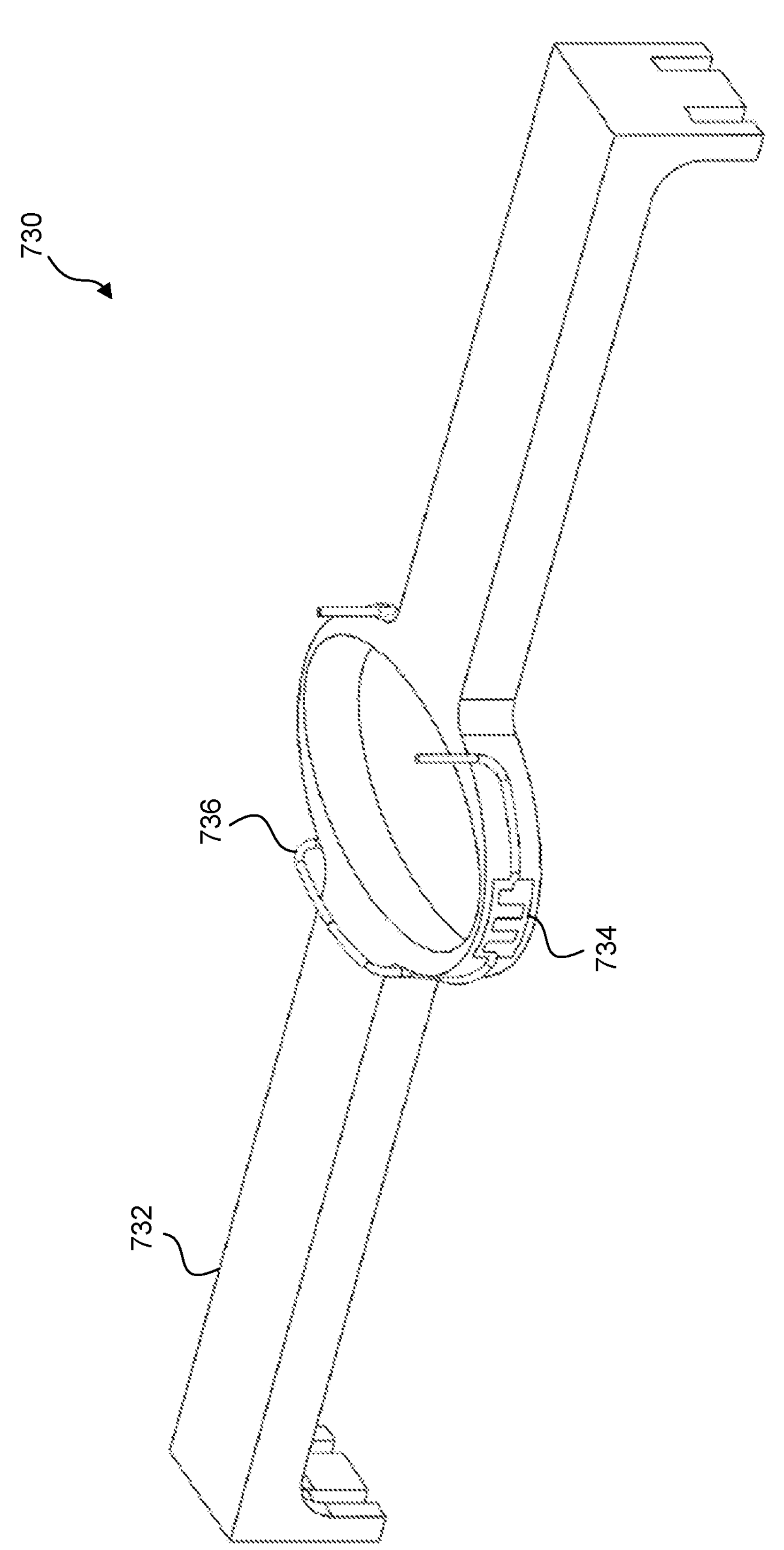

FIG. 7C illustrates a sensor 730 according to an embodiment of the present invention. Sensor 730 has a plastic part 732 and two strain gauges 734 attached to a center circular-shaped or oval-shaped section. The two strain gauges are connected together in series by a wire 736. The wire 736 is then connected to a monitoring circuit such as that described below with regard to FIGS. 10A-Q.

Sensors other than sensors 602, 610, 702, 710 and 730 may be used according to the present invention to monitor the swelling/pressure of battery cells. See U.S. Patent Application U.S. application Ser. No. 17/691,948, which is incorporated herein by reference in its entirety, for a description of several more sensors that can be used.

Figure 8:
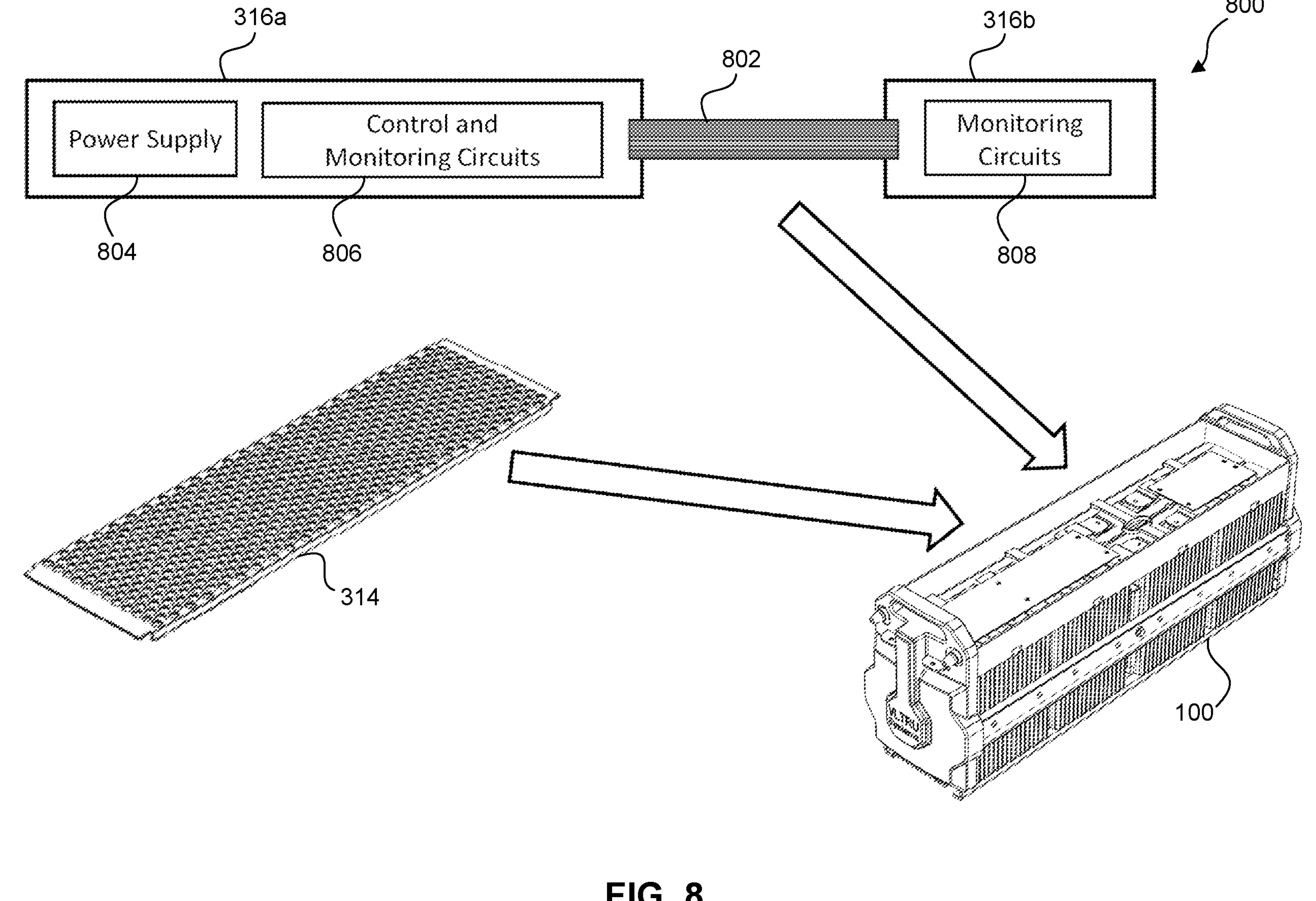
FIG. 8 illustrates an example battery module controller according to an embodiment of the present invention.

FIG. 8 illustrates an example battery module controller 800 according to an embodiment of the present invention. As shown in FIG. 8, battery module controller 800 includes two battery module controller circuit boards 316*a* and 316*b* connected together by a ribbon cable 802. In an embodiment, battery module controller circuit board 316*a* includes a power supply 804 and control and monitoring circuits 806. Battery module controller circuit board 316*b* includes monitoring circuits 808. Battery module controller circuit boards 316*a*-316*b* are shown installed on a battery module 100, with cover 314 removed, according to an embodiment of the present invention.

Figure 9A:
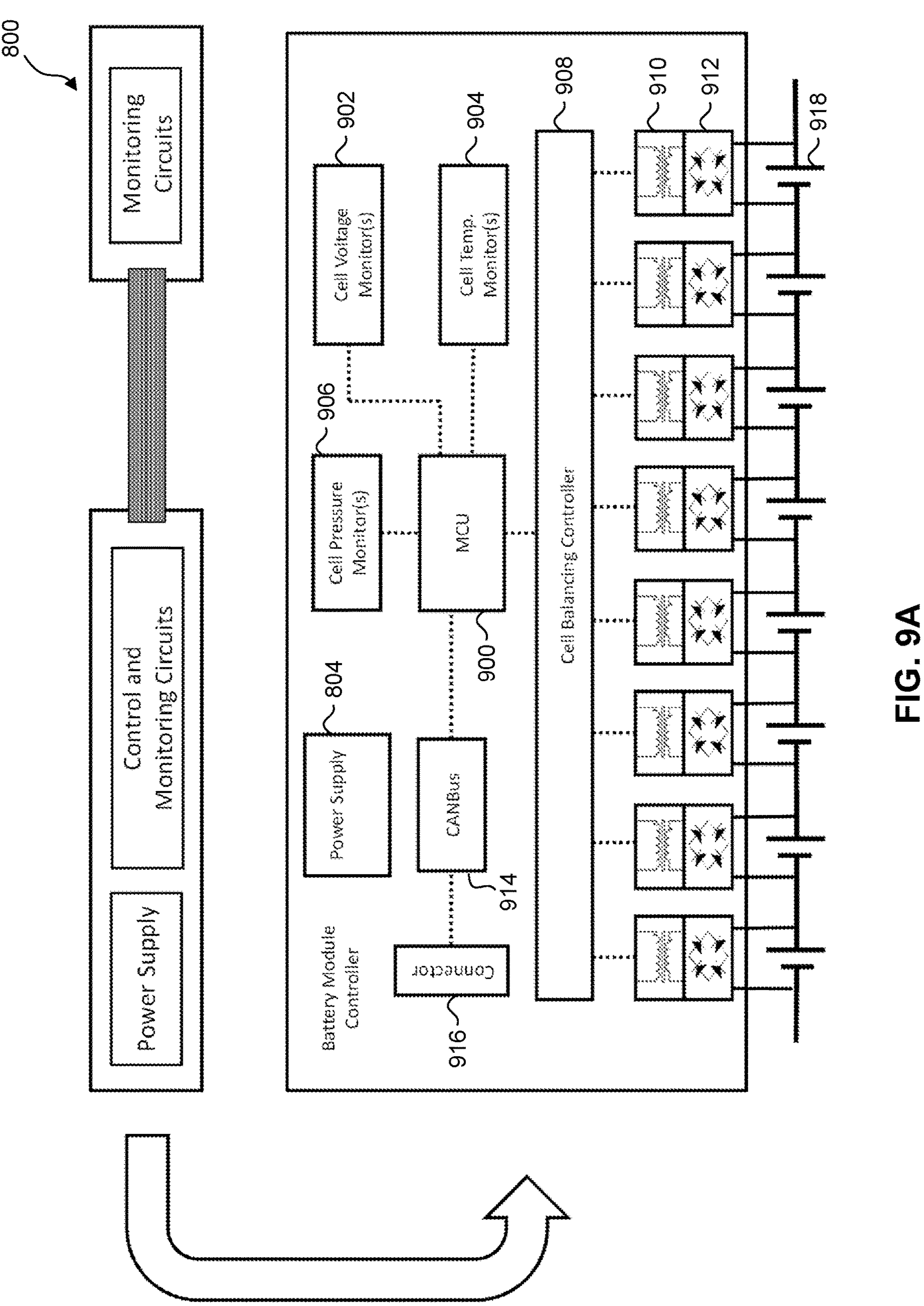
FIG. 9A illustrates an example battery module controller according to an embodiment of the present invention.

FIG. 9A further illustrates example battery module controller 800. As shown in FIG. 9A, in addition to power supply 804, battery module controller 800 includes a microcontroller unit (MCU) 900, cell voltage monitors 902, cell temperature monitors 904, cell pressure monitors 906, a cell balancing controller 908, balancing transformers 910, and balancing rectifiers 912. In an embodiment, MCU 900 communicates with a higher-level controller using a CANBus communications circuit 914. The CANBus communications circuit is connected to the higher-level controller using a connector 916. In an embodiment, the higher-level controller is a battery rack controller as described herein.

In operation, power supply 804 draws power from a power grid and converts this power to higher frequency AC power and DC voltages needed to operate the components of battery module controller 800. The higher frequency AC power output by power supply 804 is supplied to the cell balancing transformers 910 and balancing rectifiers 912 for balancing cells 918. Power supply 804 produces DC power required to operate the various components of battery module controller 800 such as, for example, MCU 900, cell voltage monitors 902, cell temperature monitors 904, cell pressure monitors 906, and cell balancing controller 908. MCU 900 runs the firmware and software that controls the operation and functions of battery module controller 800. These functions include monitoring the voltage, temperature and pressure of the battery cells that make up the battery module controlled by battery module controller 800. The functions also include balancing the battery cells of the battery module and communicating data about the battery module and battery cells to a higher-level controller such as, for example, a battery rack controller as described below. Cell voltage monitor(s) 902, cell temperature monitor(s) 904, and cell pressure monitor(s) 906 are the hardware sensors and circuits needed to monitor the battery cell voltages, temperatures, and pressures. Cell balancing controller 908 is the hardware needed to provide balancing current/power to the individual battery cells 918 of the battery module controlled by battery module controller 800. More details regarding these functions and the associated hardware are provided below.

Figure 9B:
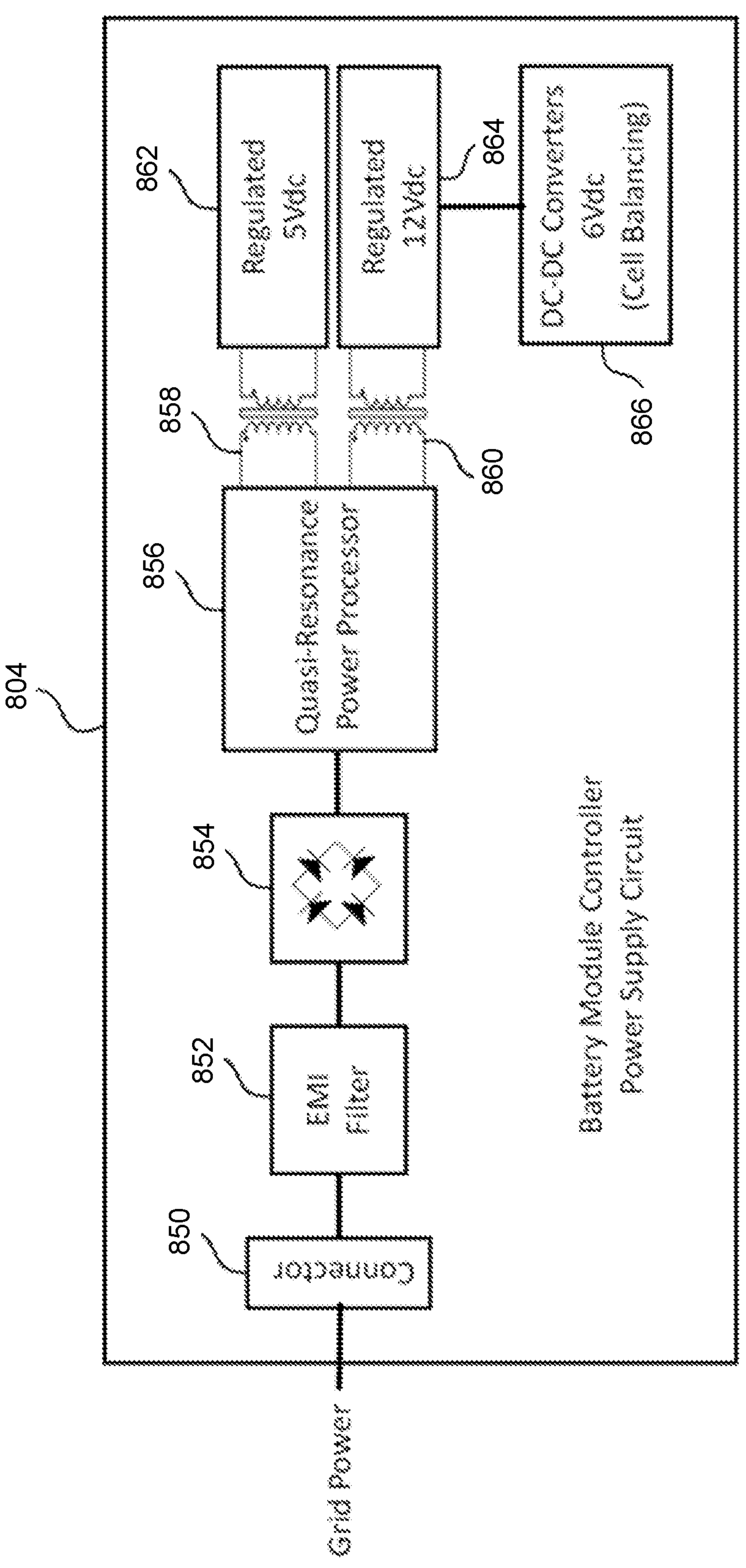
FIG. 9B illustrates an example power supply for a battery module controller according to an embodiment of the present invention.

FIG. 9B further illustrates an example power supply 804 that can be used with battery module controllers according to an embodiment of the present invention. As shown in FIG. 9B, power supply 804 includes a connector 850, an electromagnetic interference (EMI) filter 852, a rectifier 854, a quasi-resonance power processor 856, isolation transformers 858 and 860, a regulated 5V power circuit 862, a regulated 12V power circuit 864, and one or more DC-to-DC 6V power converter circuits 866 used for battery cell balancing. In embodiments, isolation transformers 858 and 860 can be multiple windings on the same transformer core. Power supply 804 is connected to grid power using connector 850. In one embodiment, quasi-resonance power processor 856 is implemented using an Infineon Technologies 5QR1680AG integrated circuit chip.

Figure 10:
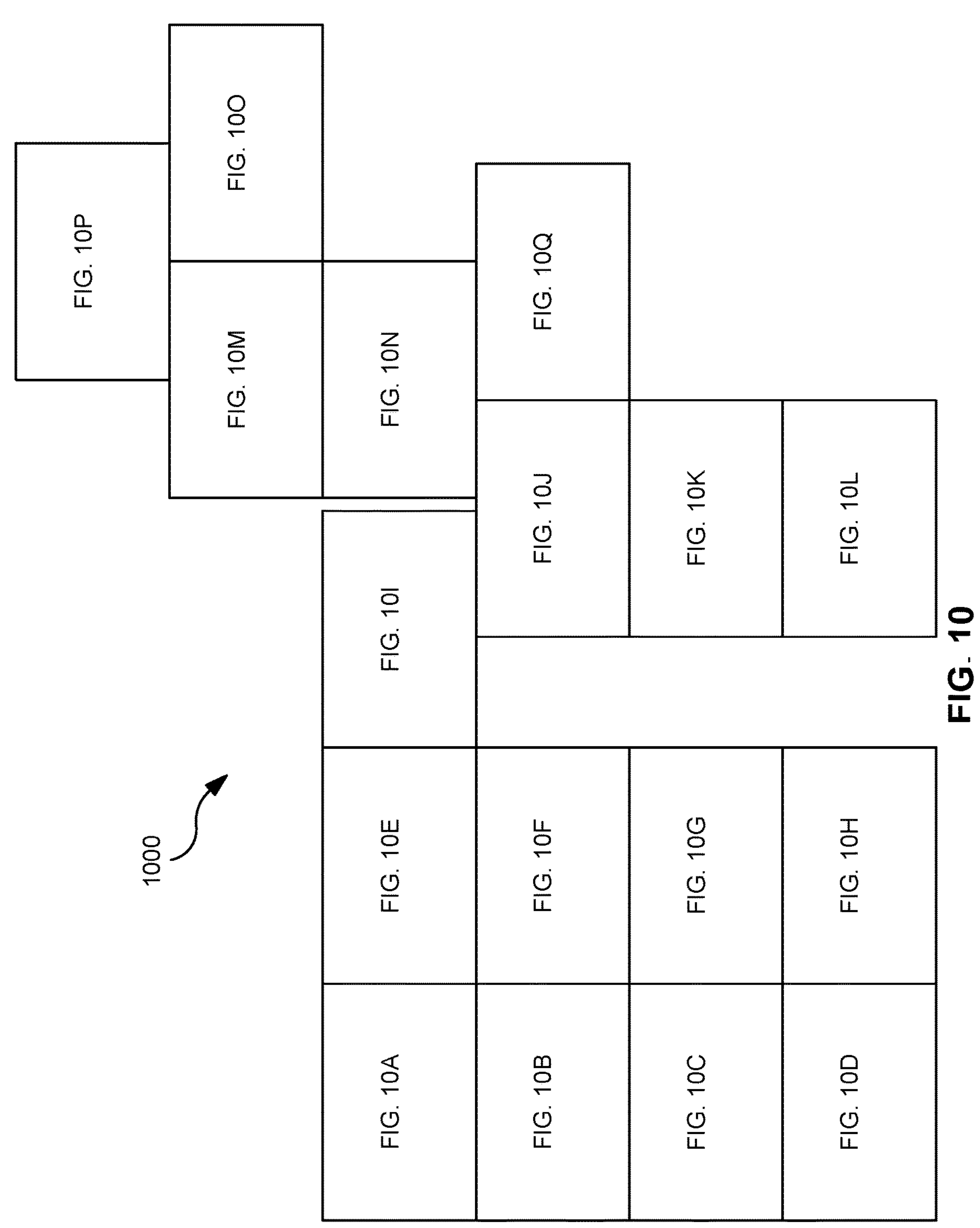
FIG. 10 (separated into partial views shown in FIGS. 10A-10Q) illustrates an example battery module controller according to an embodiment of the present invention.
Figure 10A:
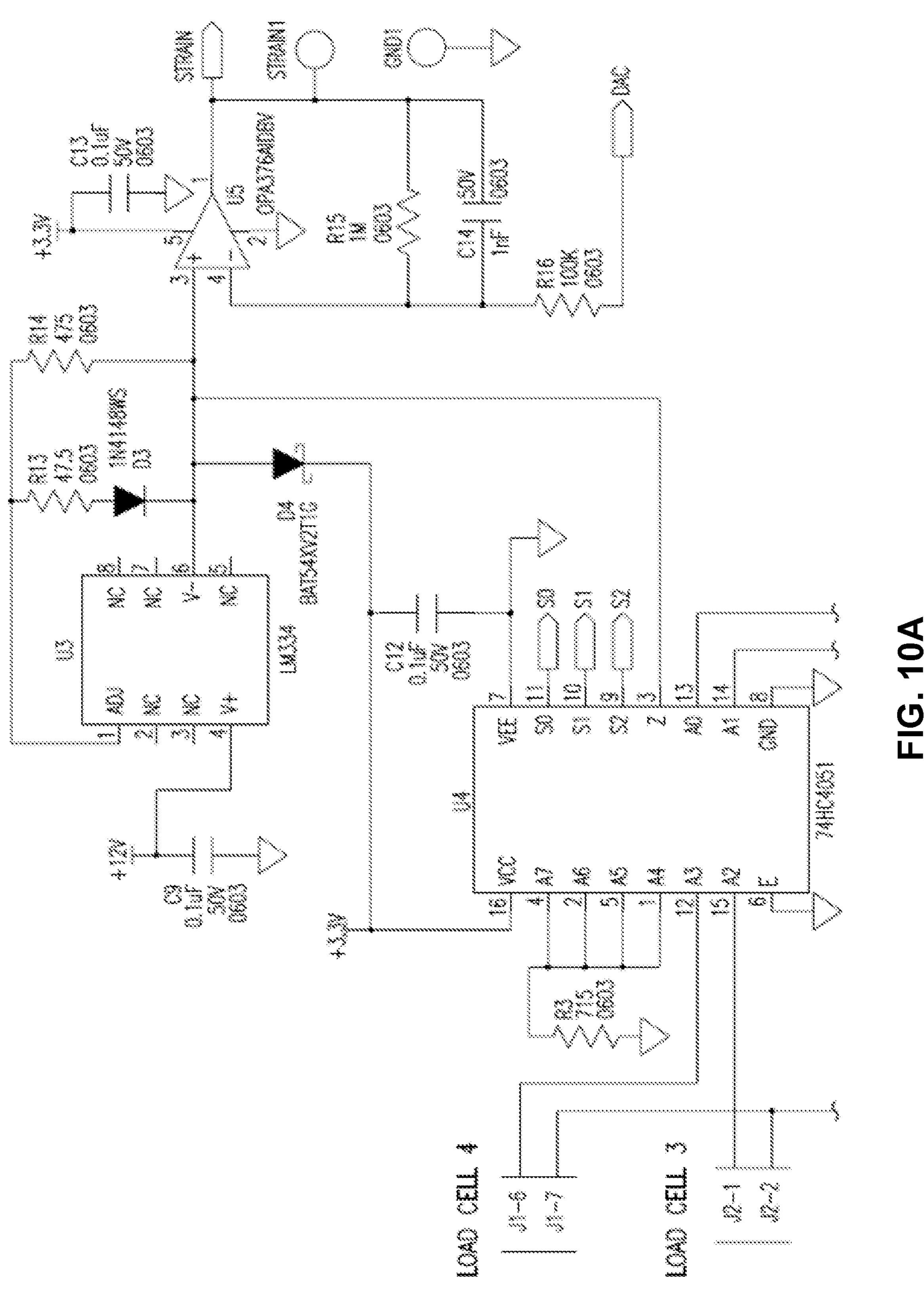
Figure 10B:
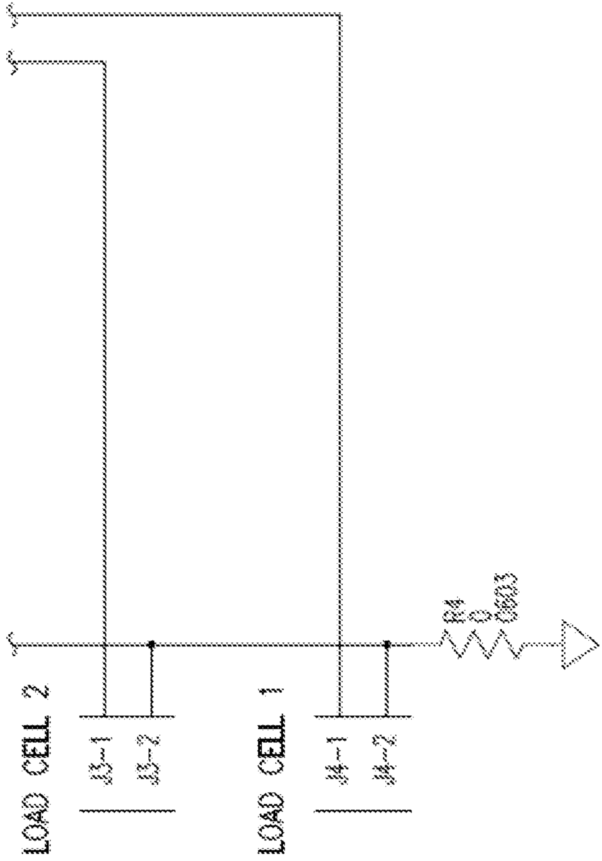
Figure 10C:
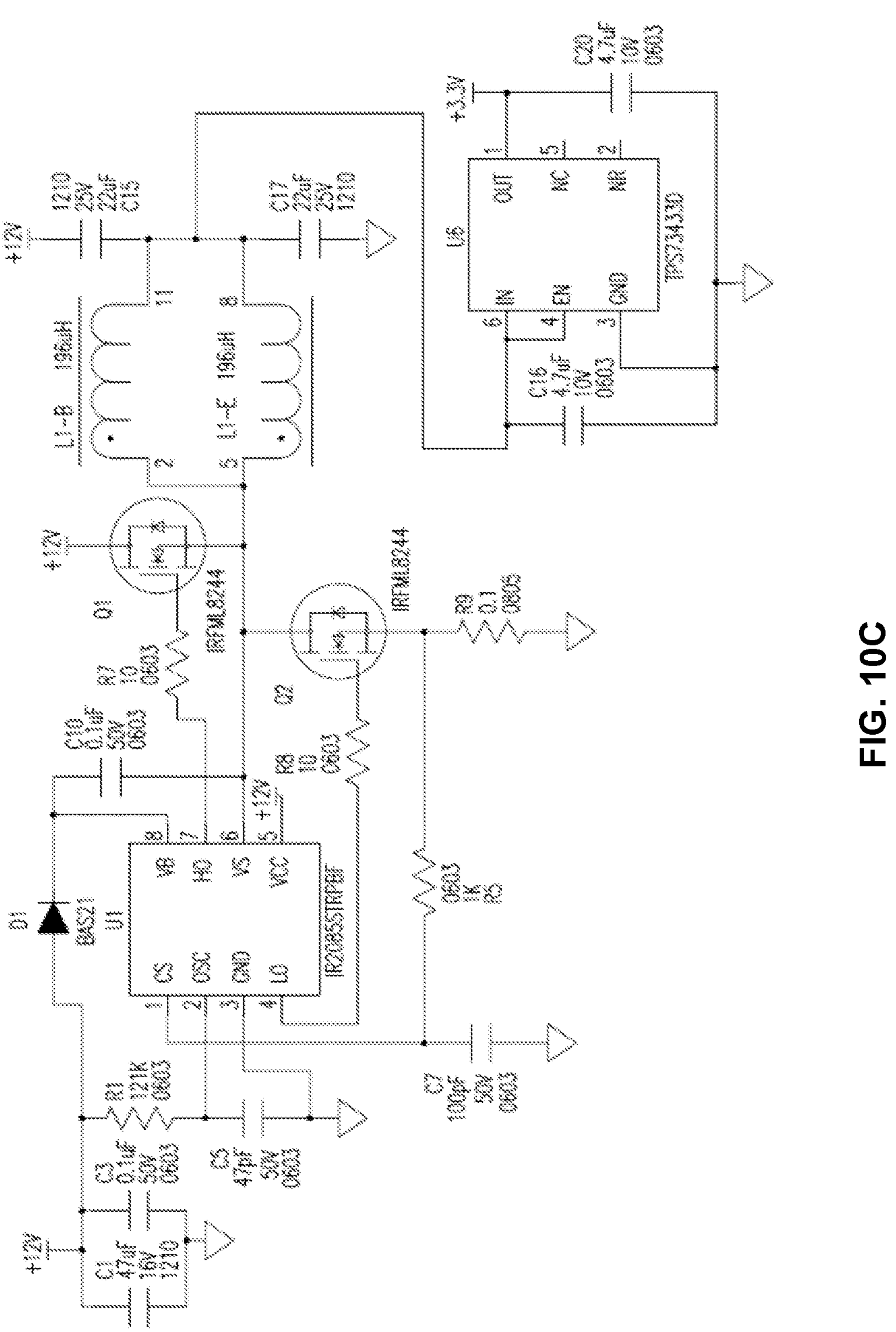
Figure 10D:
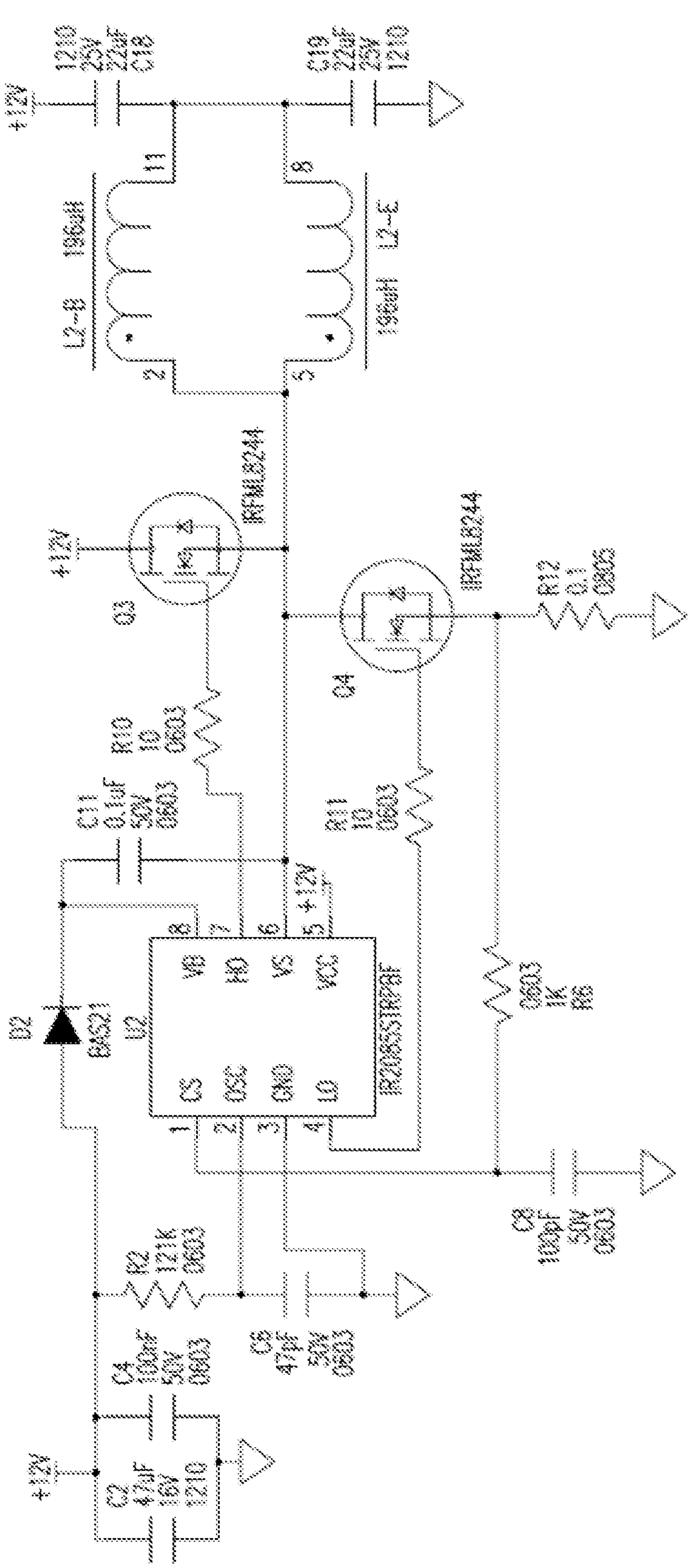
Figure 10E:
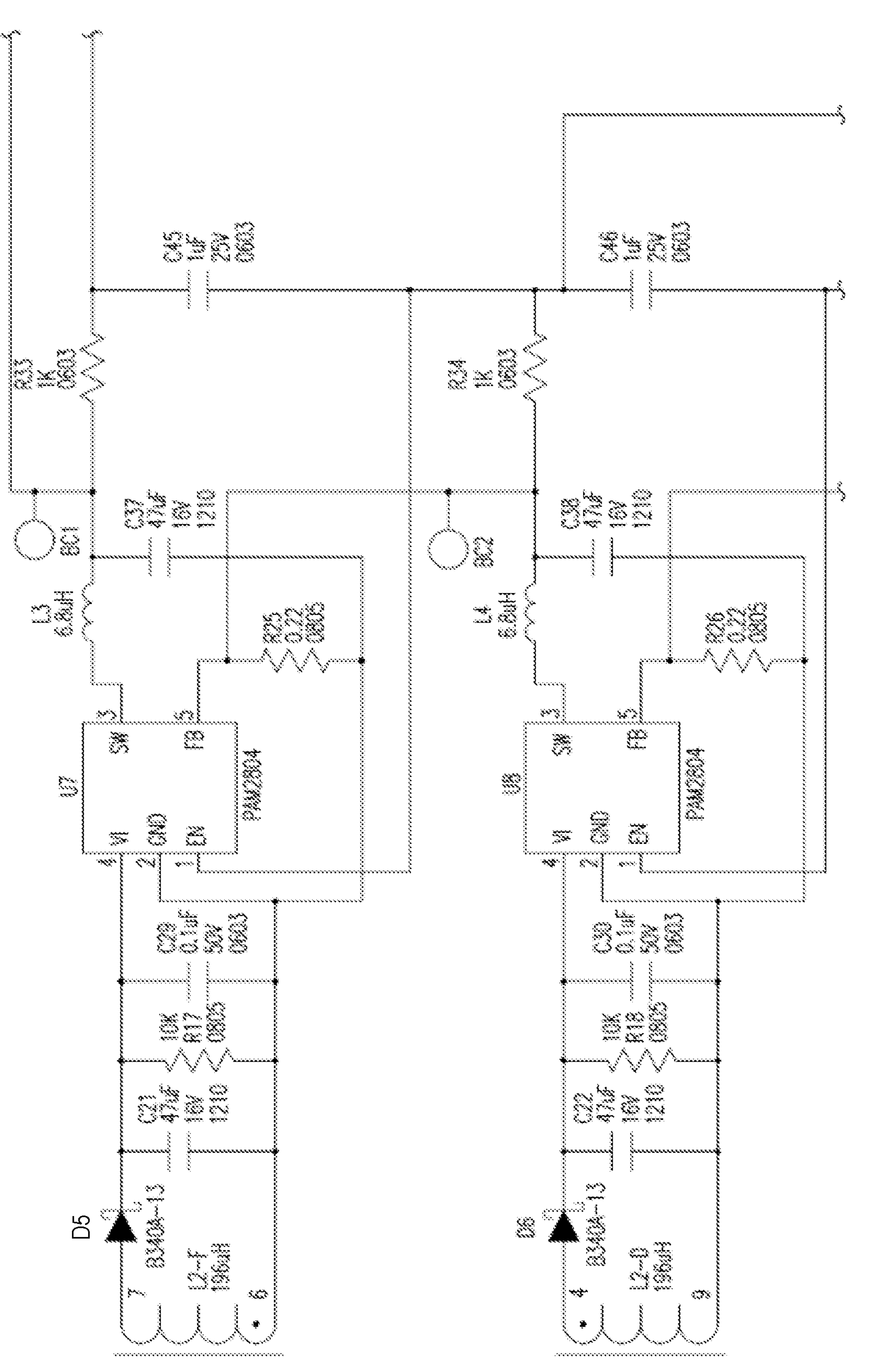
Figure 10F:
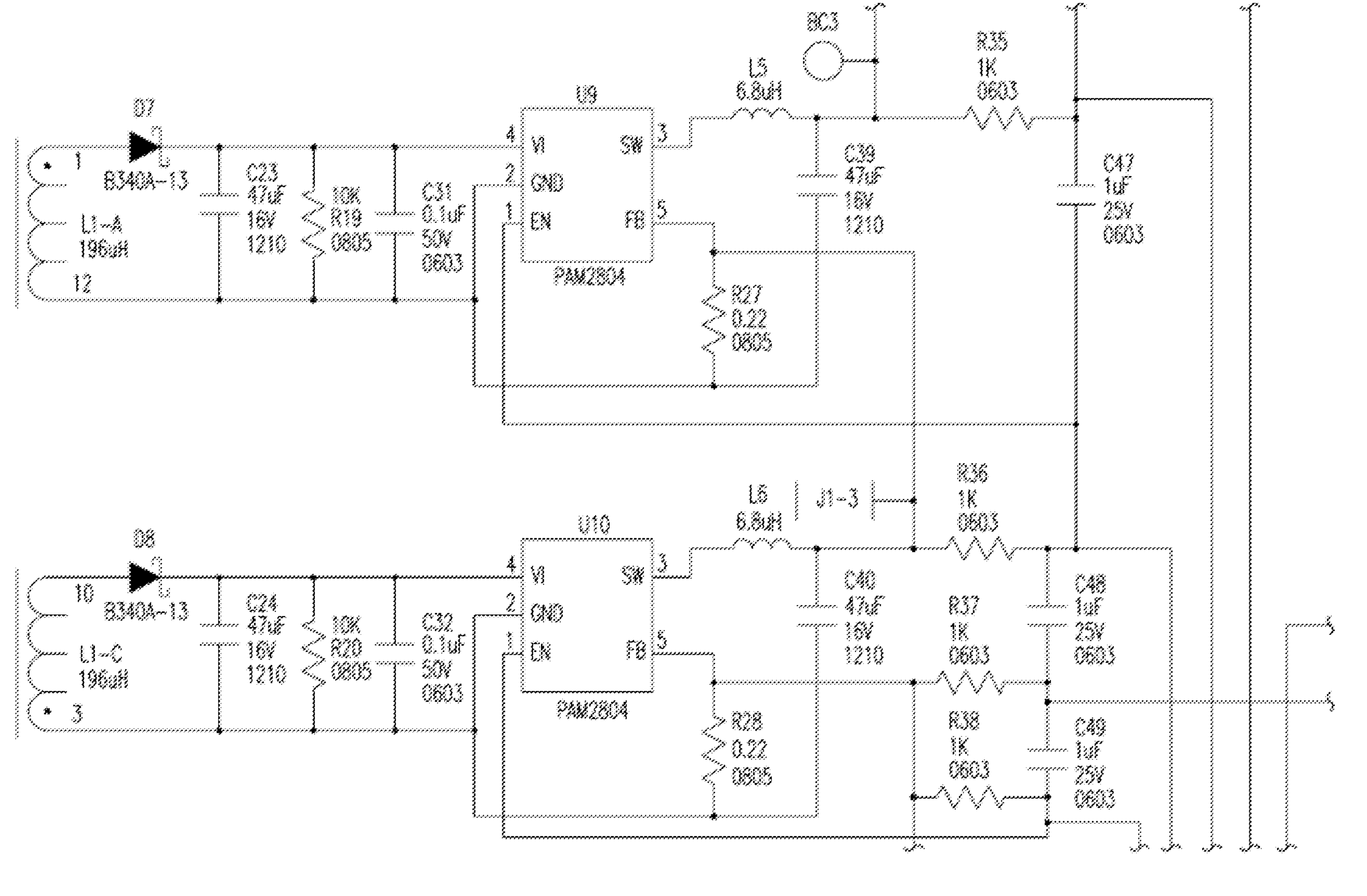
Figure 10G:
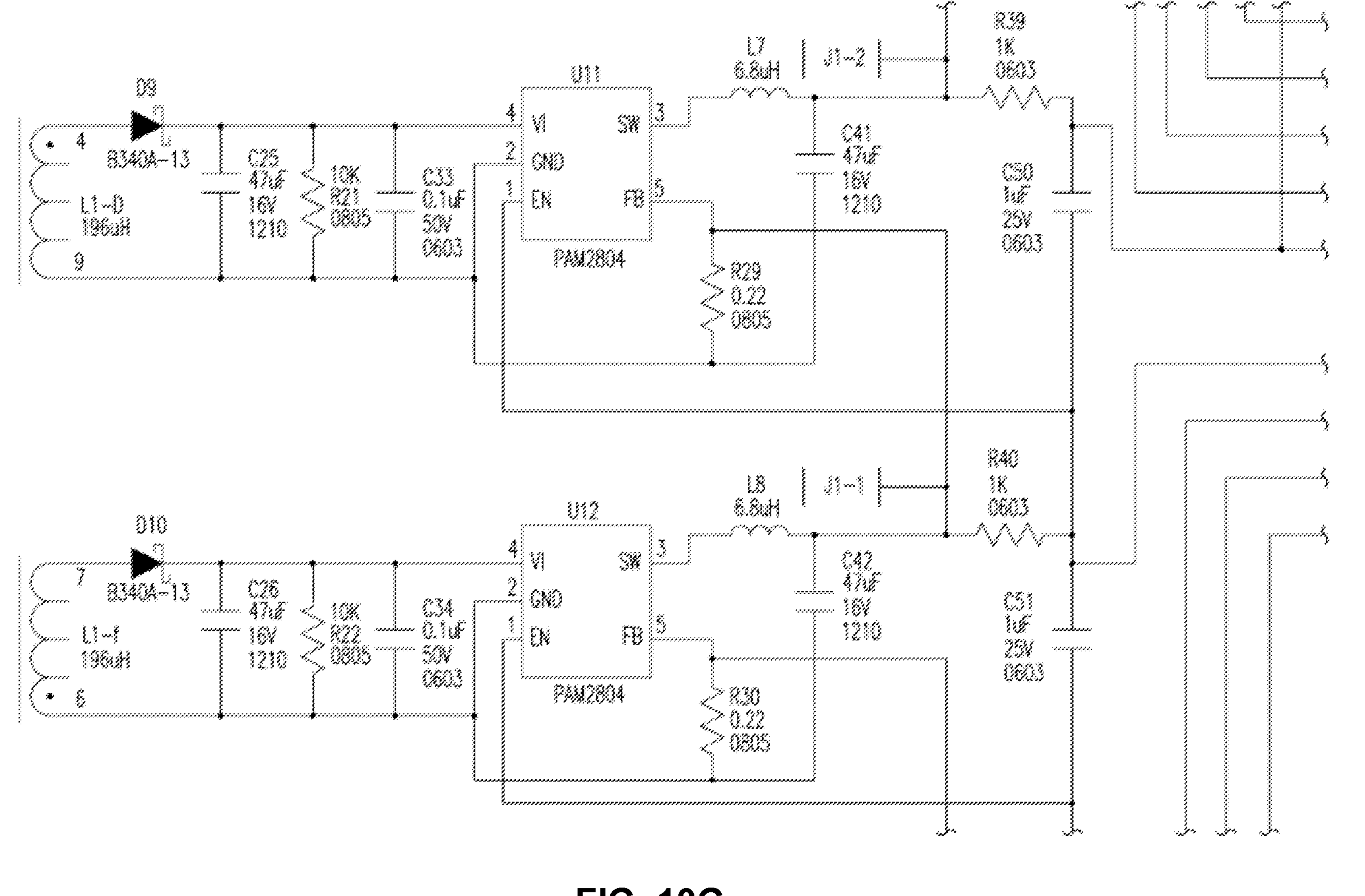
Figure 10H:
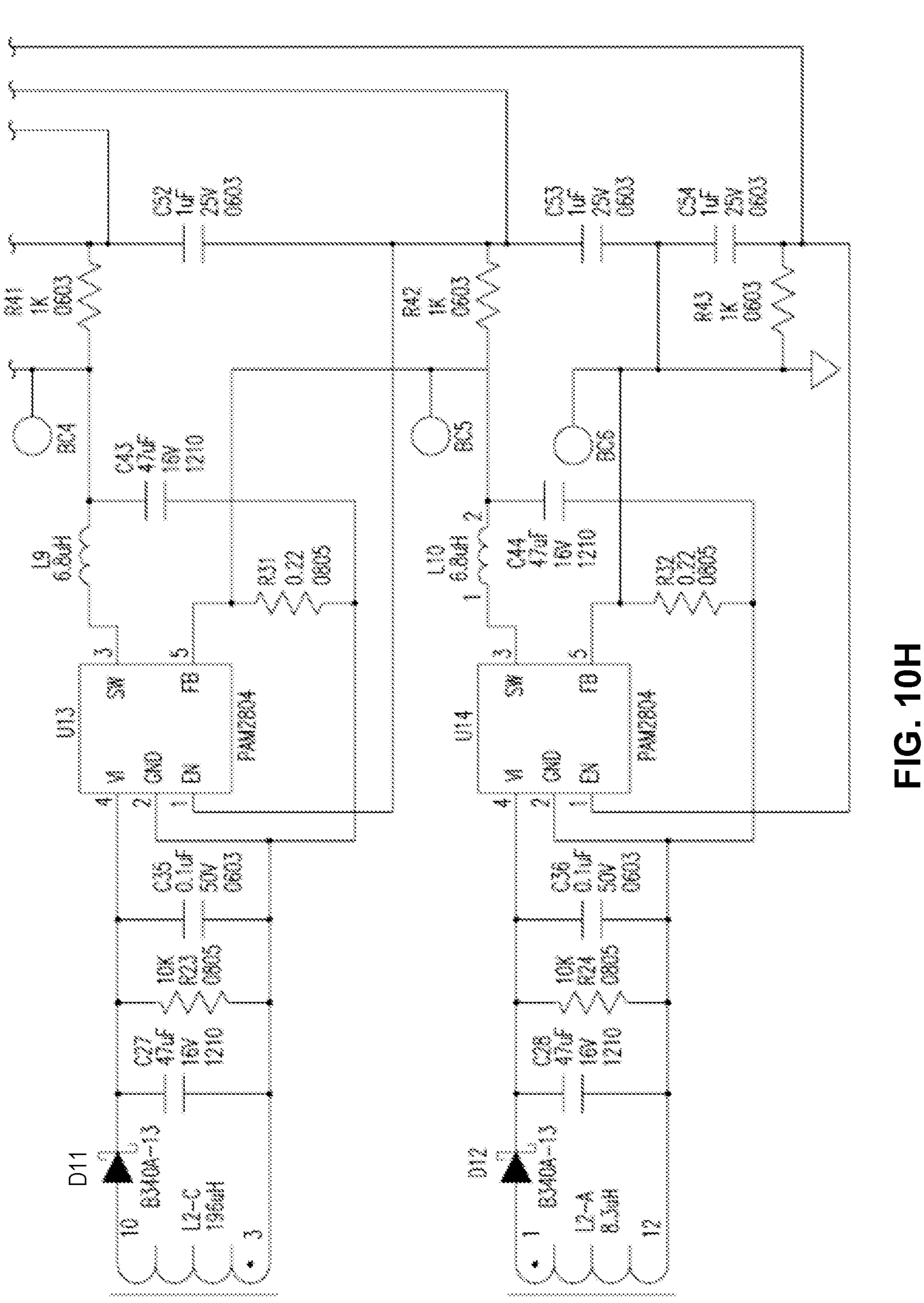
Figure 10I:
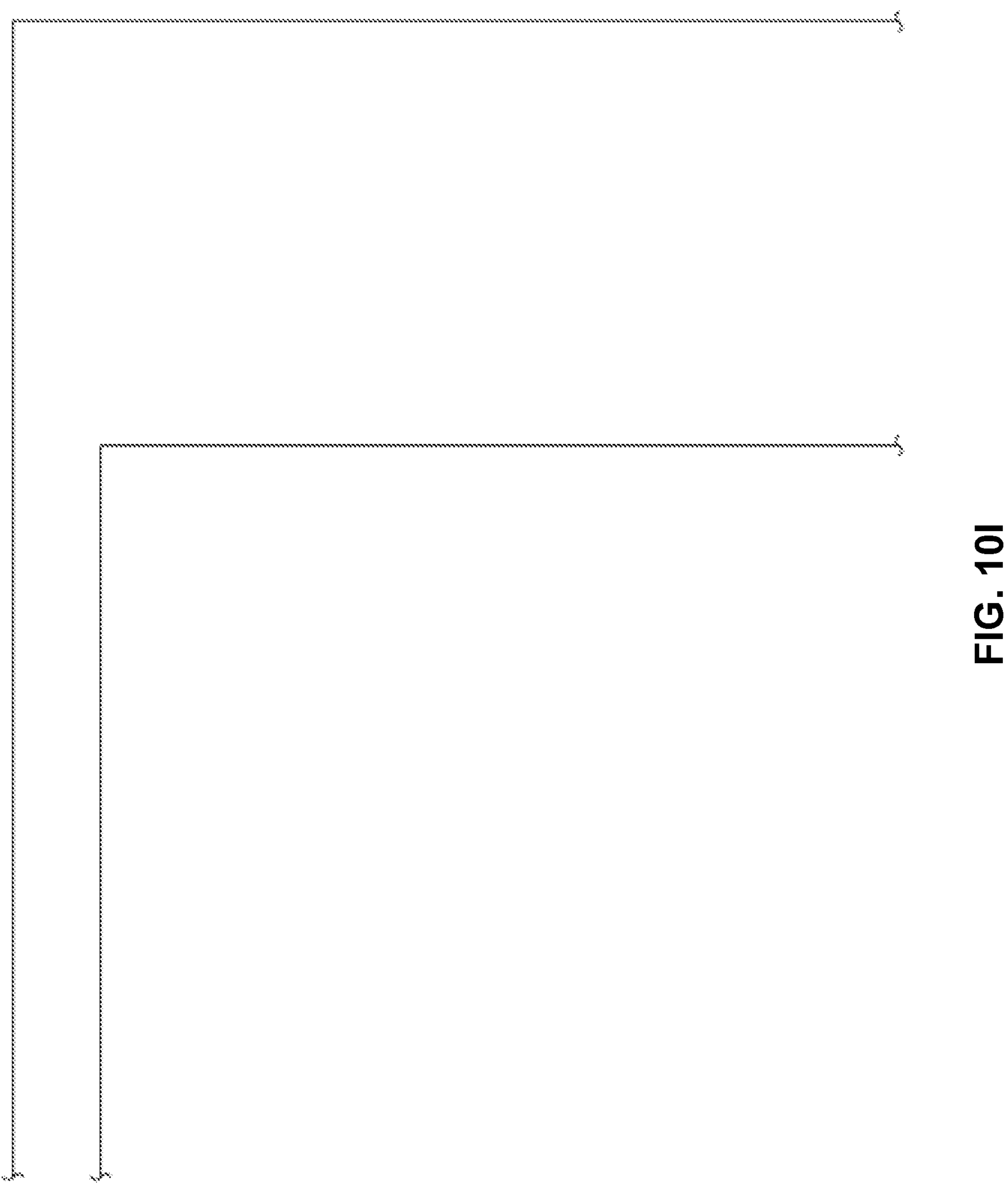
Figure 10J:
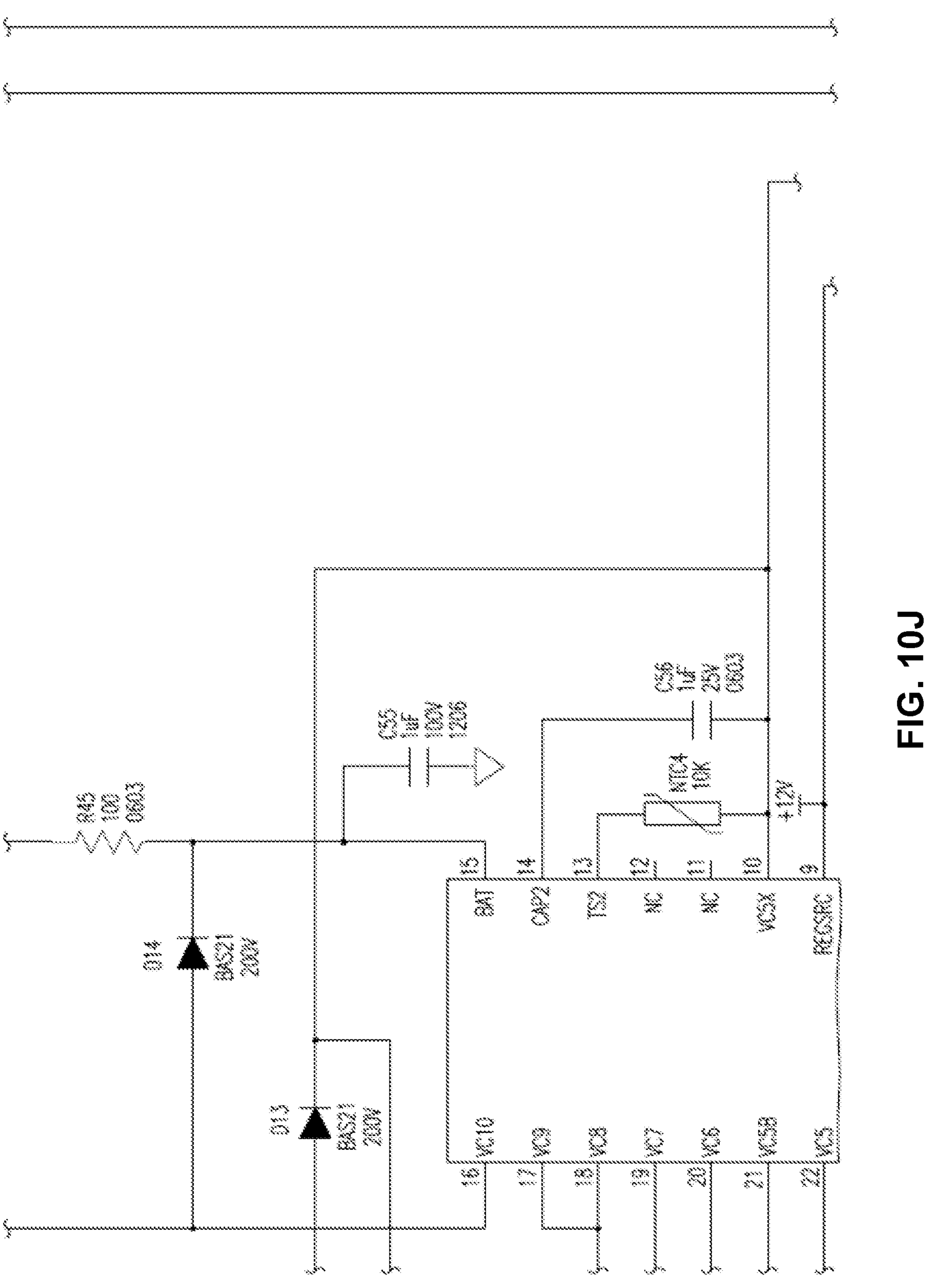
Figure 10K:
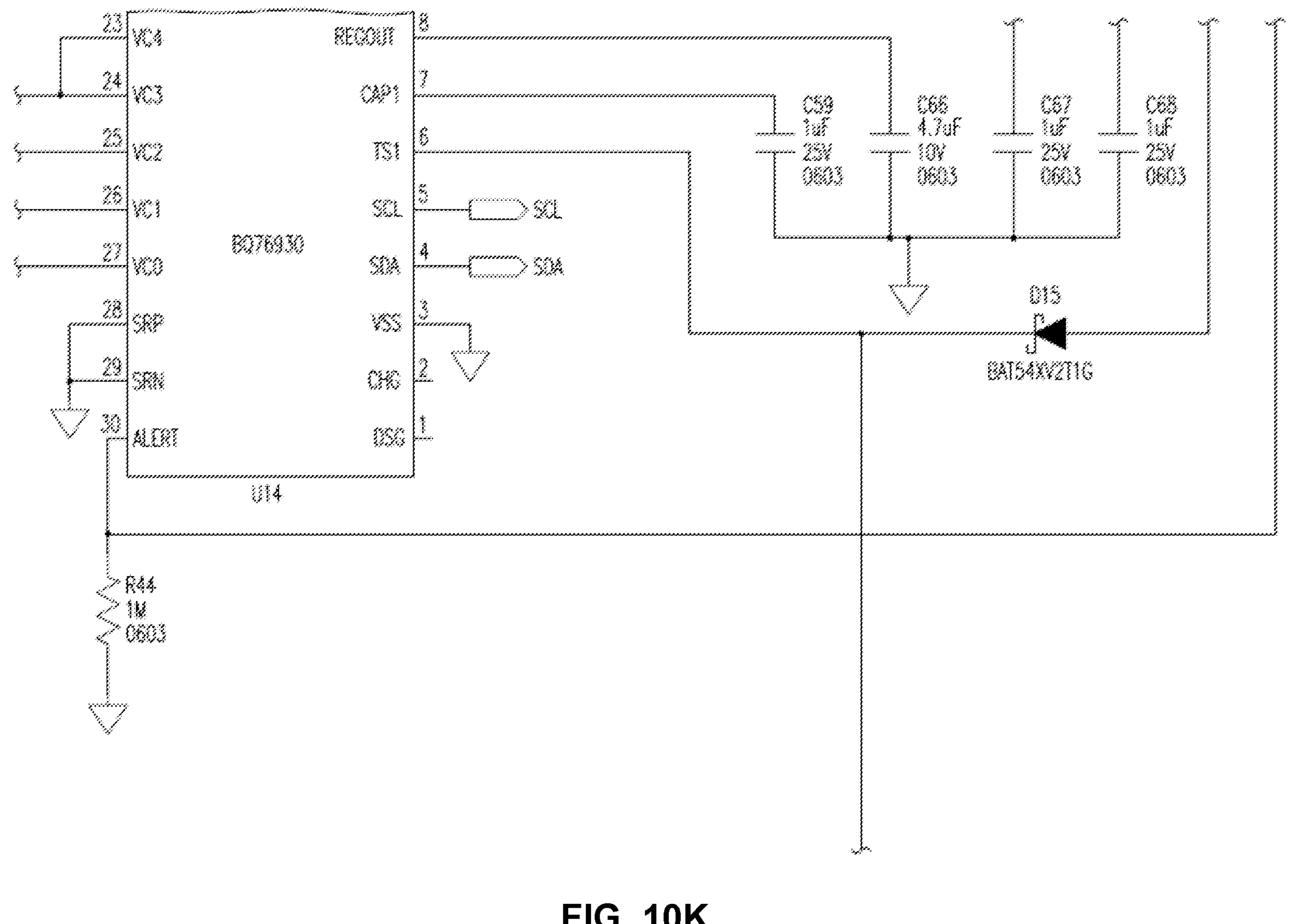
Figure 10L:
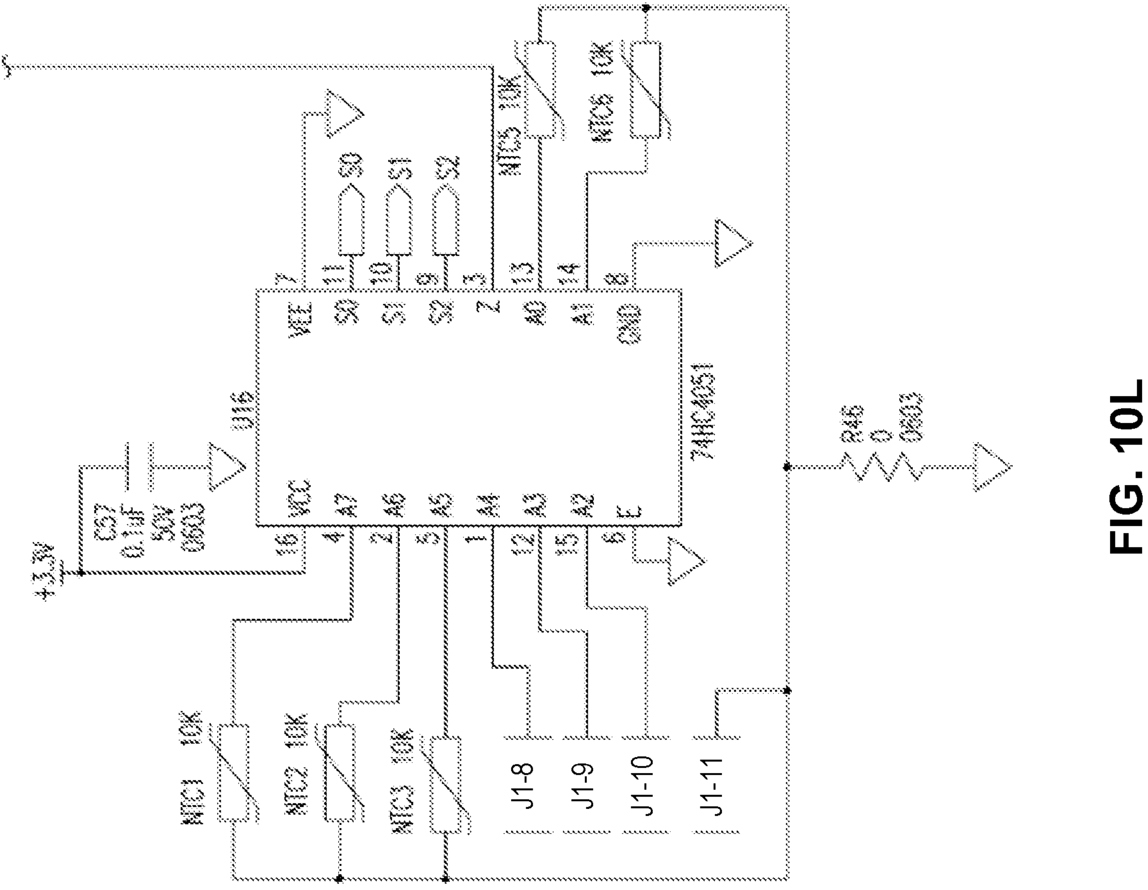
Figure 10M:
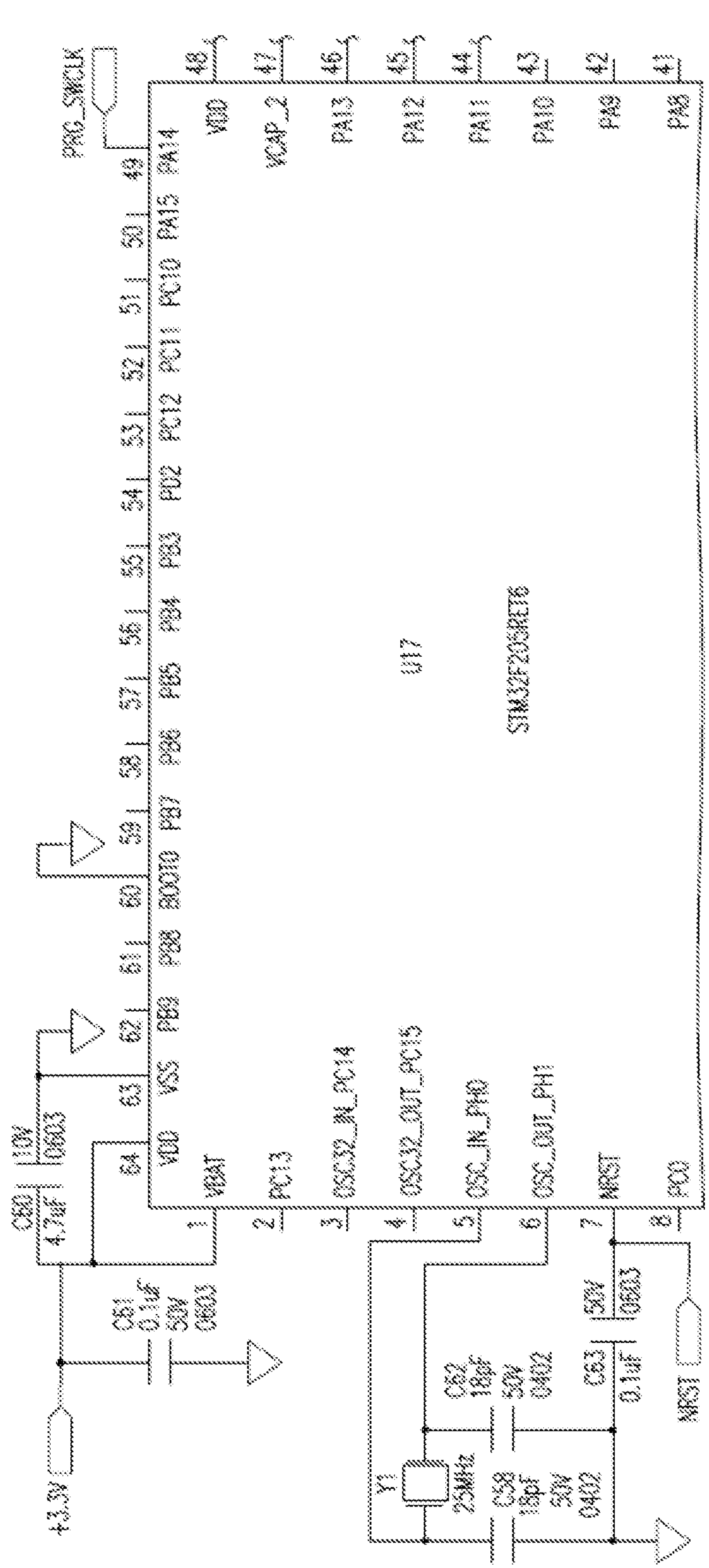
Figure 10N:
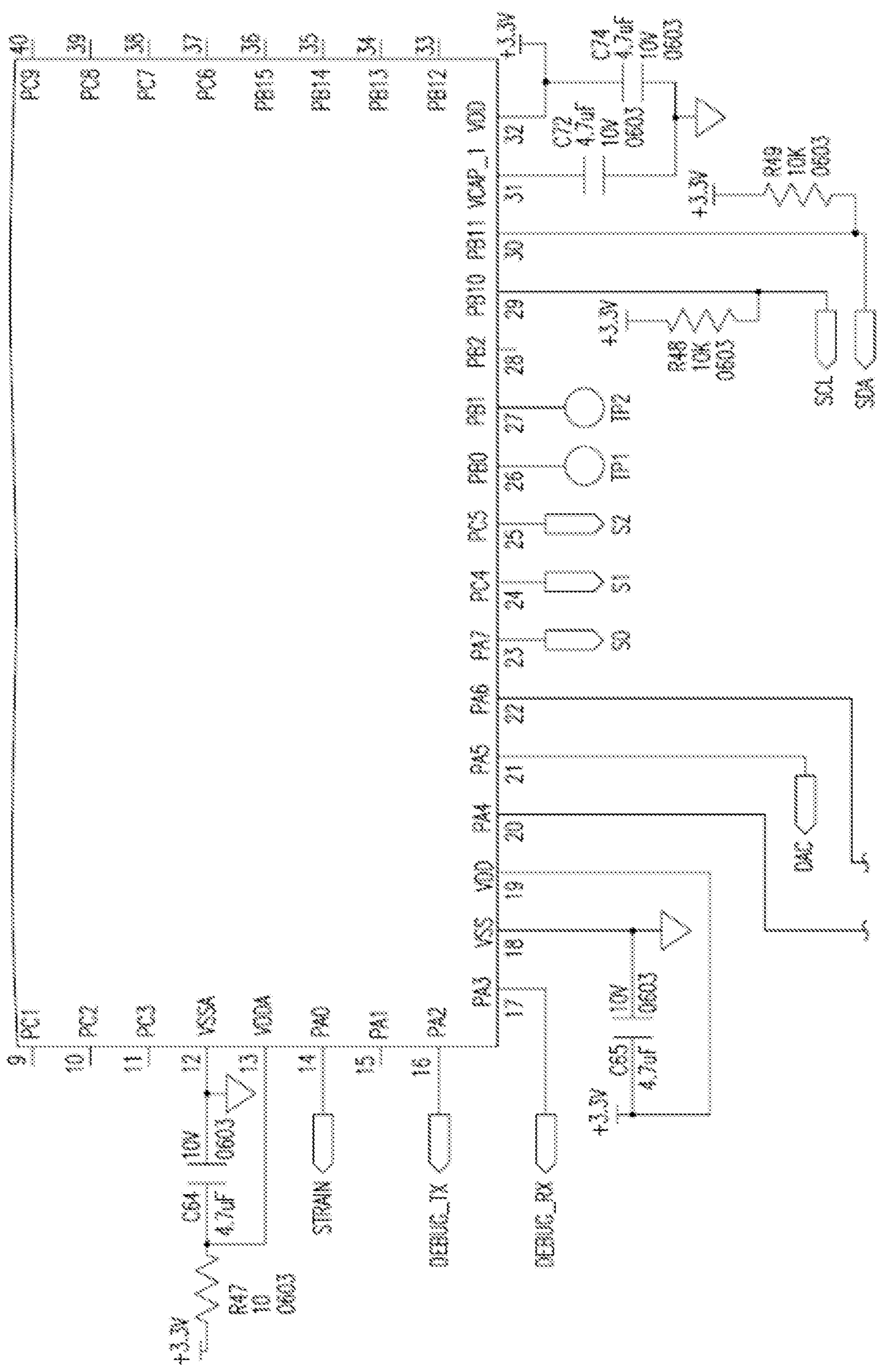
Figure 10P:
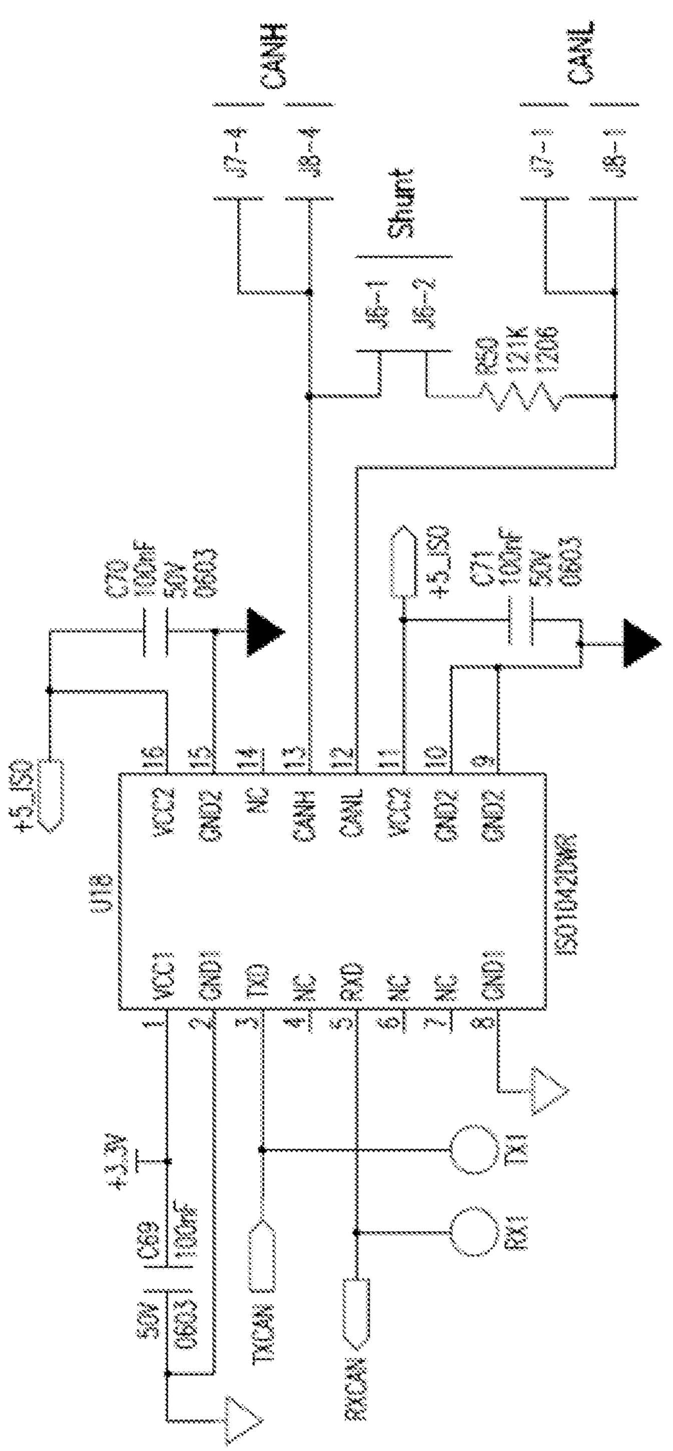
Figure 10Q:
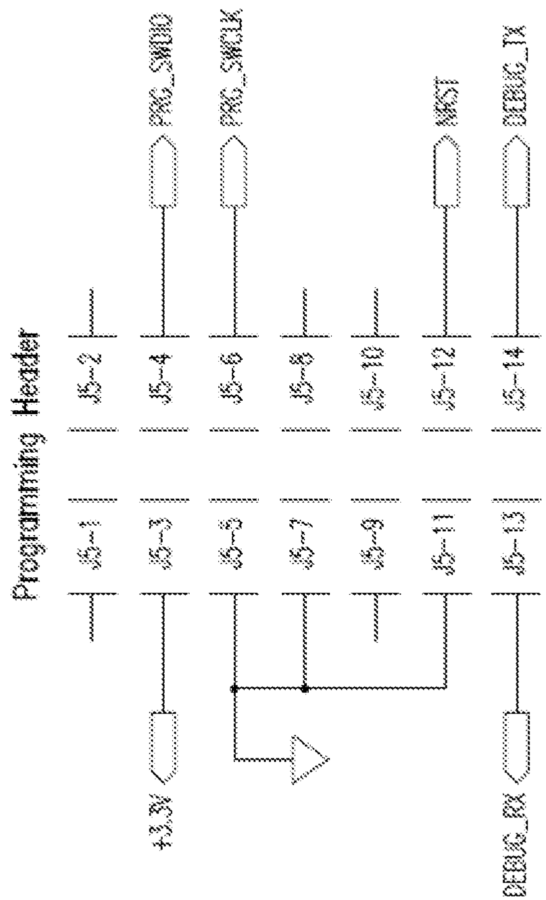
Figure 11A:
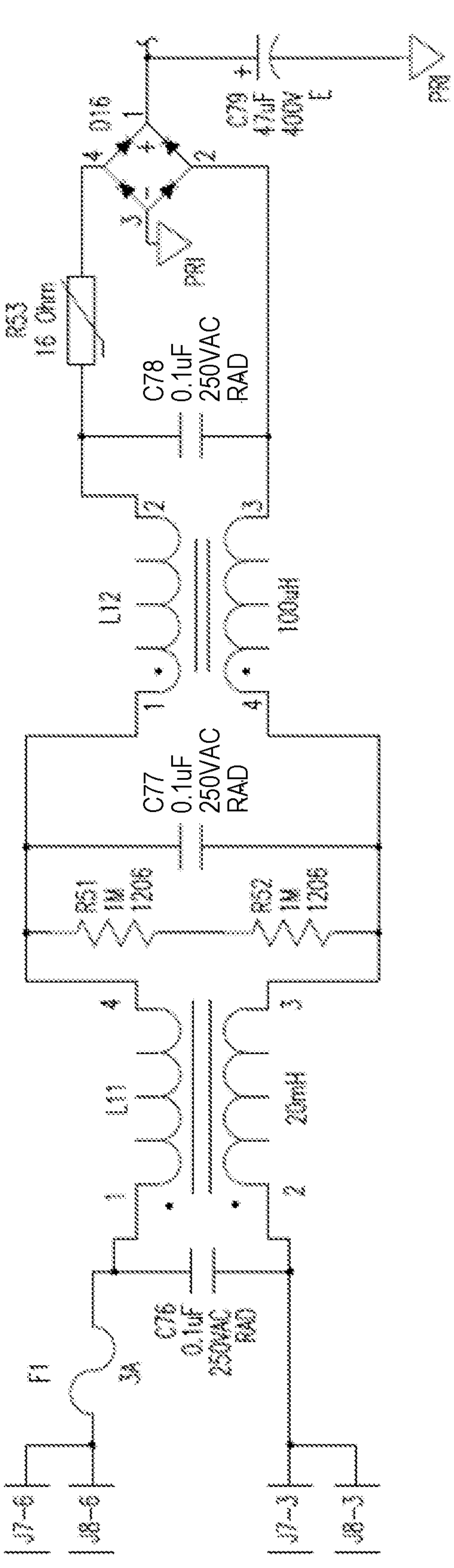
FIG. 11 (separated into partial views shown in FIGS. 11A-11D) illustrates an example power supply of a battery module controller according to an embodiment of the present invention.
Figure 11B:
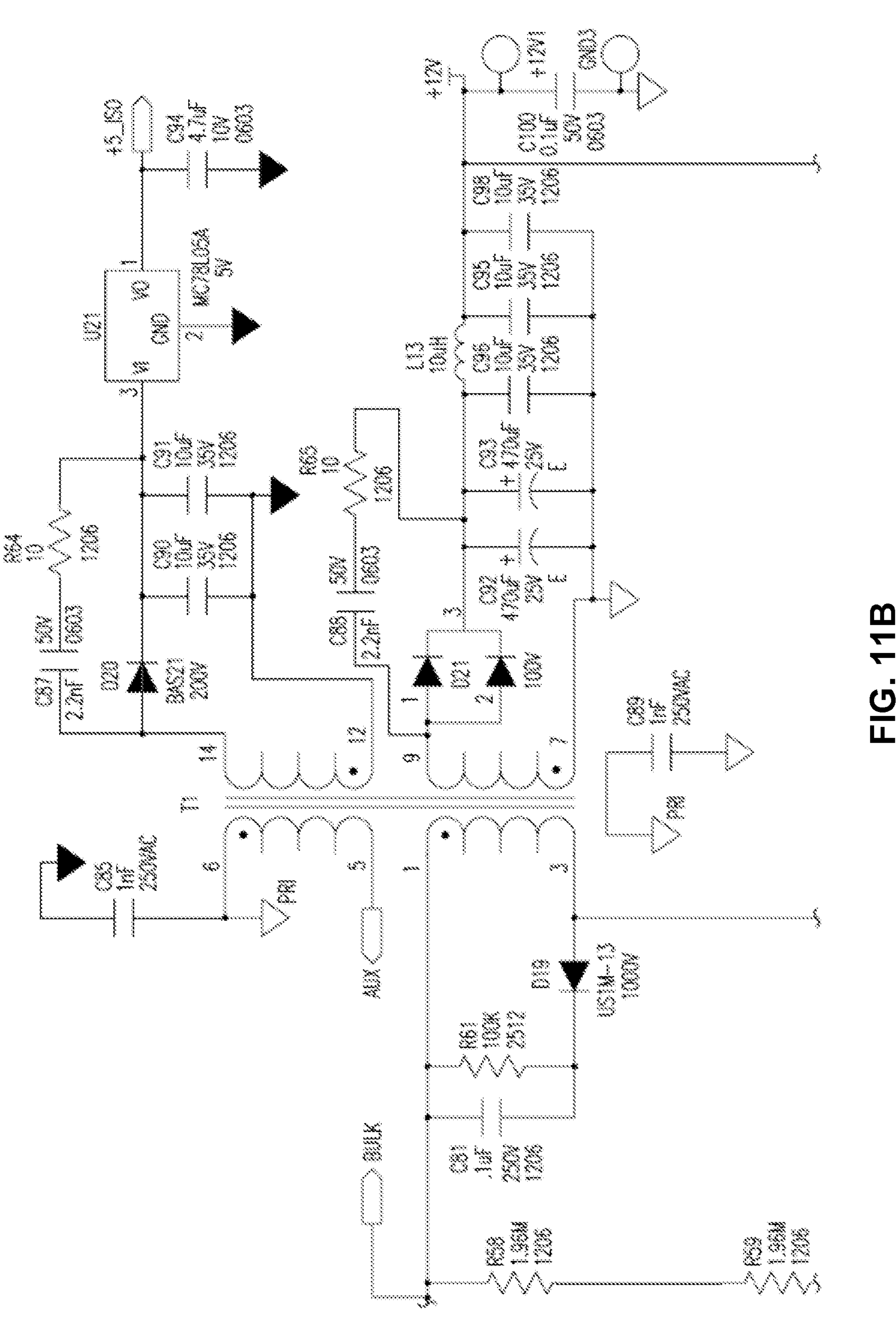
Figure 11C:
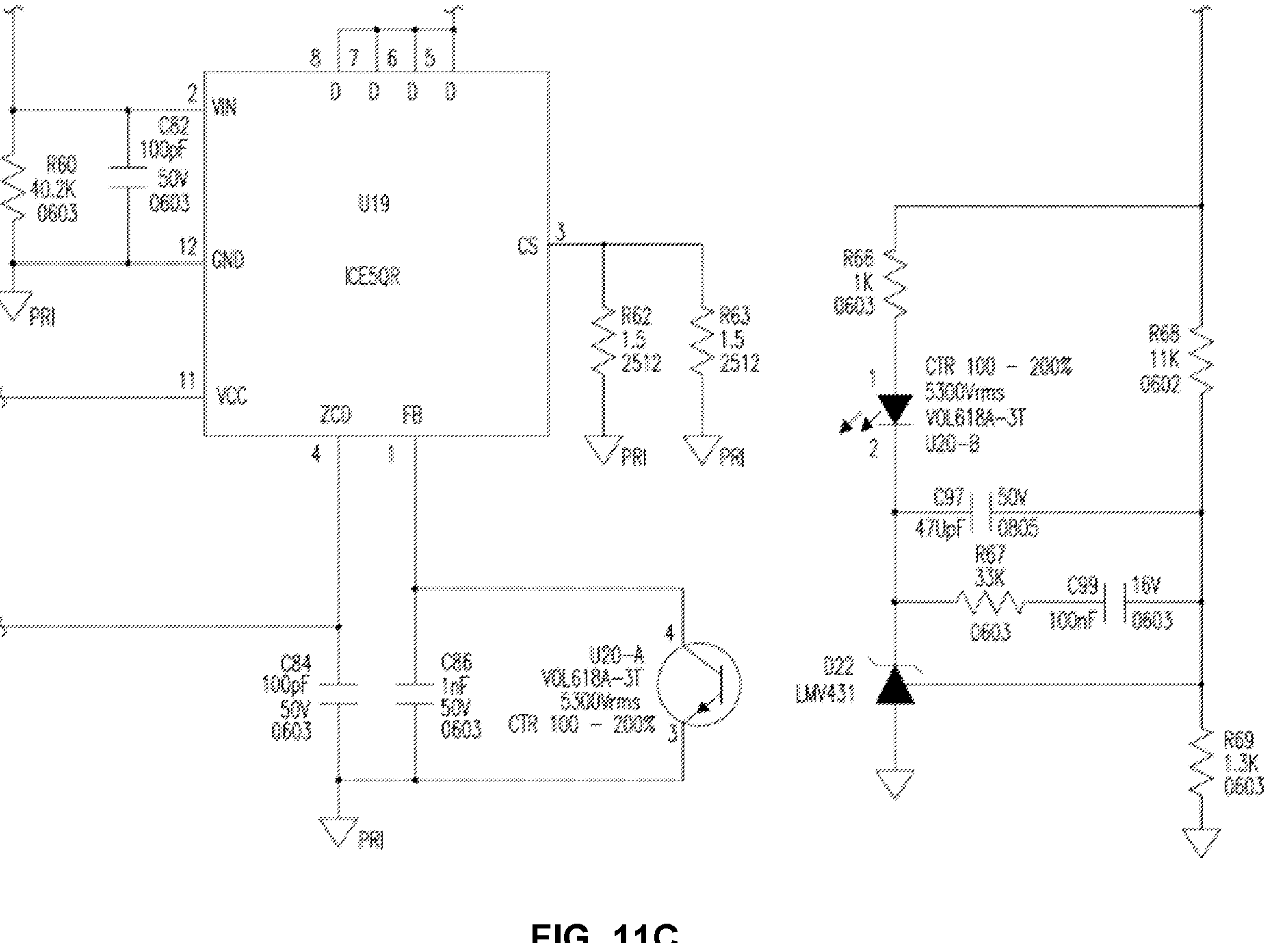
Figure 11D:
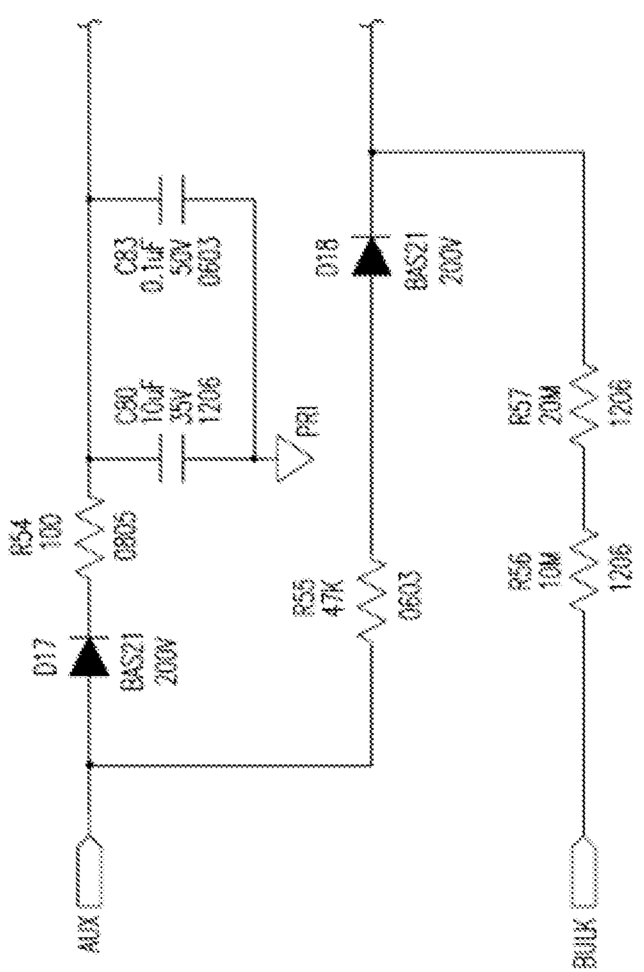

FIGS. 10 and 10A-Q illustrate a detailed circuit diagram for battery module controller 800 according to an embodiment of the present invention. As shown in FIGS. 10A-Q, in an embodiment, two convertors each drive a transformer that create four isolated outputs each. These eight outputs are used with a constant current circuit to charge battery cells in the battery module. Each of the battery cells is monitored for temperature. The circuit is controlled by a microprocessor and communicates to a higher-level controller using CANBus communications. The microprocessor also measures the voltage on each battery cell. The controller also includes circuits that measure the swelling/pressure of the battery cells.

FIGS. 11 and 11A-D show a detailed circuit diagram for power supply 804 according to an embodiment of the present invention. As shown in FIGS. 11A-D, power supply 804 includes a universal 100V-240V, 50 Hz/60 Hz input with circuits to limit EMI and inrush current. It also includes an off-line quasi-resonant switch mode power supply. AC power is supplied to a connector and passes through a fuse and the EMI filter. The input voltage is then rectified and stored on a capacitor. The power supply controller causes energy to be stored as magnetic flux in the transformer where it is intermittently removed by two isolated output diodes. In an embodiment, the power supply circuit produces +5V and +12V that are dielectrically isolated from each other as well as the input. An optocoupler is used to sense and regulate the output voltage.

Figure 12:
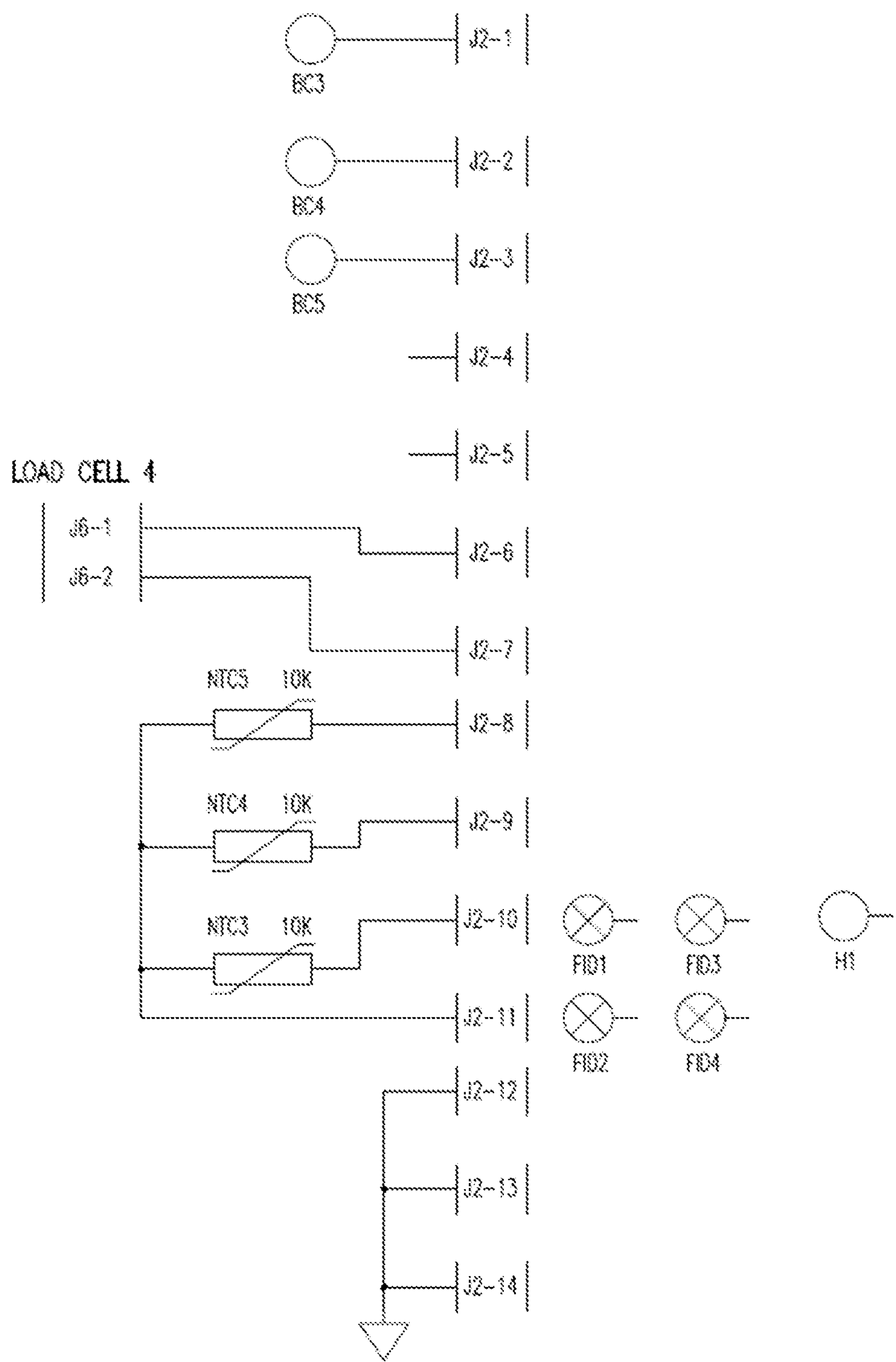
FIG. 12 illustrates an example connector for a battery module controller according to an embodiment of the present invention.

FIG. 12 illustrates an example connector for a battery module controller according to an embodiment of the present invention. In embodiments, it is used for example as can be seen in FIG. 8 to connect circuits on a circuit board 316*b* to circuits on a circuit board 316*a*.

Figure 13:
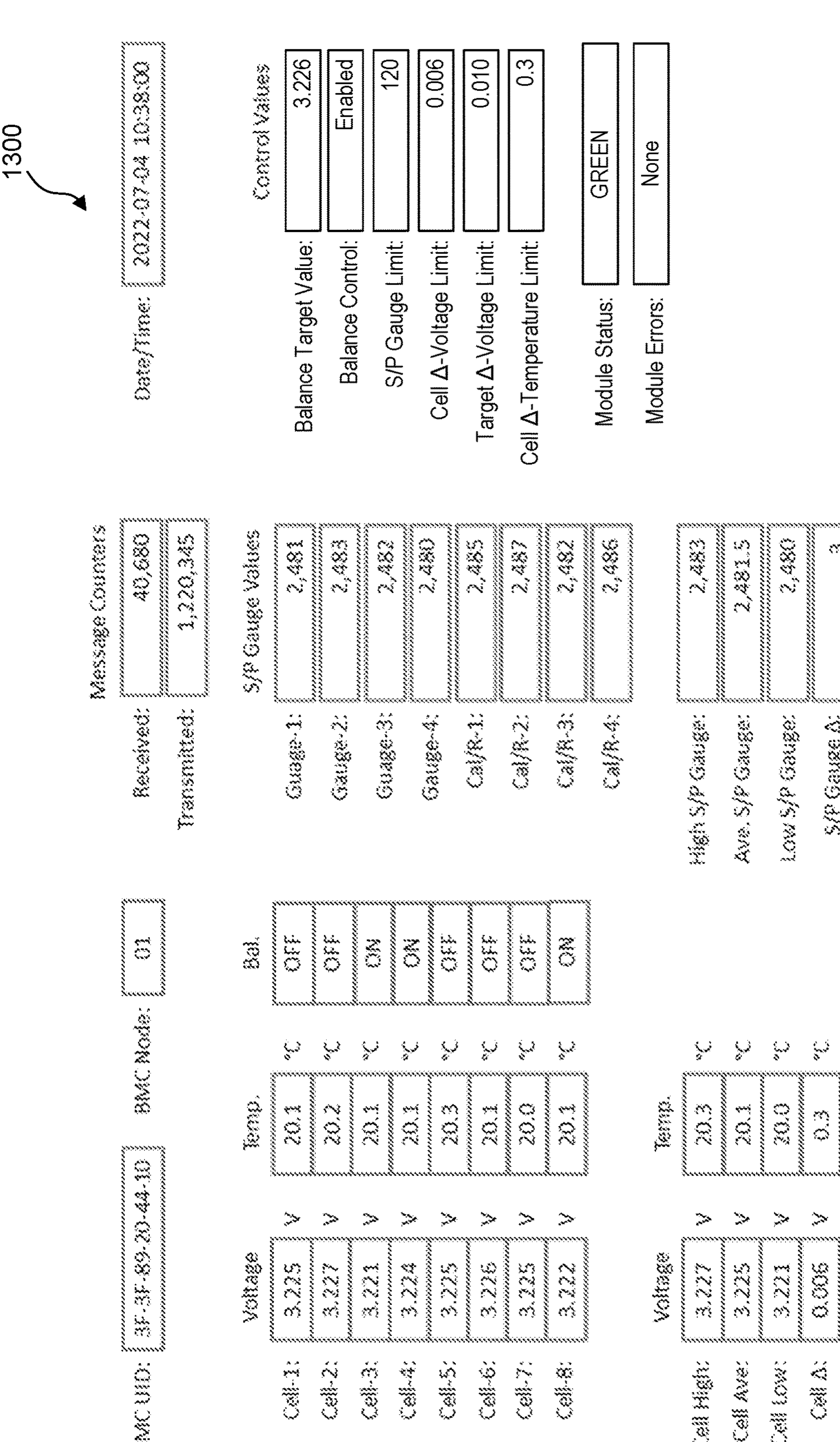
FIG. 13 illustrates an example battery module controller graphical user interface according to an embodiment of the present invention.

FIG. 13 illustrates an example battery module controller graphical user interface (GUI) 1300 according to an embodiment of the present invention. The values displayed on GUI 1300 illustrate the firmware and/or software running on battery module controllers described herein, such as for example, battery module controller 800.

Starting in the top left corner of GUI 1300, the GUI displays a unique ID (BMC UID) for the battery module controller and a Node ID. In embodiments, the unique ID is the serial number of the processor of the battery module controller. The Node ID is an assigned ID used to identify the battery module controller CANBus messages sent to a higher-level battery rack or battery system controller.

Below the identification fields in GUI 1300 are the fields displaying the battery cell voltages, battery cell temperatures, and the battery cell balancing states. In embodiments, the cell voltages are displayed in millivolts. The cell temperatures are displayed in tenths of a degree Celsius. The balancing state is either on, meaning the cell is currently balancing, or off, meaning the cell is not currently balancing. Below these fields are the cell high, average, and low voltage and temperatures fields. In order to reduce the number of messages normally sent by the battery module controller to the higher-level controller, in embodiments the battery module controller sends these calculated values rather than the measured values. These calculated values are sufficient to safely monitor and manage the battery cells. Also shown are fields for the highest cell voltage and temperature; the average cell voltage and temperature; the lowest cell voltage and temperature; and the difference between the highest cell voltage and cell temperature and the lowest cell voltage and cell temperature, respectively.

At the top middle section of GUI 1300, two fields display the number of messages received by the battery module controller and the number of messages sent by the battery module controller. These displayed message counts show that the battery module controller is active and communicating.

Below the message count fields are the swelling/pressure (S/P) gauge values and the gauge calibration values. The S/P gauge values are used to determine whether any of the battery cells have an issue and thus indicate that the battery module should be disconnected from the battery system DC bus to prevent a battery fire. A battery cell will swell, for example, due to the liquid electrolyte in the battery cell decomposing into explosive and hazardous gases before it vents and catches on fire. Thus, in embodiments of the present invention, the battery management system continuously monitors every battery module for swelling and/or the presence of increased pressure in one or more cells of a battery module, and when this is detected, the battery module is disconnected from the battery system so that it can no longer be charged and/or discharged in order to prevent further damage to a battery cell and to prevent a battery fire.

As described, for example, with reference to FIGS. 10A-Q, in embodiments of the present invention, one or more calibration resistors are measured and used to calibrate the S/P gauge values obtained by the battery module controller. These calibration measurements ensure the accuracy of the S/P gauge values used to monitor for battery cell swelling or the presence of increased pressure in one or more cells of a battery module. The last field in the middle section of GUI 1300 shows the highest S/P gauge reading; the average S/P gauge reading; the lowest S/P gauge reading; and the difference between the highest S/P gauge reading and the lowest S/P gauge reading.

On the top right side of GUI 1300, the date and time of the last data received from the battery module controller is displayed. This date and time will continually update and is an indication of how old the data is that is displayed on the GUI.

Below the date and time values are several fields displaying control values and status values. The control values include a balance target value, a balance control value, an S/P gauge limit value, a cell voltage difference limit value, a target cell voltage difference limit value, and a cell temperature difference limit value. The balance target value is the value that the battery module controller uses to control battery cell balancing. The balance control value indicates whether battery cell balancing is enabled or disabled. The three limit values (i.e., S/P gauge limit, cell A-voltage limit, and cell A-temperature limit) are used to determine whether the battery module is operating in a safe and desired condition. The module status value gives a quick indication of the overall operating status of the battery module (such as "GREEN" to indicate the battery module is operating properly, "YELLOW" to indicate the batter module has a minor operating issue, and "RED" to indicate the battery module has a major operating issue), and the module error field will display an error code to indicate whether there are any current issues with the battery module.

Figure 14A:
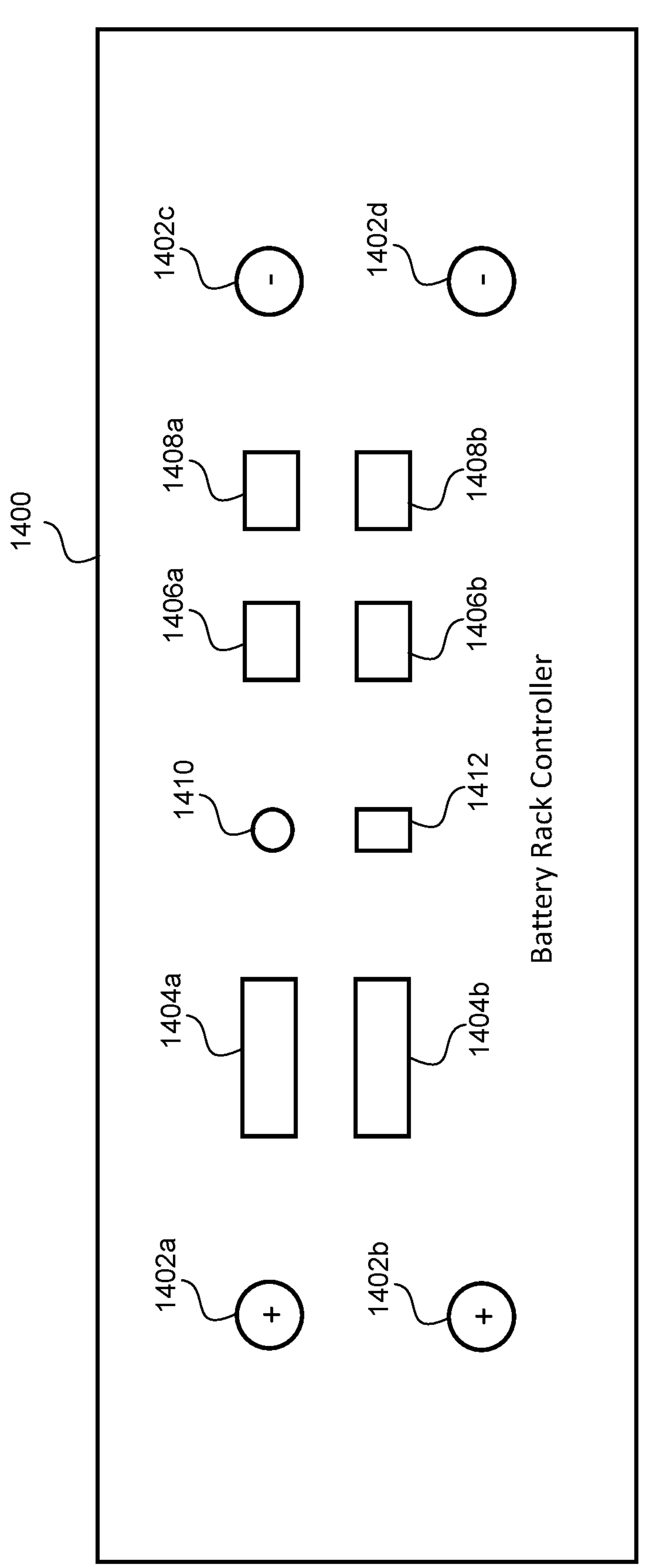
FIGS. 14A-B illustrate an example battery rack controller according to an embodiment of the present invention.
Figure 14B:
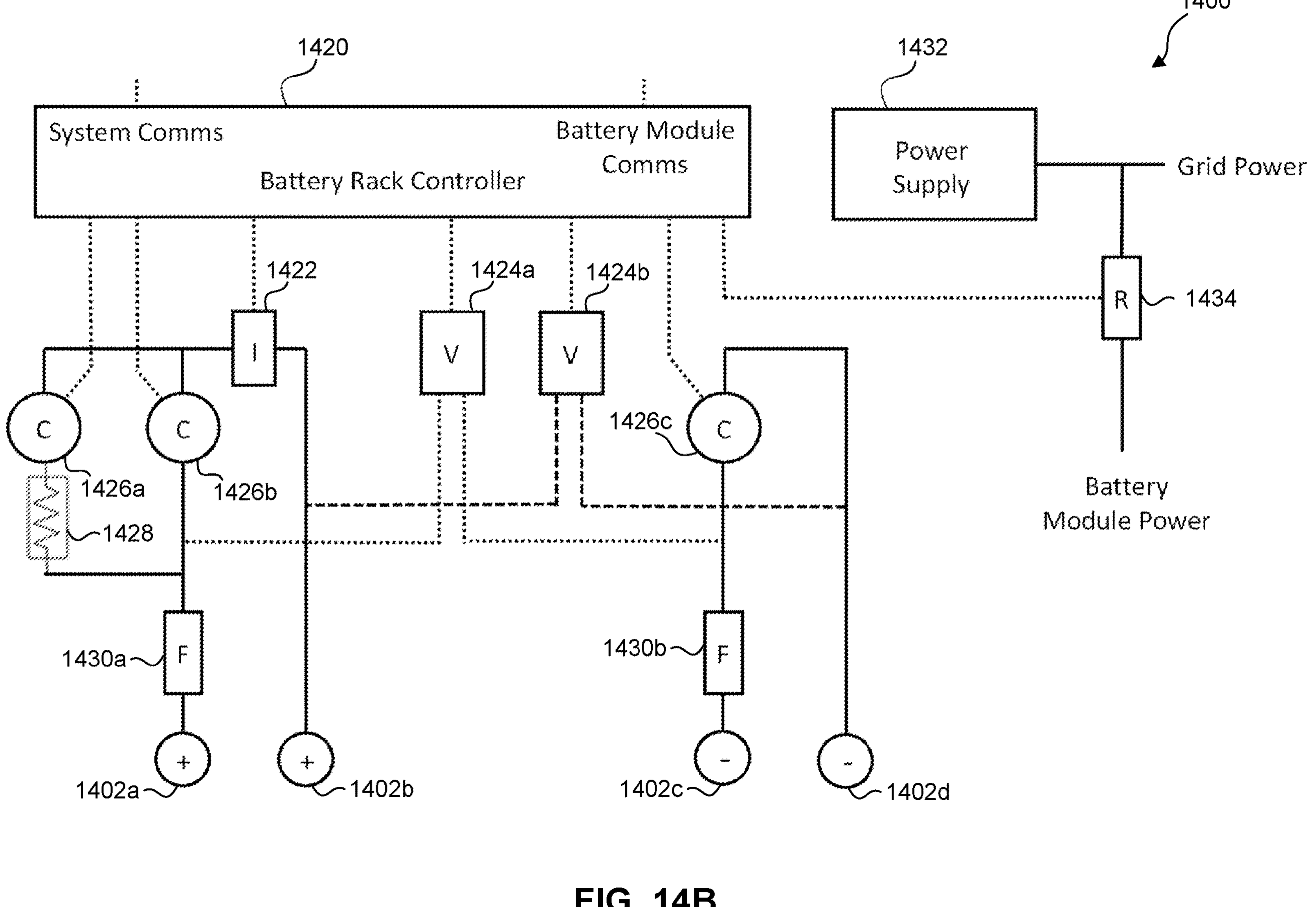

FIGS. 14A-B illustrate an example battery rack controller 1400 according to an embodiment of the present invention. As shown in FIG. 14A, battery rack controller 1400 includes four DC power connectors 1402*a*-1402*d*, two AC power connectors 1404*a*-1404*b*, two system level communications connectors 1406*a*-1406*b*, two battery module communications connectors 1408*a*-1408*b*, a status indicator 1410, and a power switch 1412. Battery rack controller 1400 can control a plurality of battery modules, for example, battery modules 100, as shown in FIG. 16 and FIGS. 18A-C and described below.

The DC power connectors 1402*a*-1402*d* are used to connect the battery modules of the battery rack to a DC bus of a battery energy storage system. In an embodiment, DC power connectors 1402*a* and 1402*c* connect battery rack controller 1400 to the energy storage system DC bus. Power connectors 1402*b* and 1402*d* connect battery rack controller 1400 to the battery modules that make up the battery rack. AC grid power is provided to battery rack controller 1400 using AC power connector 1404*a*. This power is then provided to the battery modules using AC power connector 1404*b*.

System level communications connectors 1406*a*-1406*b* are used to communicate to a higher-level energy storage system controller. In an embodiment, these communications are conducted using TCP/IP communications. Battery module communications connectors 1408*a*-1408*b* are used to communicate with the battery modules of the battery rack. In an embodiment, these communications are conducted using CANBus communications. In one embodiment, CAN-open communications are used.

In embodiments of battery rack controller 1400, when powered-on, status indicator 1410 shows the status of the battery rack, for example, by a green light indicating everything is operating correctly, or by a yellow or a red light indicating that the battery rack has a minor or a major operating issue. Power switch 1412 is used to turn-on and turn-off power to battery rack controller 1400.

FIG. 14B further illustrates battery rack controller 1400 according to an embodiment of the present invention. As shown in FIG. 14B, battery rack controller 1400 includes a battery rack controller circuit board 1420, a current meter 1422, two voltage meters 1424*a*-1424*b*, three contactors 1426*a*-1426*c*, a power resistor 1428, and two fuses 1430*a*-1430*b*. Battery rack controller circuit board 1420 includes a microcontroller unit that runs firmware and/or software that implements the functions of battery rack controller 1400. These functions include measuring the battery rack current, battery rack voltage, and communication data with the battery module controllers and the battery energy storage system controller. In operation, battery rack controller circuit board 1420 opens and closes contactors 1426 to connect the battery modules to the battery system DC bus. Contactor 1426*a* and power resistor 1428 are used for pre-charging and matching the voltage of the battery rack to the DC system bus before contactor 1426*b* is closed. If during operation an abnormal current or abnormal voltage is detected by current meter 1422 or one of the two voltage meters 1424*a*-1424*b*, then battery rack controller circuit board 1420 opens the contactors 1426 to isolate the battery rack from the DC system bus until the abnormal condition is corrected. Fuses 1430*a*-1430*b* are included in case of a short circuit or other overcurrent issue. In embodiments, fuses 1430 are very fast acting fuses.

As shown in FIG. 14B, battery rack controller 1400 includes a power supply 1432 to power the components of battery rack controller 1420. The power for this power supply is grid power. A relay 1434, controller by battery rack controller circuit board 1420 controls the supply of the grid power to the battery modules of the battery rack. In an embodiment, the opening and closing of relay 1434 can be used if needed to reset the battery module controllers of the battery modules that make up the battery rack.

Figures 15A, 15B:
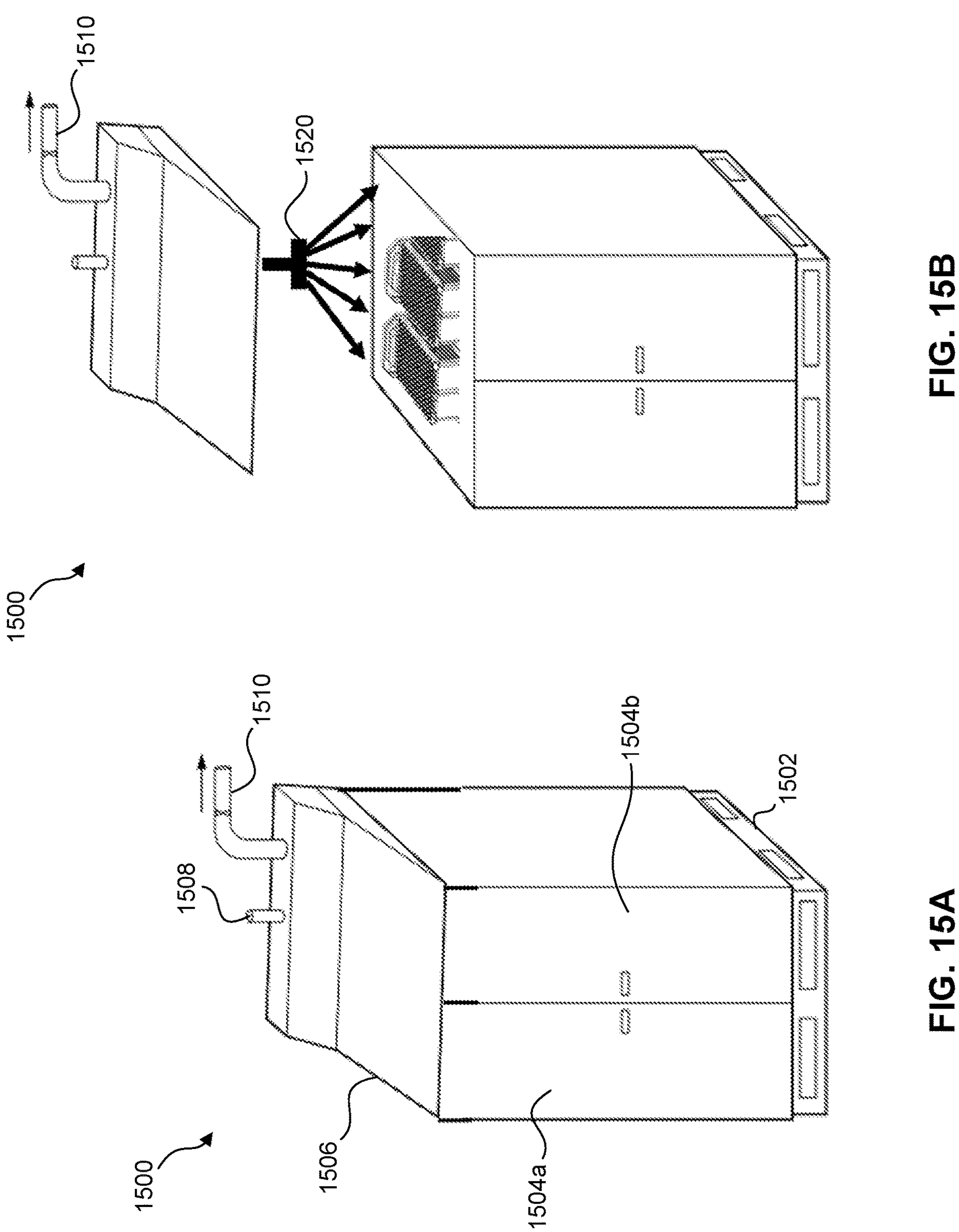
FIGS. 15A-B illustrate an example battery rack according to an embodiment of the present invention.

FIGS. 15A-B illustrate an example battery rack 1500 according to an embodiment of the present invention. As shown in FIG. 15A, battery rack 1500 includes a base 1502, doors 1504*a*-1504*b*, a hood 1506, a water suppression system 1508, and exhaust ducting 1510. Base 1502 can be used to move and position battery rack 1500, for example, using a forklift truck. The doors 1504*a*-1504*b* allow people to access the battery modules and battery module controller housed inside the battery rack enclosure. Hood 1506 provides space at the top of the battery rack for the fire suppression system sprinkler head(s). Exhaust ducting 1510 is used to draw air through the battery rack and cool the battery modules. It also is used to direct heat and any gases, for example, in the event that a battery cell vents, outside of the container or room in which the battery rack is located. In embodiments, fan(s) for moving air through the battery rack are located in the exhaust ducting 1510, which makes replacing a fan easy and which is a better design than including many small fans inside the enclosure as a part, for example, of the battery modules.

As shown in FIG. 15B, one or more sprinkler heads 1520 are located inside battery rack 1500. In the event of a fire, the sprinkler heads activate and spray water directly inside battery rack 1500. This water is collected by the top tray of the battery modules, and the water is then directed to flow down through the center plates of the battery modules and over the side plates of the battery module to extinguish the fire and cool surrounding battery modules, so the fire does not spread to other modules and so the module having the issue does not catch on fire a second time. If a battery were to vent and possibly catch on fire, the heat and gases would be removed from the battery rack via exhaust ducting 1510.

Figure 16:
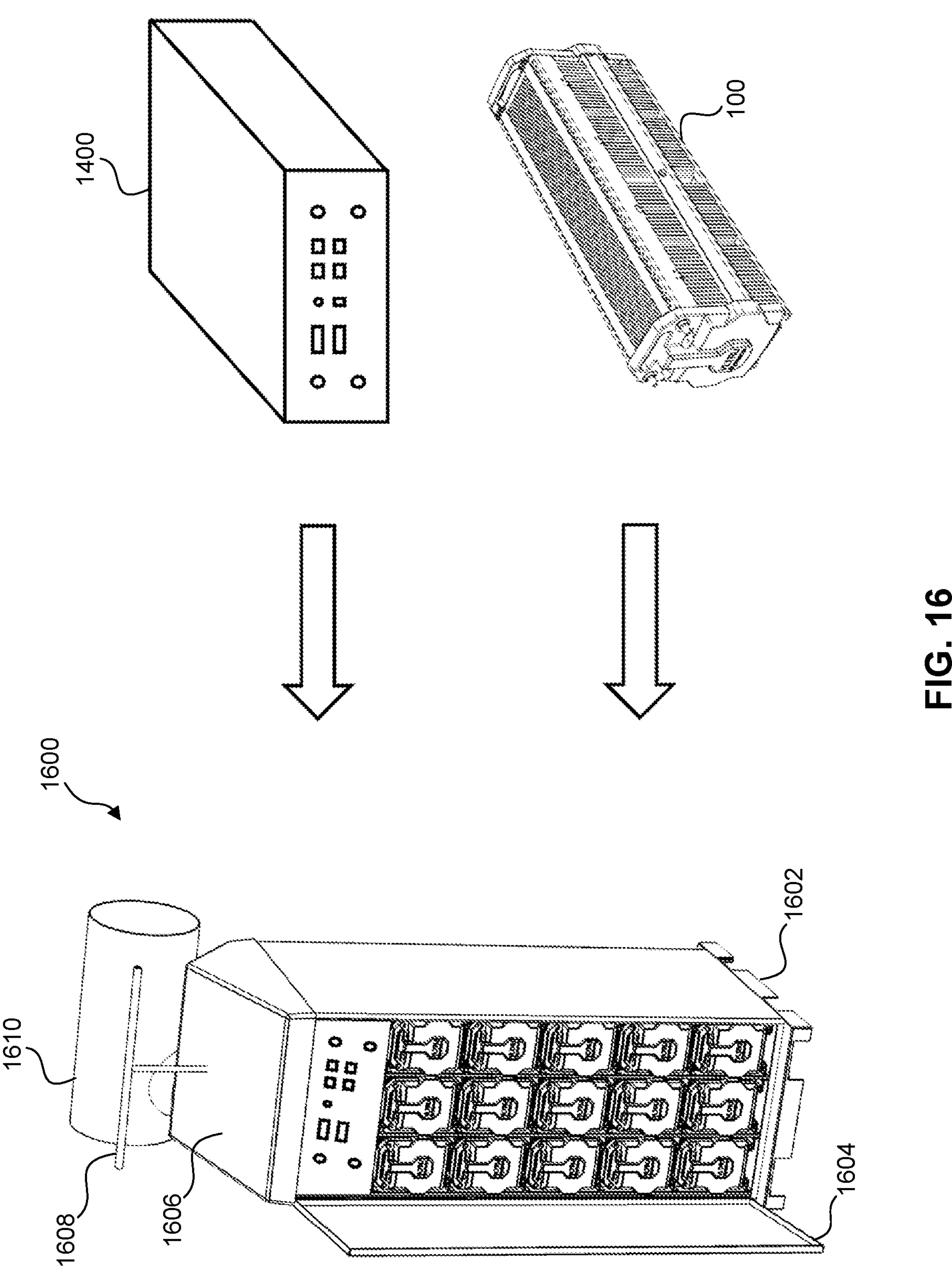
FIG. 16 illustrates an example battery rack according to an embodiment of the present invention.

FIG. 16 illustrates an example battery rack 1600 according to an embodiment of the present invention. As shown in FIG. 16, battery rack 1600 includes a base 1602, a door 1604, a hood 1606, a water suppression system 1608, and exhaust ducting 1610. Base 1602 can be used to move and position battery rack 1600, for example, using a forklift truck. The door 1604 allows people to access the battery modules 100 and battery module controller 1400 housed inside the battery rack enclosure. Hood 1606 provides space at the top of the battery rack for the fire suppression system sprinkler head(s). Exhaust ducting 1610 is used to draw air through the battery rack and cool the battery modules. It also is used to direct heat and any gases, for example, in the event that a battery cell vents, outside of the container or room in which the battery rack is located. In embodiments, the fan(s) for moving air through the battery rack are located in the exhaust ducting 1610, which makes replacing a fan easy and which is a better design than including many small fans inside the enclosure as a part, for example, of the battery modules 100.

Battery rack 1600, as well as other battery racks described herein, allows water (or other fluid) from a commercial fire sprinkler system (for example, see FIG. 19), provided by one or more sprinkler heads located inside the top of the battery rack, to flow down like a cascading waterfall over the battery modules 100 to provide cooling and fire suppression. Water flows down on the tops of the battery module, where it is collected/gathered by a plastic top having a berm located on the top of the battery modules. This water flows down through the middle plate and over the side plates or heat sinks of each of the battery modules or battery cell assemblies and cools the battery cells. As the water exits the middle plate, it is collected/gathered by the battery module below and can then flow through this battery module's middle plate and over the side plates as described herein.

Figure 17A:
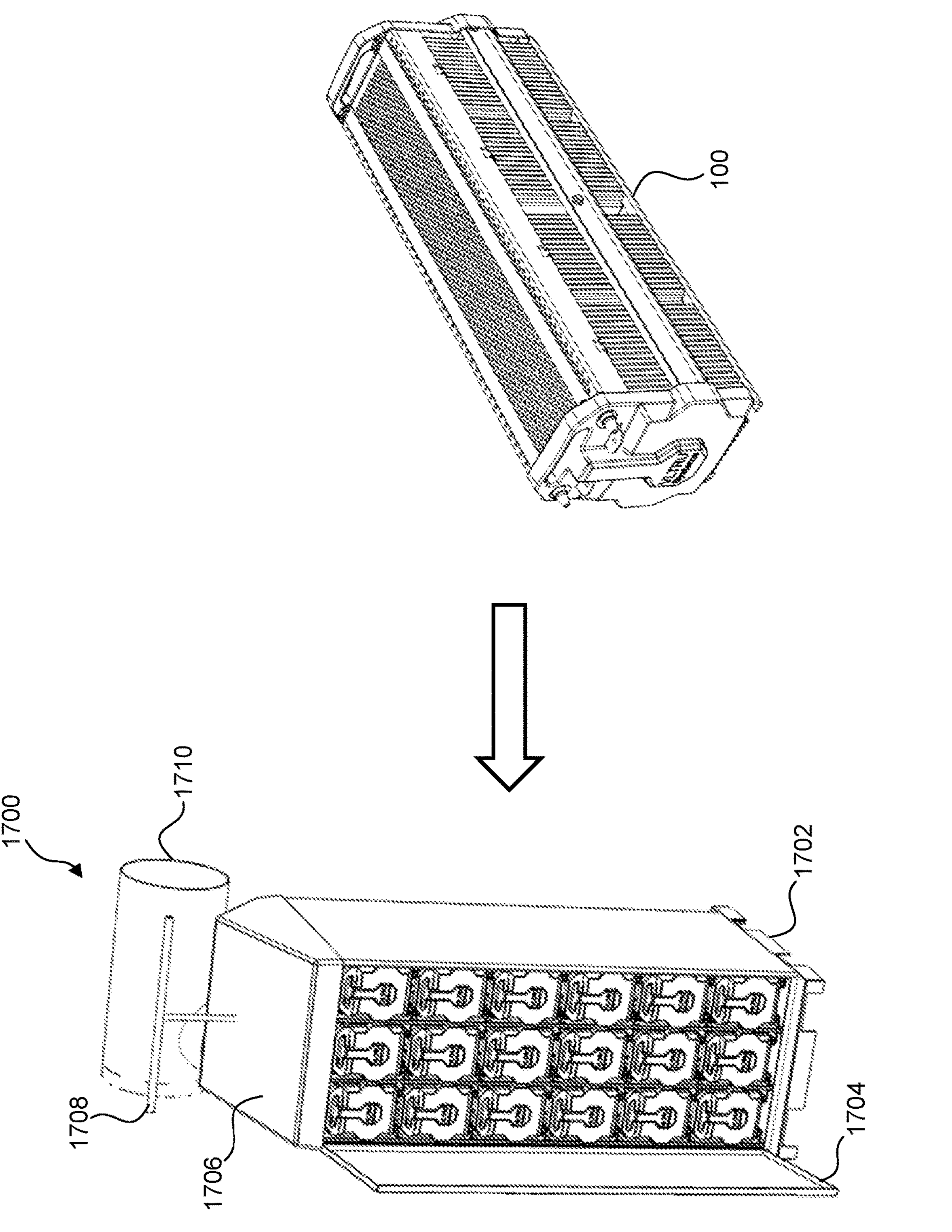
FIGS. 17A-B illustrate an example battery rack according to an embodiment of the present invention.
Figure 17B:
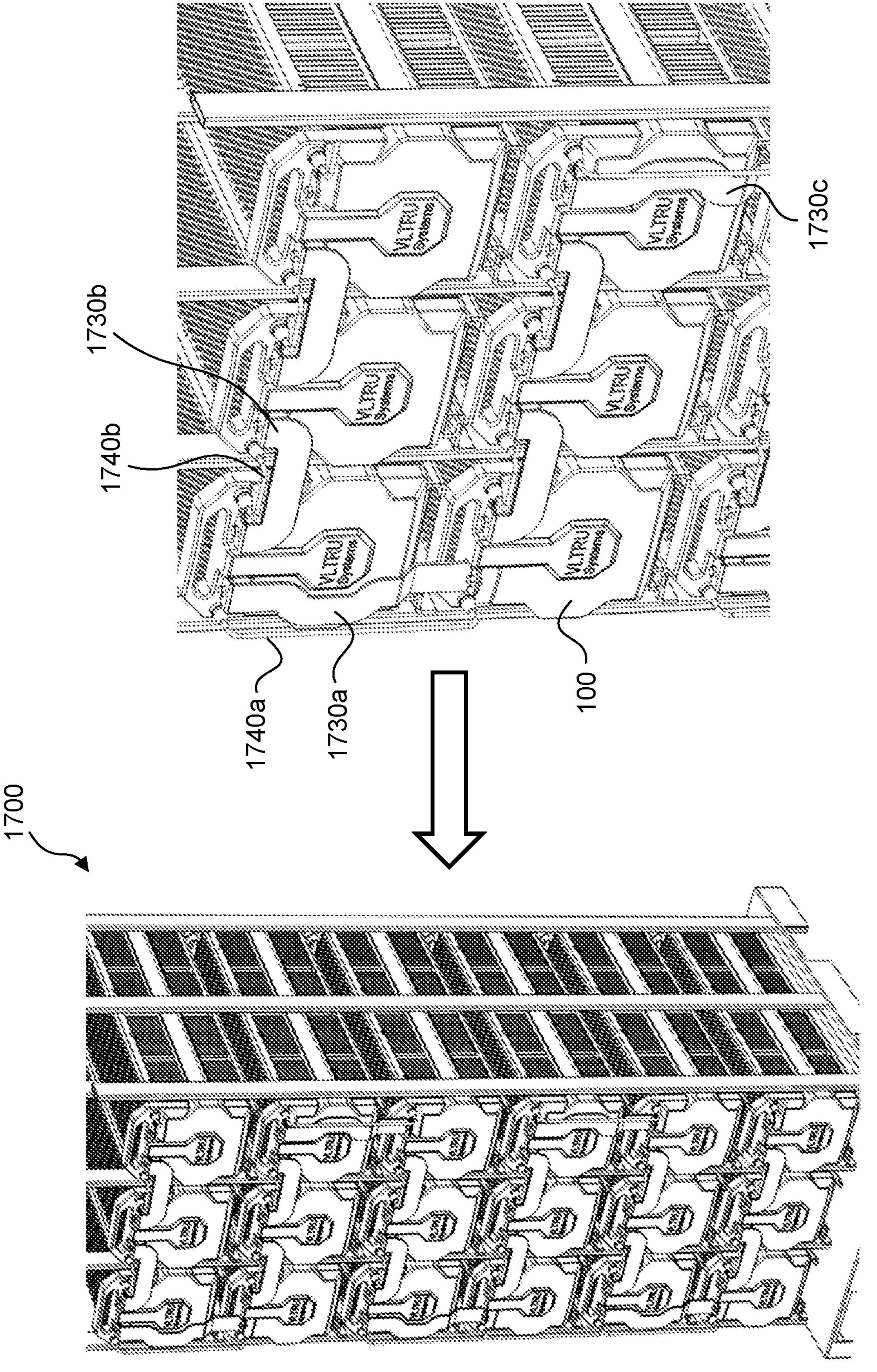

FIGS. 17A-B illustrate an example battery rack 1700 according to an embodiment of the present invention. As shown in FIG. 17A, battery rack 1700 includes a base 1702, a door 1704, a hood 1706, a water suppression system 1708, and exhaust ducting 1710. Base 1702 can be used to move and position battery rack 1700, for example, using a forklift truck. The door 1704 allows people to access the battery modules 100 housed inside the battery rack enclosure. Hood 1706 provides space at the top of the battery rack for the fire suppression system sprinkler head(s). Exhaust ducting 1710 is used to draw air through the battery rack and cool the battery modules. It also is used to direct heat and any gases, for example, in the event that a battery cell vents, outside of the container or room in which the battery rack is located. In embodiments, fan(s) for moving air through the battery rack are located in the exhaust ducting 1710.

FIG. 17B is a more detail drawing of battery rack 1700. In FIG. 17B, one can more clearly see the battery modules 100, and the busbars 1730*a*-1730*c* and cables 1740*a*-1740*b* used to connect the battery modules 100 together to form the battery rack.

Figure 18B:
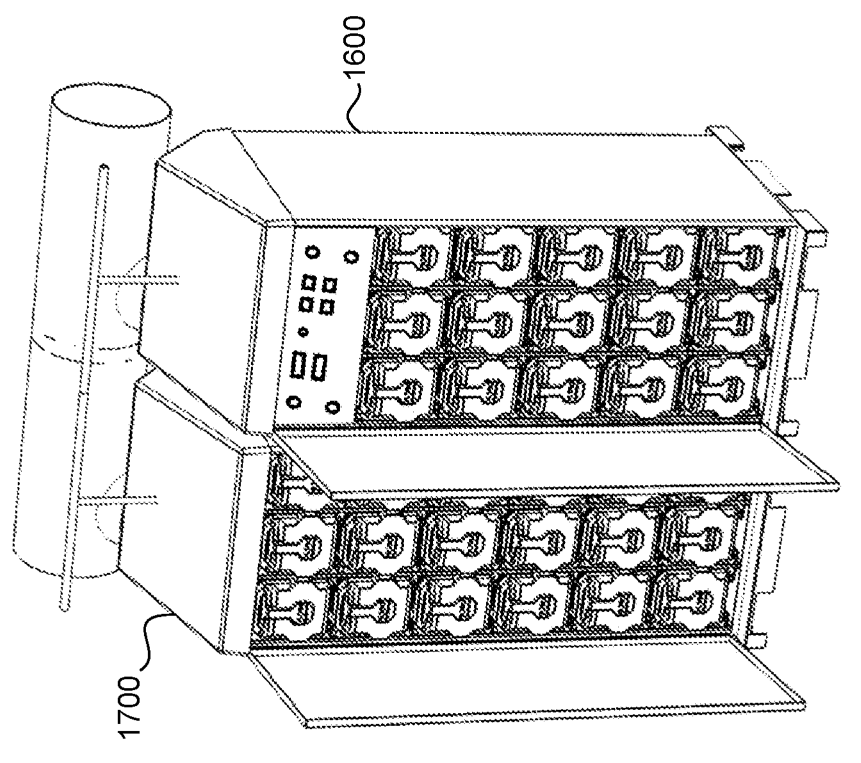
FIGS. 18A-C illustrate example battery racks according to embodiments of the present invention.
Figure 18A:
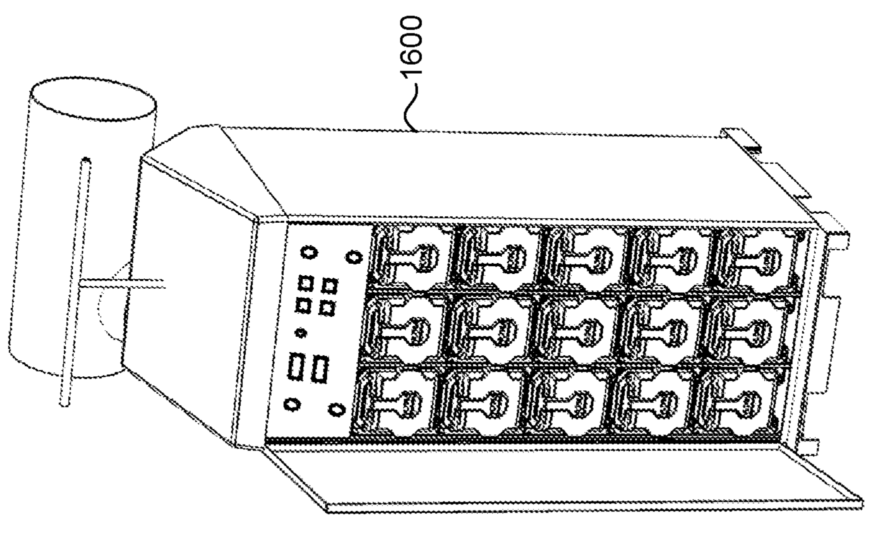
Figure 18C:
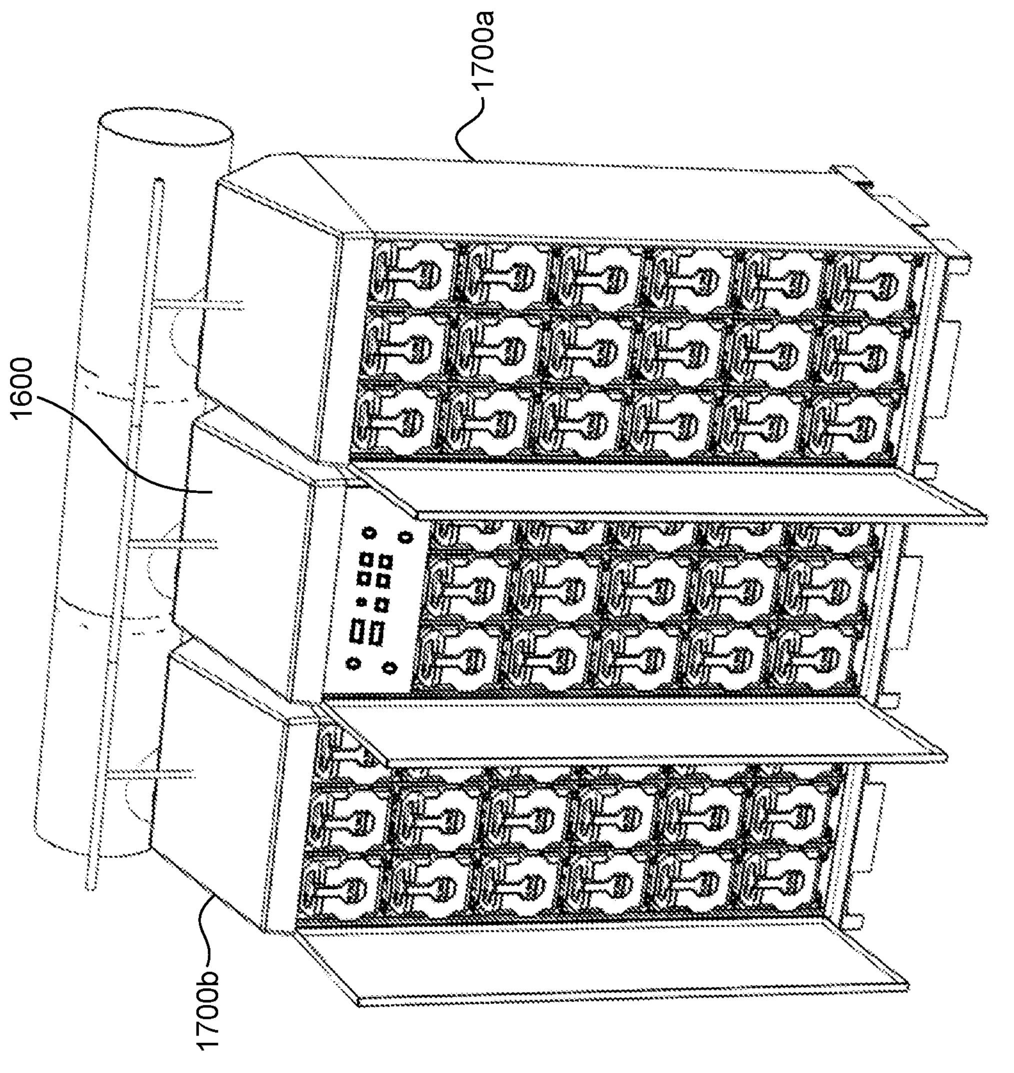

FIGS. 18A-C illustrate example battery rack products or units according to embodiments of the present invention. FIG. 18A shows a battery rack 1600 that can be used as a part of a battery energy storage system. In embodiments, this battery rack includes 15 battery modules 100 according to the present invention and forms a nominal 440V battery energy storage system. FIG. 18B shows a battery rack product that comprises one battery rack 1600 and one battery rack 1700 that can be used as a part of a battery energy storage system. In embodiments, this battery rack product includes 33 battery modules 100 according to the present invention and forms a nominal 1000V battery energy storage system. FIG. 18C shows a battery rack product that comprises one battery rack 1600 and two battery racks 1700*a*-1700*b* that can be used as a part of a battery energy storage system. In embodiments, this battery rack product includes 51 battery modules 100 according to the present invention and forms a nominal 1500V battery energy storage system. In practice, battery energy storage system can be very large and be formed from operating many of these battery rack products together in parallel.

Figure 19:
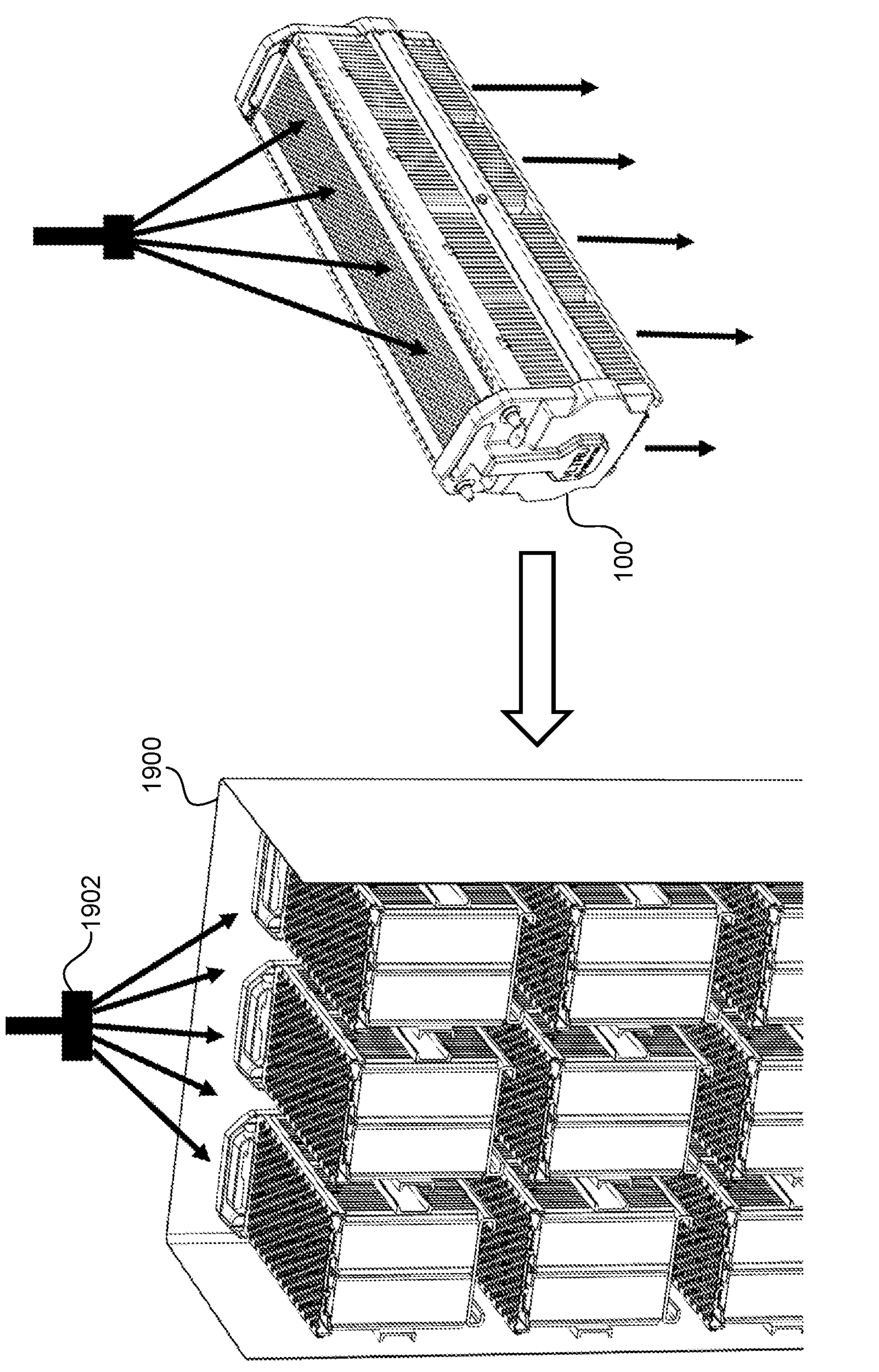
FIG. 19 illustrates a fire suppression system for a battery rack according to an embodiment of the present invention.

FIG. 19 further illustrates an example fire suppression system for a battery rack according to an embodiment of the present invention. As shown in FIG. 19, a battery rack 1900 has a water fire suppression system with a sprinkler head 1902 that allows water from a commercial fire sprinkler system to flow down like a cascading waterfall over the battery modules 100 inside the battery rack enclosure to provide cooling and fire suppression. Water flows down on the tops of the battery modules 100, where it is collected/gathered by a plastic top having a berm located on the top of the battery modules. This water flows down through the middle plate and over the side plates or heat sinks of each of the battery modules or battery cell assemblies and cools the battery cells. As the water exits the middle plate, it is collected/gathered by another battery module 100 below and can then flow through this battery module's middle plate and over the side plates as described herein.

Figure 20:
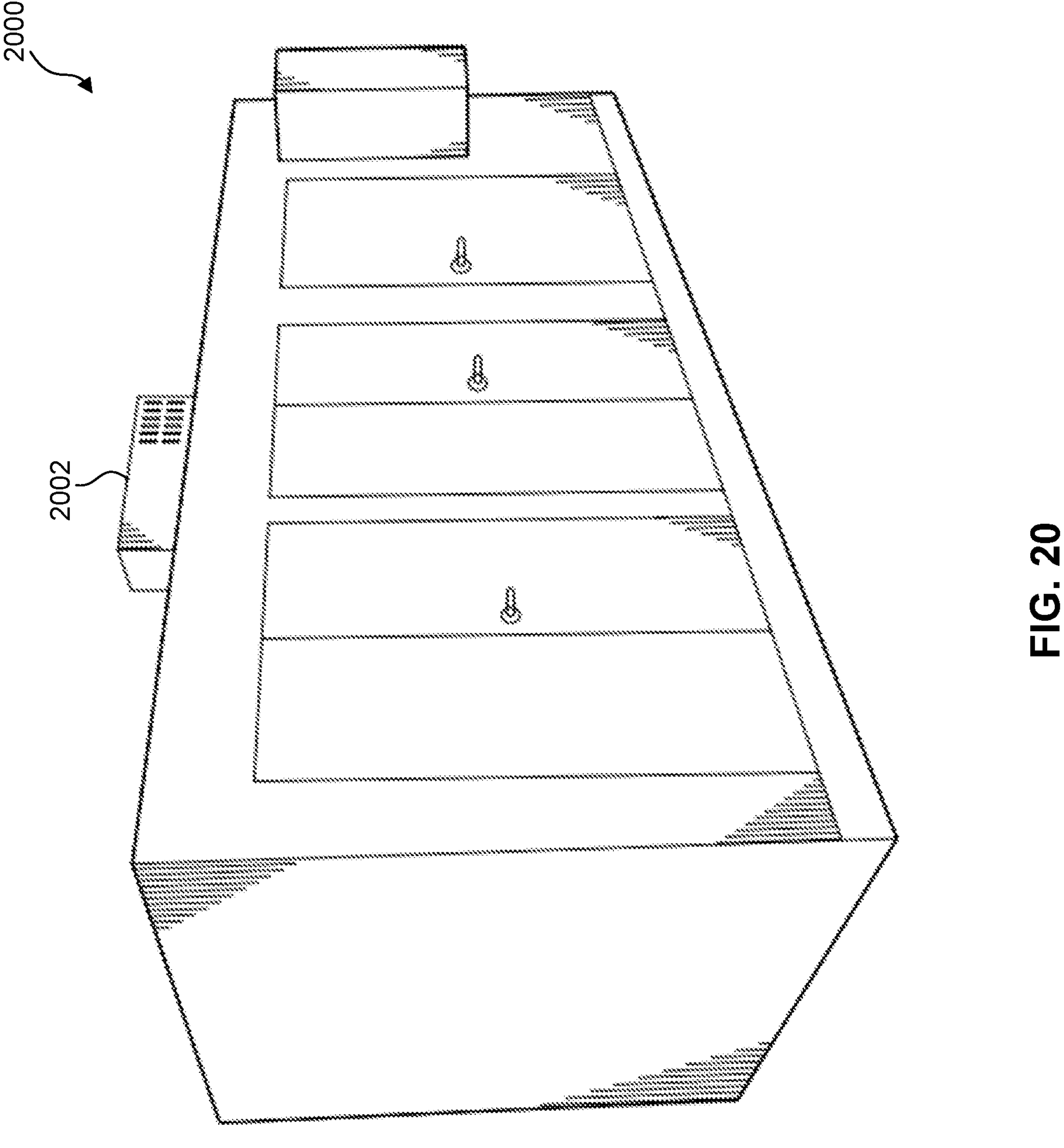
FIG. 20 illustrates an example container system for housing battery racks according to the present invention that form a battery energy storage system.

FIG. 20 illustrates an example container system 2000 for housing battery racks according to the present invention that form a battery energy storage system. The container system houses multiple battery racks and protects the battery racks from the environment. In embodiments, container system 2000 includes an HVAC unit 2002.

Figure 21:
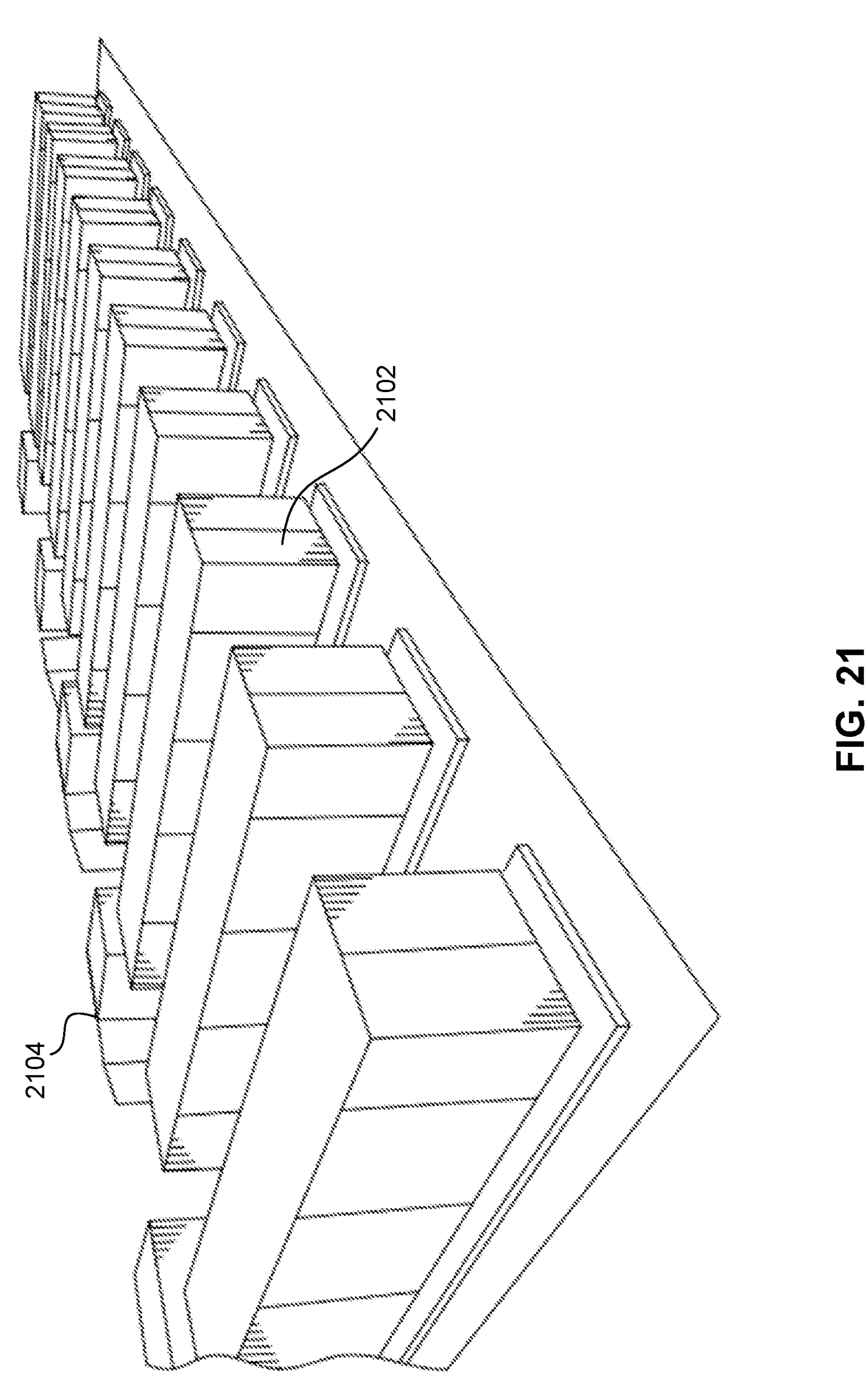
FIG. 21 illustrates multiple containers housing battery racks according to the present invention that form a battery energy storage system.

FIG. 21 illustrates multiple containers 2102 housing battery racks according to the present invention that form a battery energy storage system 2100. In addition to the containers 2102, the battery energy storage system 2100 also includes multiple bi-direction power converters 2104 for charging and discharging the battery racks housed in containers 2102.

Figure 22:
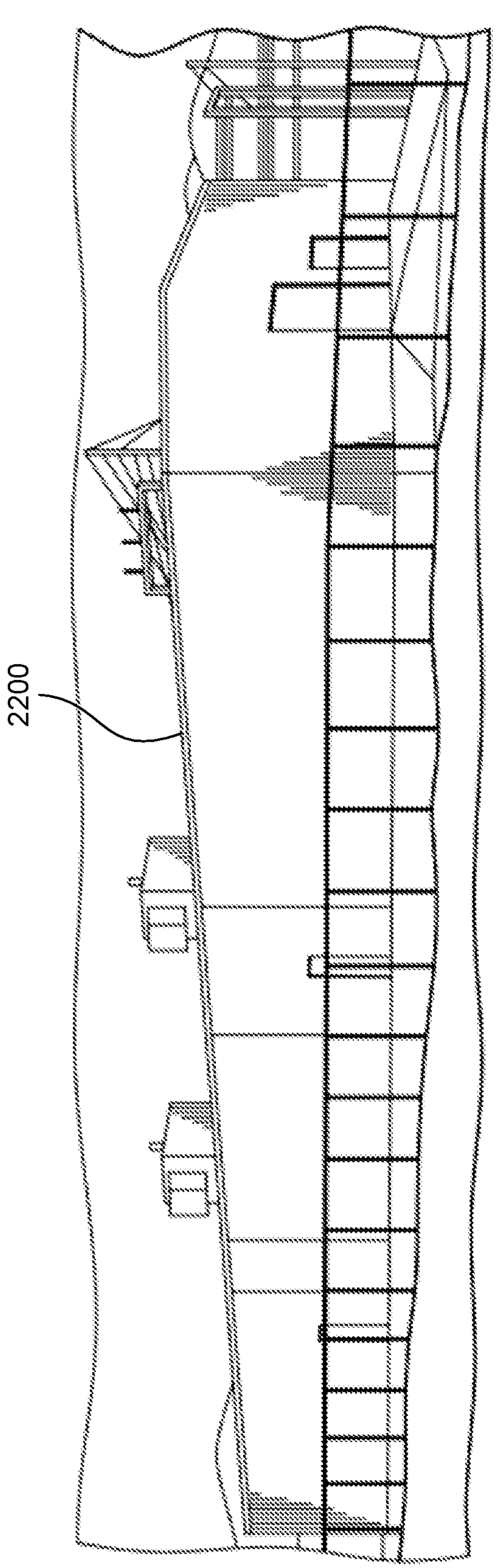
FIG. 22 illustrates a building that houses battery racks according to the present invention that form a battery energy storage system.

FIG. 22 illustrates a building 2200 that houses many battery racks according to the present invention that form a battery energy storage system.

Figure 23:
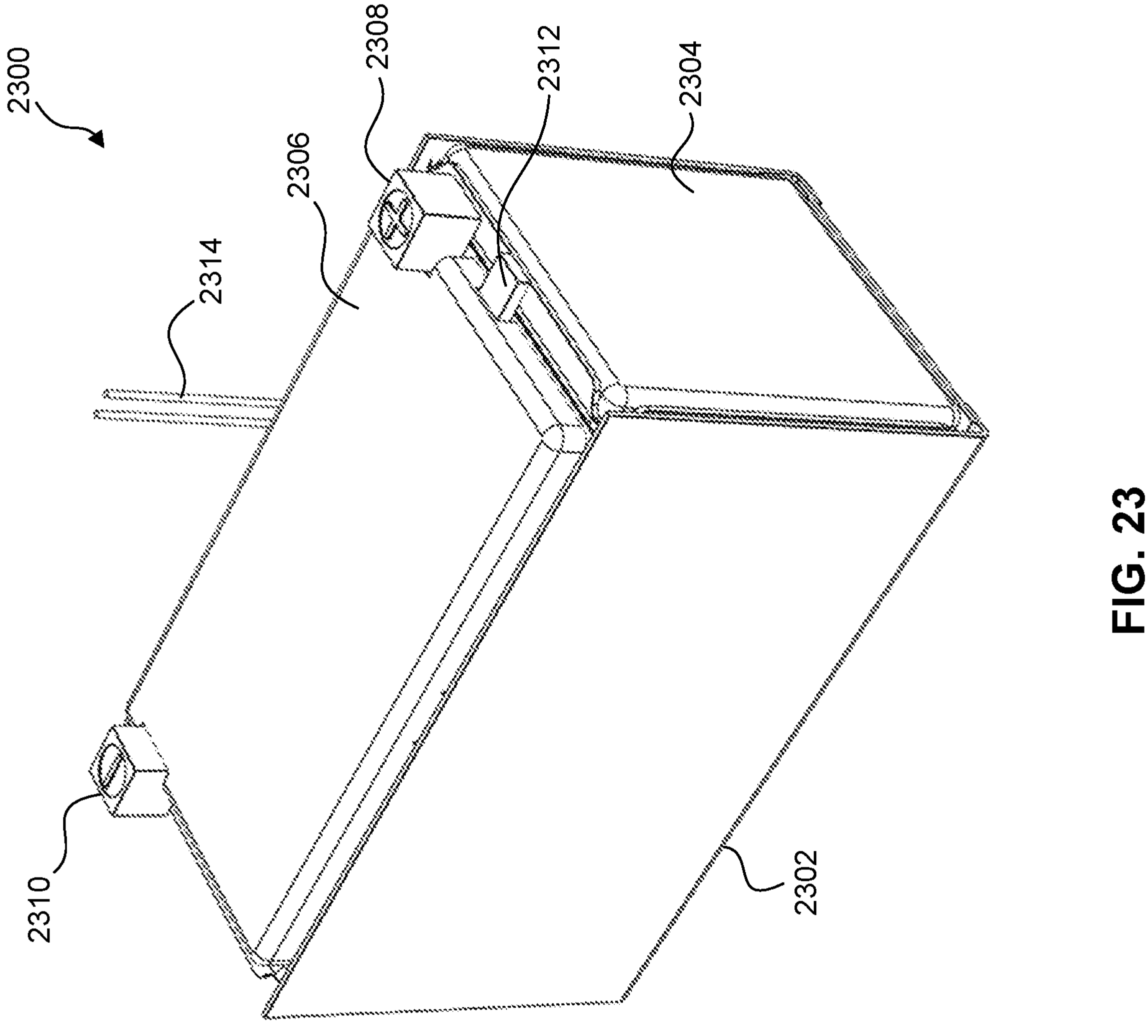
FIG. 23 illustrates a battery module according to an embodiment of the present invention.

FIG. 23 illustrates a battery module 2300 according to an embodiment of the present invention. As shown in FIG. 23, battery module 2300 includes a metal battery housing 2302, a plastic side cover 2304, and a plastic top cover 2306. Battery module 2300 has two battery terminals 2308 and 2310, and a connector 2312 that allows for connection to conductors coupled to the battery cells of battery module 2300. Also show are electrical leads 2314 for an optional heating element for battery module 2300. In an embodiment, battery module 2300 has four battery cells. Other embodiments may have more or less than four battery cells.

Figure 24:
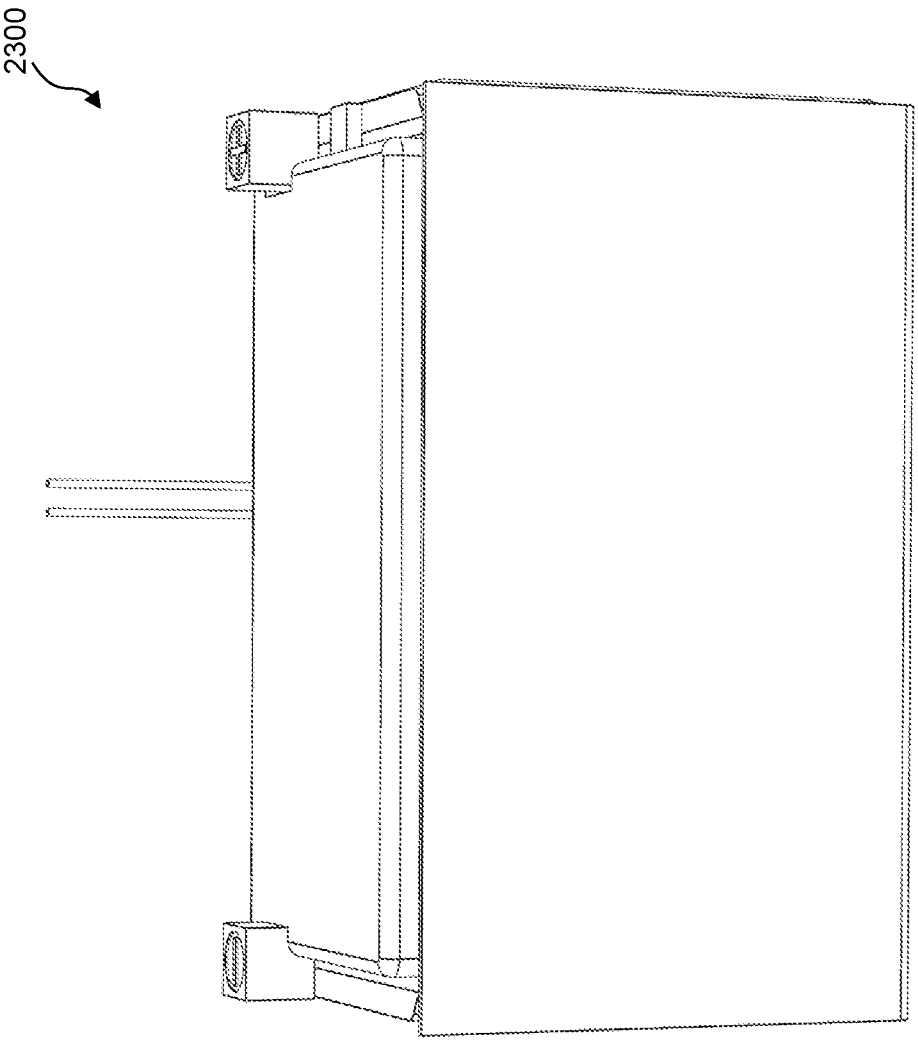
FIG. 24 illustrates a battery module according to an embodiment of the present invention.

FIG. 24 illustrates a side and top view of battery module 2300 according to an embodiment of the present invention.

Figure 25:
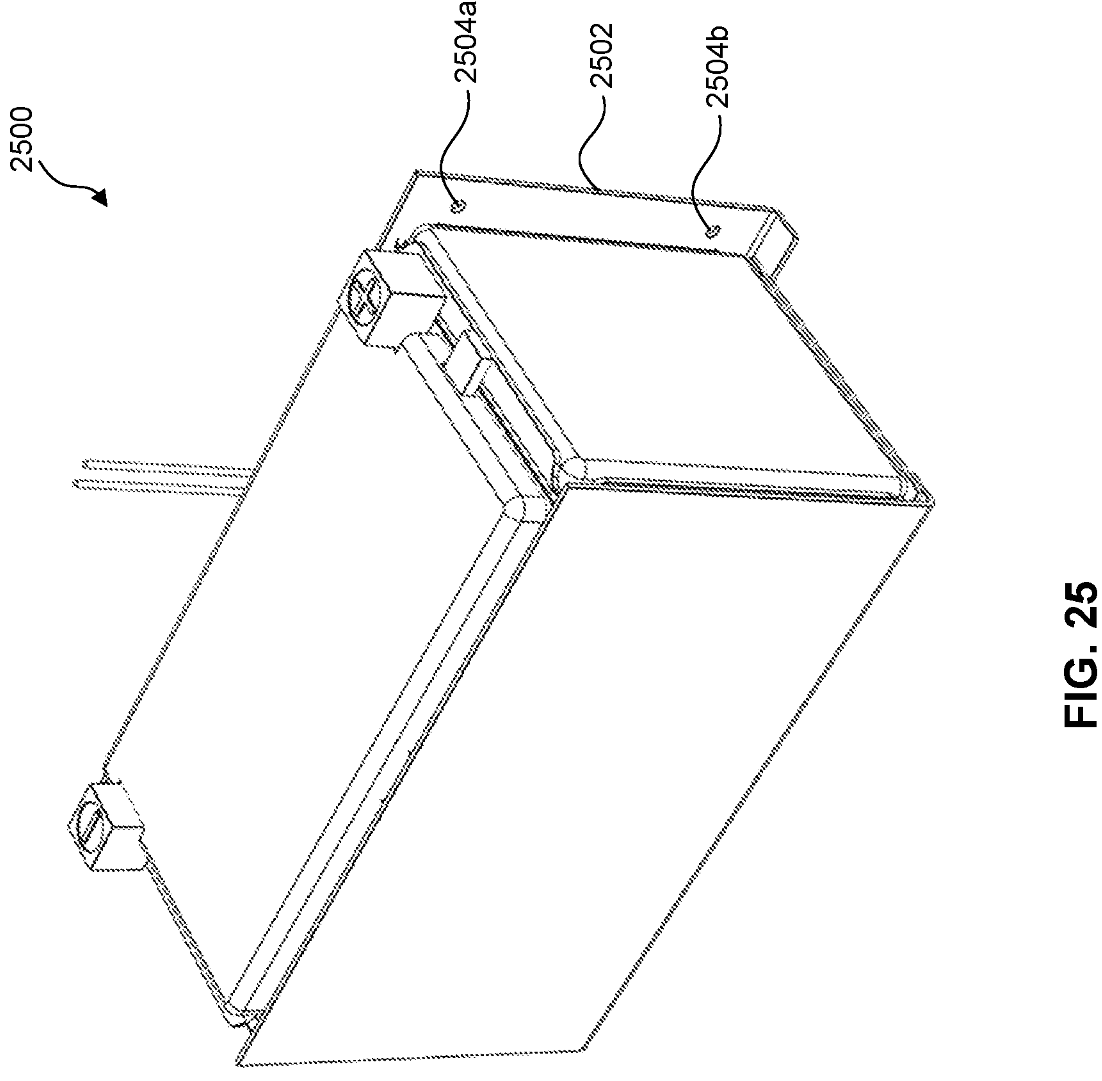
FIG. 25 illustrates a battery module according to an embodiment of the present invention.

FIG. 25 illustrates a battery module 2500 according to an embodiment of the present invention. Battery module 2500 includes a side plate 2502 that has mounting holes 2504*a* and 2504*b*. These mounting holes can be used to secure battery module 2500, for example, when it is used as a part of a larger battery pack or battery system in the applications described below with reference to FIGS. 52-54.

Figure 26:
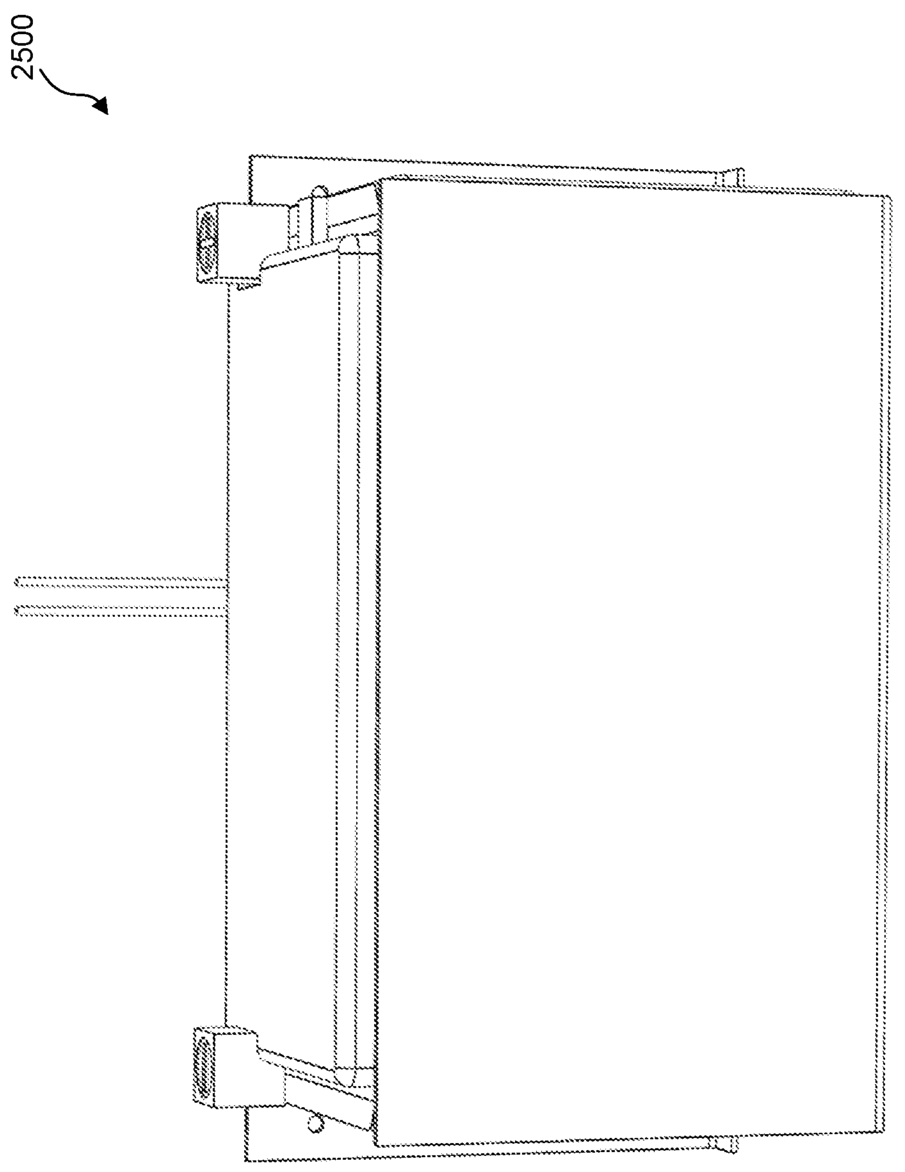
FIG. 26 illustrates a battery module according to an embodiment of the present invention.

FIG. 26 illustrates a side and top view of battery module 2500 according to an embodiment of the present invention.

Figure 27:
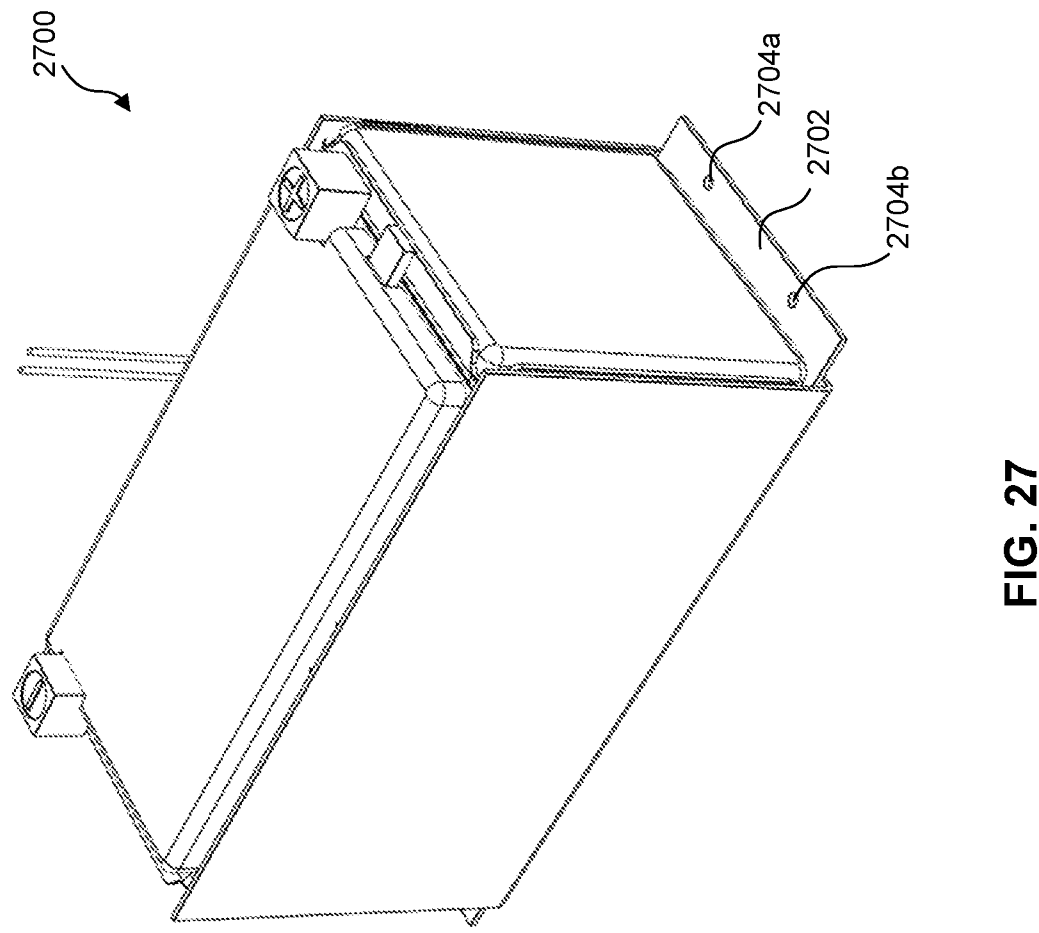
FIG. 27 illustrates a battery module according to an embodiment of the present invention.

FIG. 27 illustrates a battery module 2700 according to an embodiment of the present invention. Battery module 2700 includes a bottom plate 2702 that has mounting holes 2704*a* and 2704*b*. These mounting holes can be used to secure battery module 2700, for example, when it is used as a part of a larger battery pack or battery system in the applications described below with reference to FIGS. 52-54.

Figure 28:
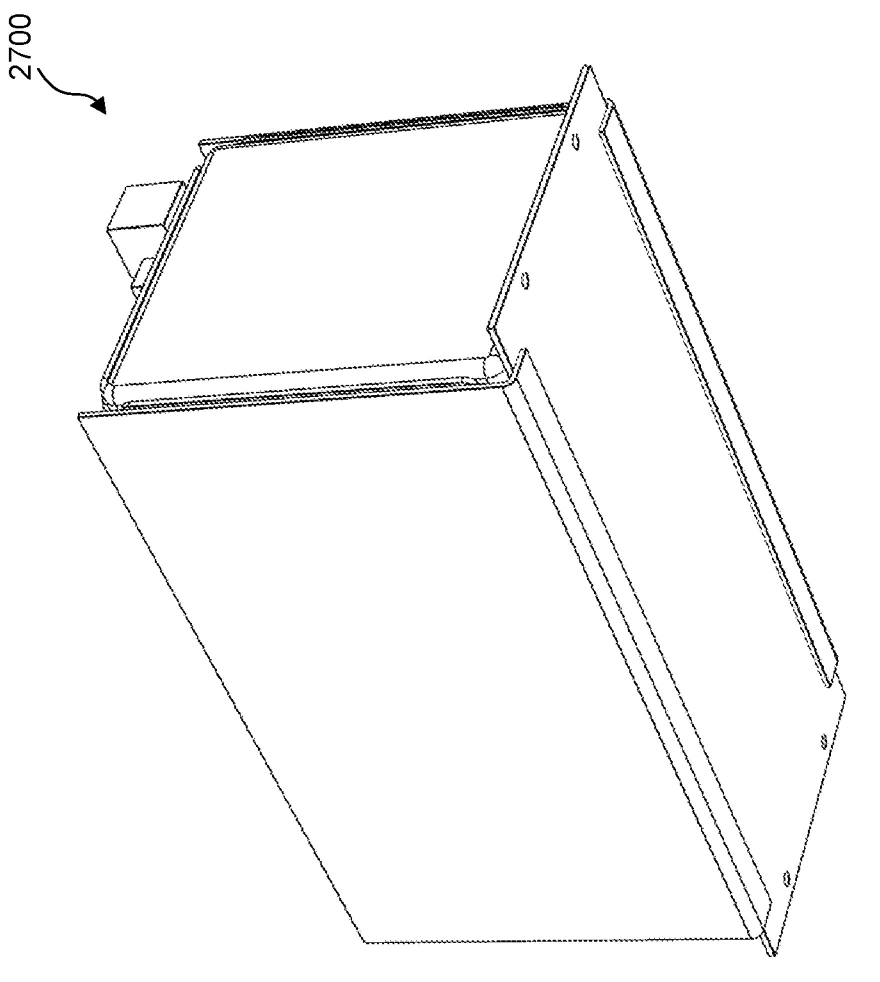
FIG. 28 illustrates a battery module according to an embodiment of the present invention.

FIG. 28 illustrates a side and bottom view of battery module 2700 according to an embodiment of the present invention.

Figure 29:
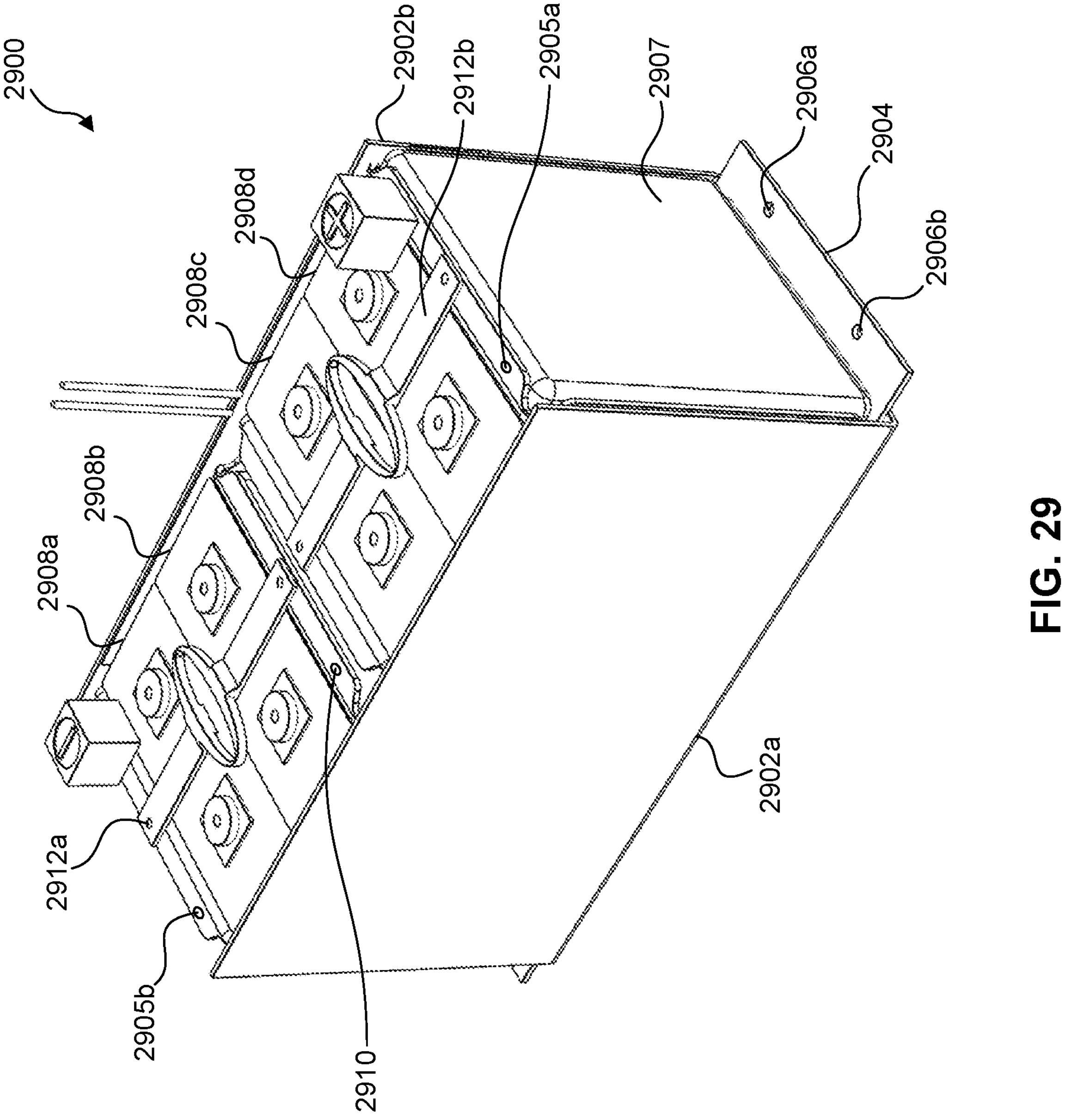
FIG. 29 illustrates a battery module according to an embodiment of the present invention.

FIG. 29 illustrates a battery module 2900 according to an embodiment of the present invention. As shown in FIG. 29, battery module 2900 includes side plates 2902*a* and 2902*b*, a bottom plate 2904, and end plates 2905*a* and 2905*b*. A plastic end cap 2907 is shown covering end plate 2905*a*. Battery module 2900 also includes four battery cells 2908*a*-2908*d*. A pressure assembly 2910 is located between battery cells 2908*b* and 2908*c*. Also shown are two pressure/swelling sensors 2912*a* and 2912*b*, and mounting holes 2906*a* and 2906*b*.

In embodiments, when one or more battery cells 2908*a*-2908*d* swell, or their internal pressure increases, a pressure is applied to pressure assembly 2910, which is then detected by one or both of the swelling/pressure sensors 2912*a*-2912*b*. Different embodiments of pressure assembly 2910 are described below, which can be used with battery module 2900 as well as other battery modules described herein according to the present invention.

Figure 30:
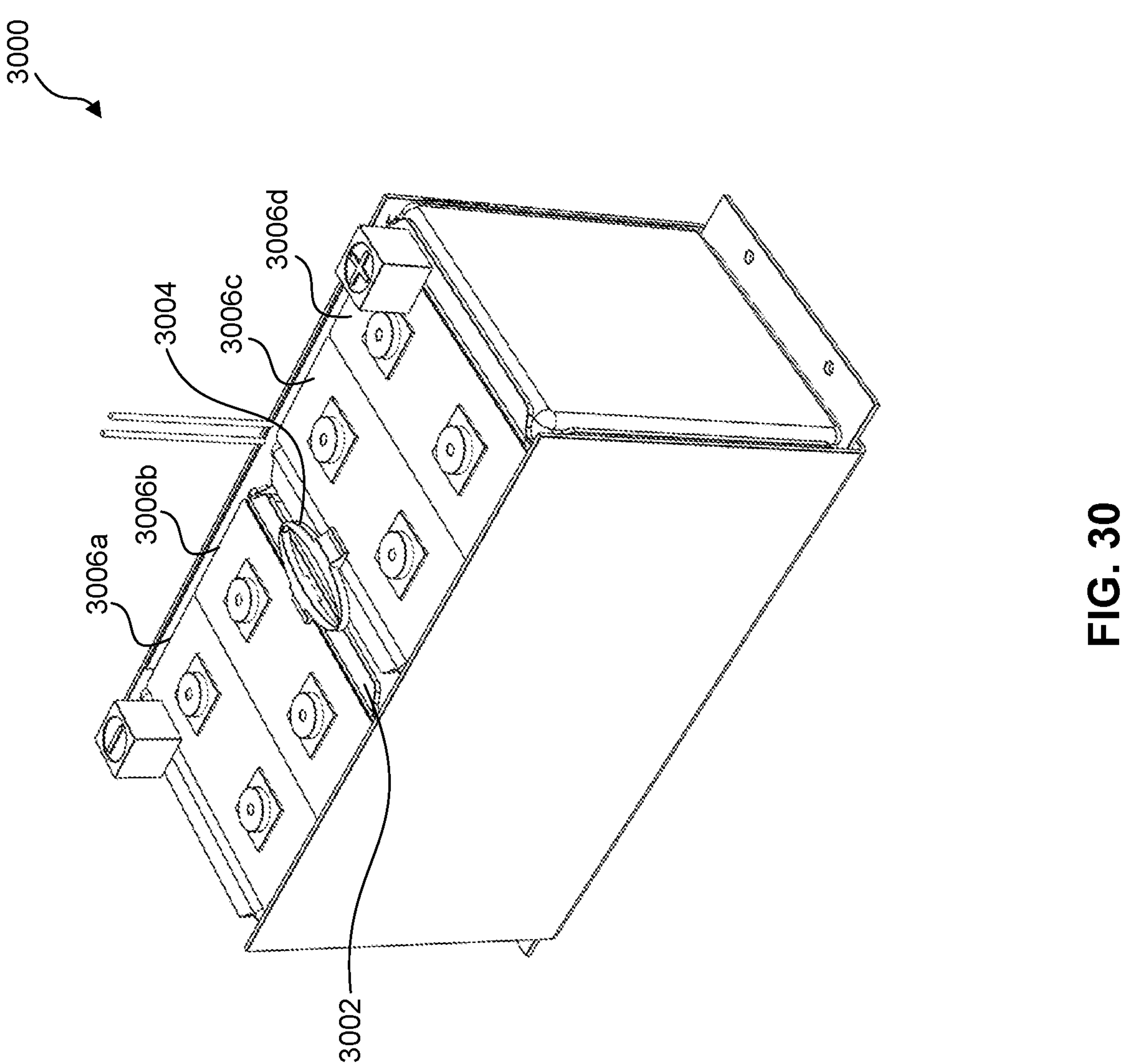
FIG. 30 illustrates a battery module according to an embodiment of the present invention.

FIG. 30 illustrates a battery module 3000 according to an embodiment of the present invention. Battery module 3000 includes a pressure assembly 3002 and a single swelling/pressure sensor 3004. In embodiments, when one or more of the battery cells 3006*a*-3006*d* swell, or their internal pressure increases, a pressure is applied to pressure assembly 3002, which is then detected by the swelling/pressure sensor 3004.

Figure 31:
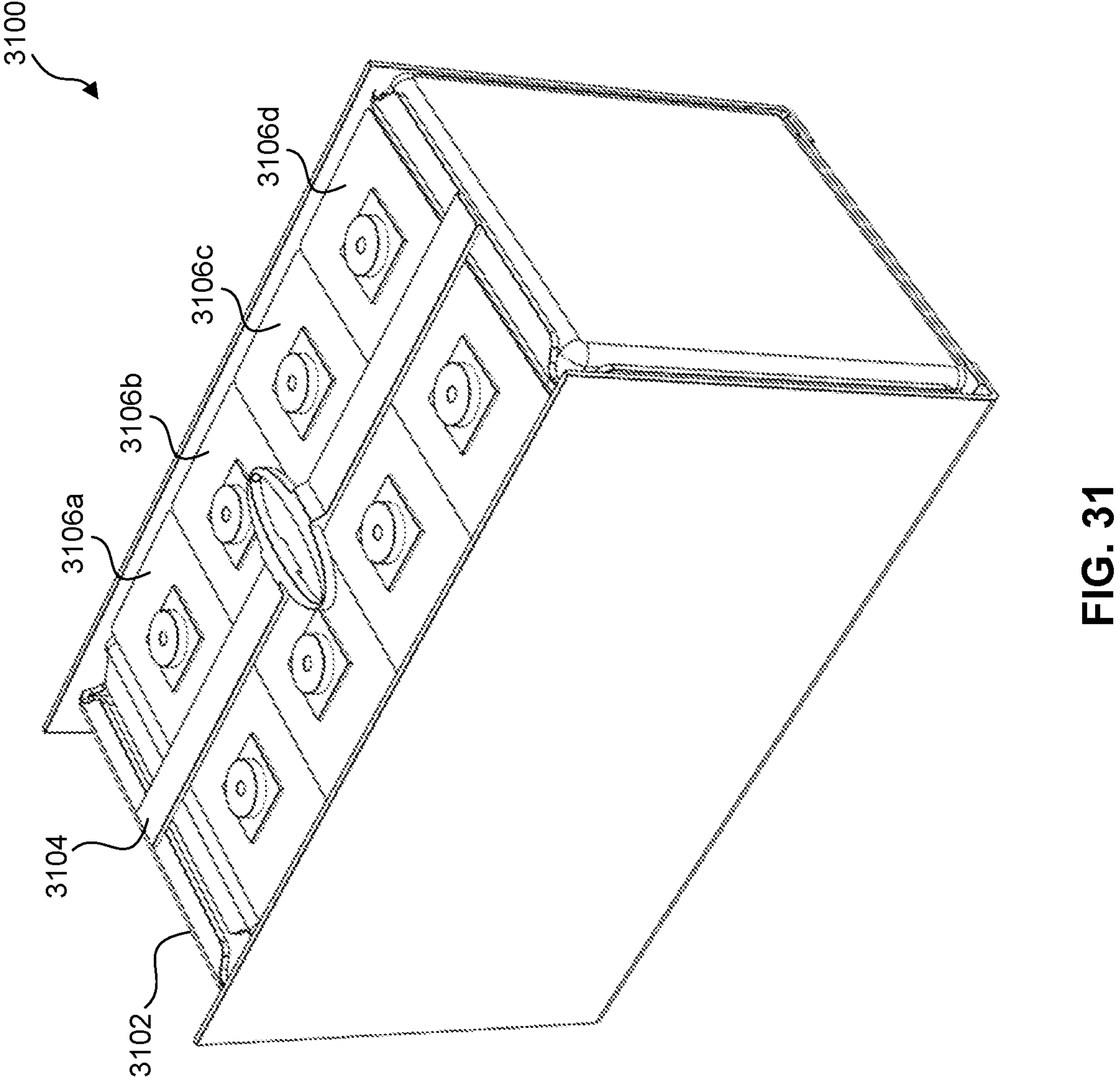
FIG. 31 illustrates a battery module according to an embodiment of the present invention.

FIG. 31 illustrates a battery module 3100 according to an embodiment of the present invention. Battery module 3100 includes a pressure assembly 3102 and a single swelling/pressure sensor 3104. In embodiments, when one or more of the battery cells 3106*a*-3106*d* swell, or their internal pressure increases, a pressure is applied to pressure assembly 3102, which is then detected by the swelling/pressure sensor 3104.

Figure 32:
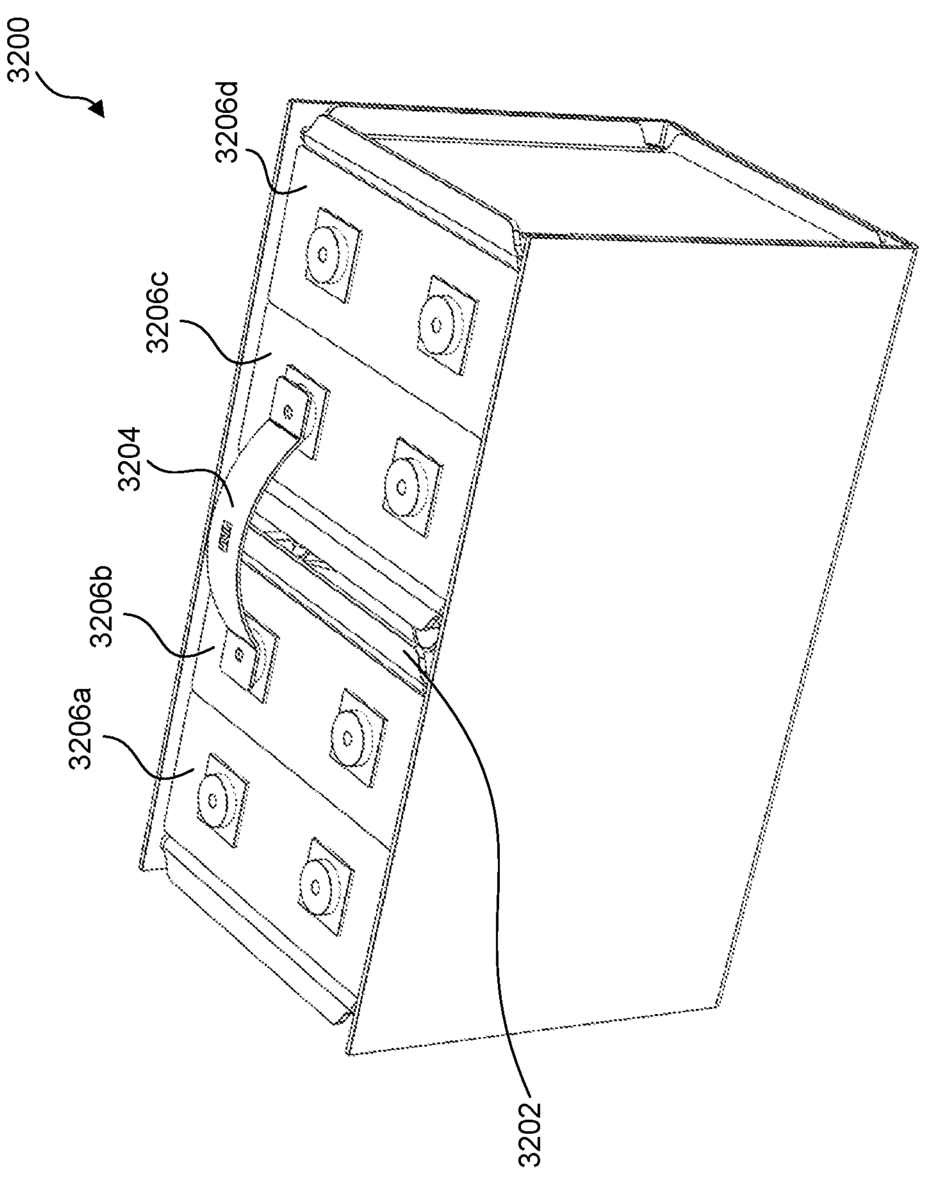
FIG. 32 illustrates a battery module according to an embodiment of the present invention.

FIG. 32 illustrates a battery module 3200 according to an embodiment of the present invention. Battery module 3200 includes a pressure assembly 3202 and a single swelling/pressure sensor 3204. In embodiments, when one or more of the battery cells 3206*a*-3206*d* swell, or their internal pressure increases, a pressure is applied to pressure assembly 3202, and it is detected by the swelling/pressure sensor 3204.

Figure 33:
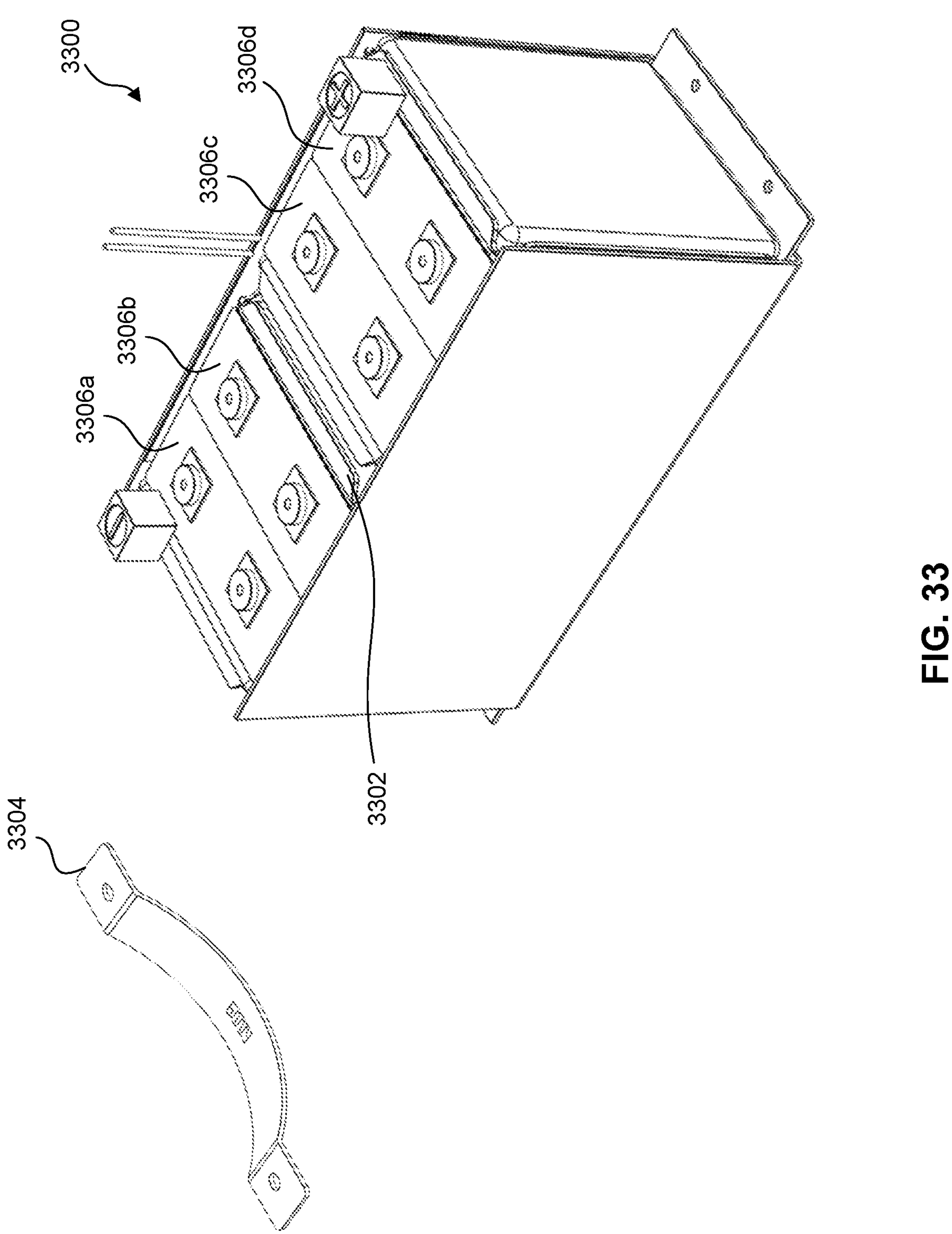
FIG. 33 illustrates a battery module according to an embodiment of the present invention.

FIG. 33 illustrates a battery module 3300 according to an embodiment of the present invention. Battery module 3300 includes a pressure assembly 3302 and one or more swelling/pressure sensors 3304. The swelling/pressure sensor(s) 3304 are located inside the pressure assembly 3302 as shown, for example, in FIG. 39 below. In embodiments, when one or more of the battery cells 3306*a*-3306*d* swell, or their internal pressure increases, a pressure is applied to pressure assembly 3302, which is then detected by the swelling/pressure sensor(s) 3304.

Figure 34A:
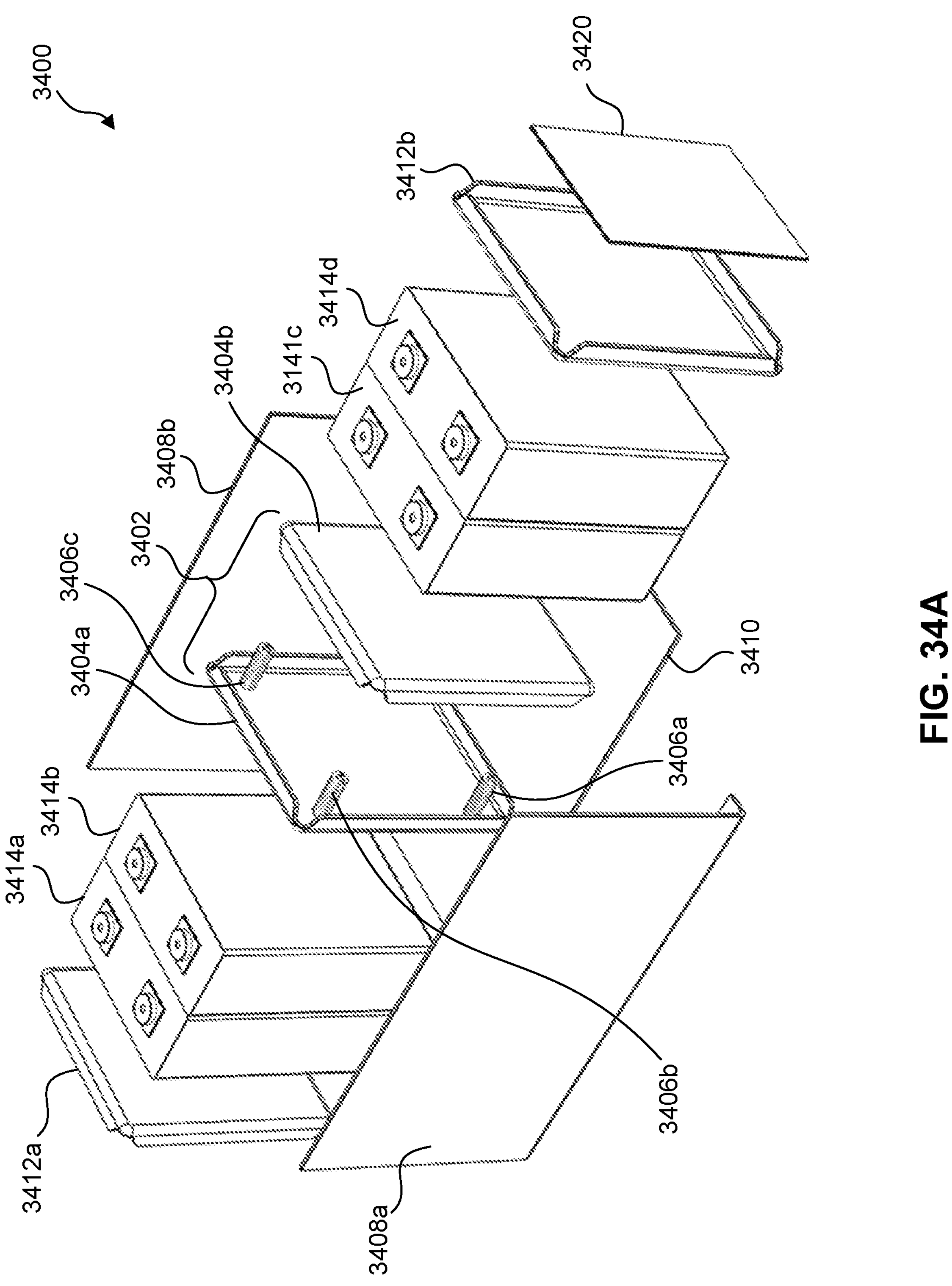
FIG. 34A illustrates an exploded view a battery module according to an embodiment of the present invention.

FIG. 34A illustrates an exploded view of a battery module 3400 according to an embodiment of the present invention. Battery module 3400 includes a pressure assembly 3402 that includes two plates 3404*a* and 3404*b*, and die springs 3406*a*-3406*c*. In one embodiment, pressure assembly 3402 has four die springs 3406. In other embodiments, pressure assembly 3402 has more or less than four die springs 3406. When pressure is applied to one or both of the plates 3404, the die springs 3406 allow one or both of the plates 3404 to move. This movement can then be detected using a swelling/pressure sensor as described herein.

As illustrated in FIG. 34A, battery module 3400 also includes two side plates 3408*a* and 3408*b*, a bottom plate 3410, and two end plates 3412*a* and 3412*b*. As shown, battery module 3400 includes four battery cells 3414*a*-3414*d*. A battery management circuit board 3420 is coupled to end plate 3412*b*. The battery management circuit board 3420 includes electrical circuits similar to those described herein, for example, with references to FIGS. 10A-10Q.

Figure 34B:
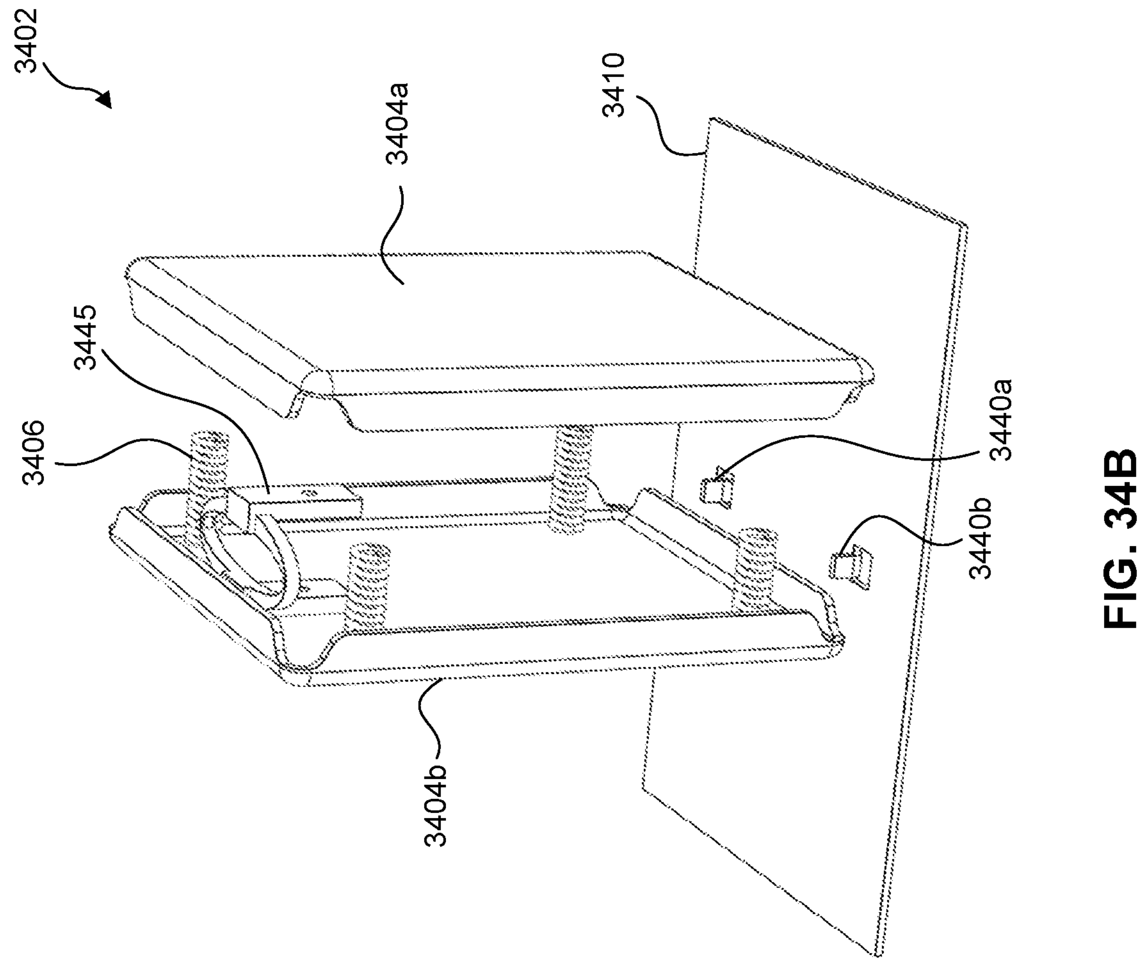
FIG. 34B illustrates a plate inhibitor according to an embodiment of the present invention.

As shown in FIG. 34B, in embodiments of the present invention, a pressure assembly such as pressure assembly 3402 of battery module 3400 has a plate inhibitor 3440 that inhibits movement of the bottom of a plate while the top of the plate can still move, thereby causing a tilting of the plate and thus amplifying the movement of the top of the plate for a given amount of battery swelling. In an embodiment, plate inhibitor 3440 includes two tabs 3440*a* and 3440*b* as shown in FIG. 34B. The tabs 3440*a*-3440*b* can be formed by cutting, for example, the bottom plate 3410 of battery module 3400 and bending up metal to form the tabs 3440*a*-3440*b* as shown. In embodiments, plate inhibitor 3440 has more or less than two tabs.

As shown in FIG. 34B, in addition to plate inhibitor 3440, the pressure assembly 3402 has two plates 3404*a*-3404*b*, four die springs 3406, and a swelling/pressure sensor 3445. When a battery cell swells, it causes plates 3404*a*-3404*b* to apply a pressure to swelling/pressure sensor 3445, which can be detected as described herein.

Figure 34C:
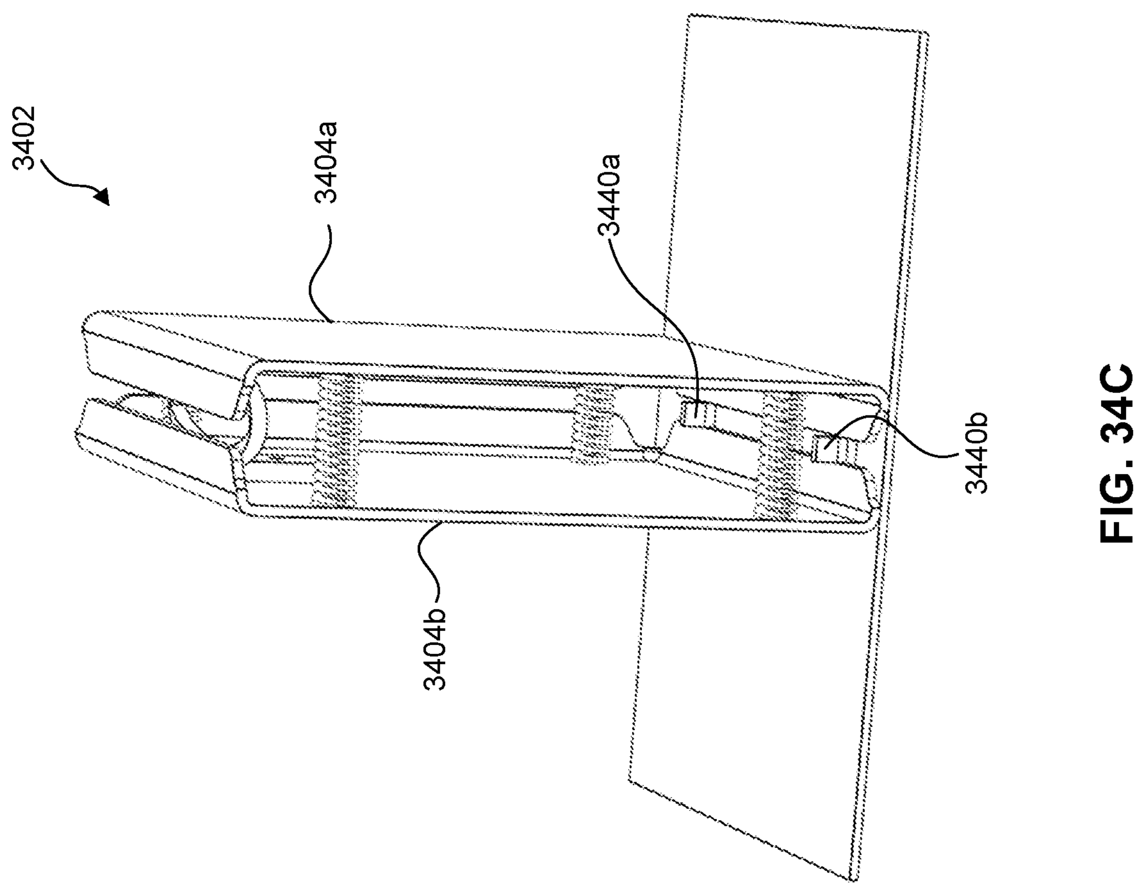
FIG. 34C illustrates a plate inhibitor according to an embodiment of the present invention.

FIG. 34C further illustrates pressure assembly 3402 and the tabs 3440*a*-3440*b* of plate inhibitor 3440. In FIG. 34C, one can see how the tabs 3440*a*-3440*b* inhibit the movement of the bottom of plates 3404*a*-3404*b* and amplifies the movement of the top of one or both of the plates 3404*a*-3404*b*.

Figure 34D:
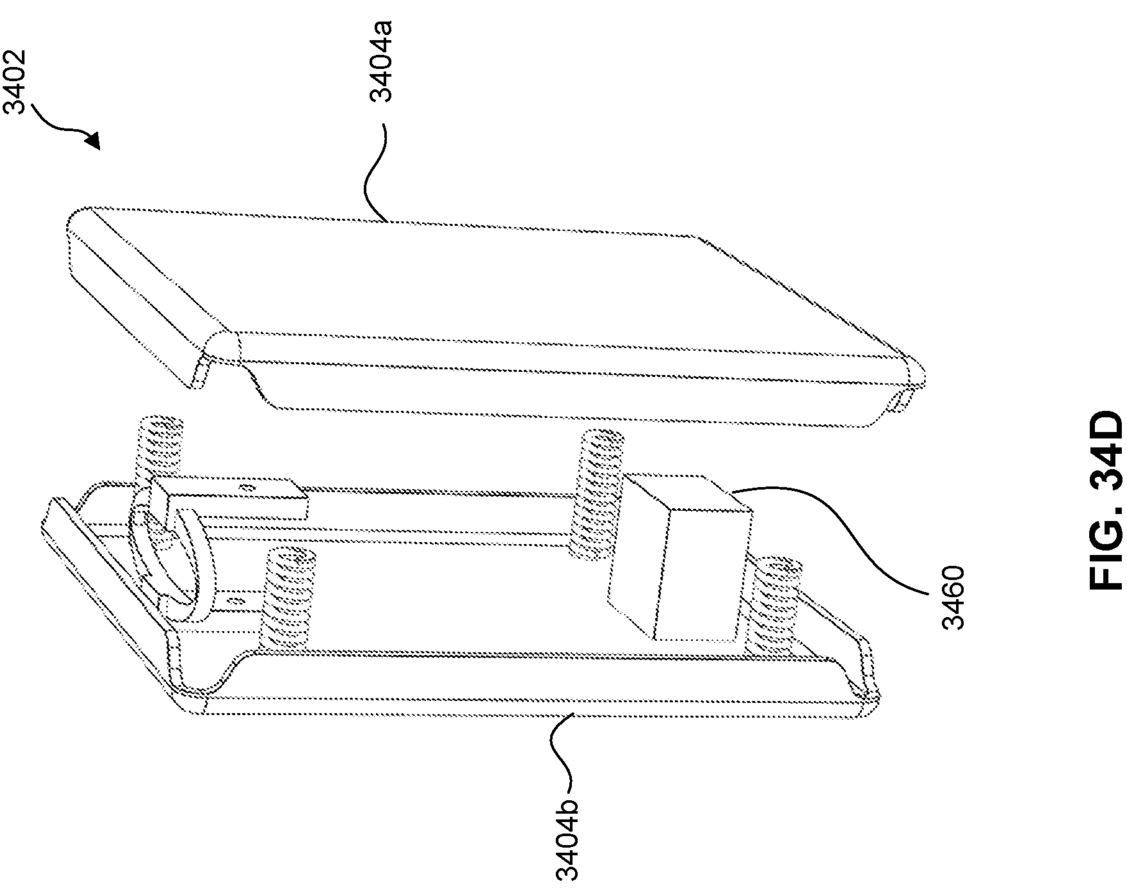
FIG. 34D illustrates a plate inhibitor according to an embodiment of the present invention.

FIG. 34D illustrates another plate inhibitor 3460 for a pressure assembly such as pressure assembly 3402. In one embodiment, the plate inhibitor 3460 is a block, as shown in FIG. 34D, that limits the movement of one or more plates 3404*a*-3404*b* as a battery cell swells and causes pressure to be applied to the one or more plates. Specifically, as shown in FIG. 34D, the bottom of a plate is inhibited from moving while the top of the plate can still move, causing a tilting of the plate and thus amplifying the movement of the top of the plate for a given amount of battery swelling. In embodiments, other shapes than a block are used to inhibit the movement of a plate, such as for example triangular shapes, round shapes, and rectangular shapes. The plate inhibitor 3460 can be attached to one of the plates 3404*a*-3404*b* or to the bottom plate 3410 of a battery module such as battery module 3400 (See FIG. 34A).

Figure 34E:
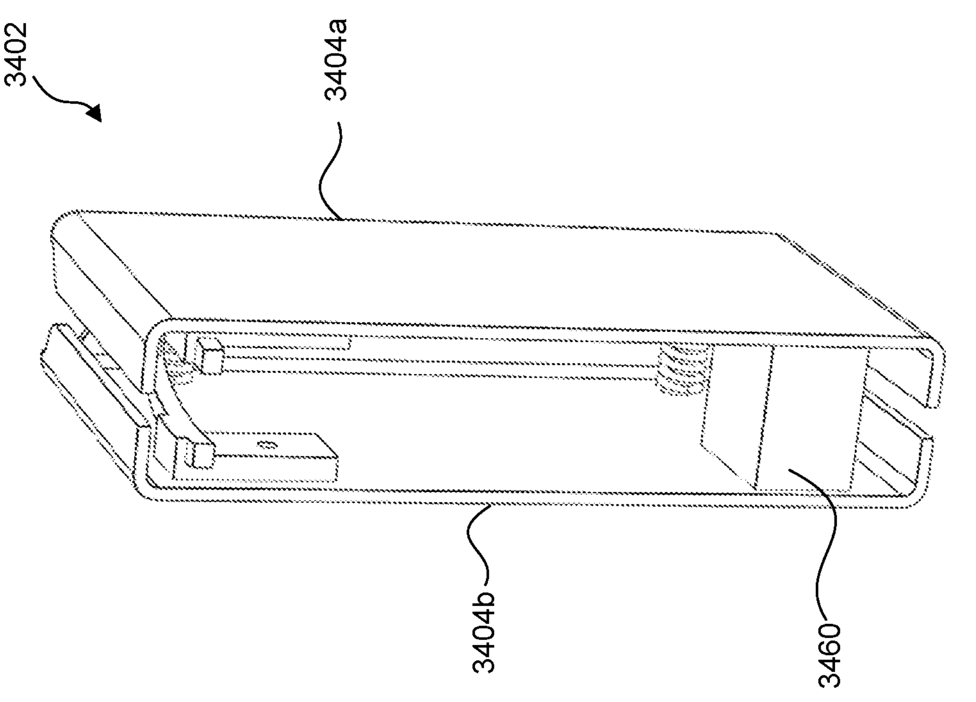
FIG. 34E illustrates a plate inhibitor according to an embodiment of the present invention.

FIG. 34E further illustrates pressure assembly 3402 and plate inhibitor 3460. In FIG. 34E, one can see how plate inhibitor 3460 inhibits the movement of the bottom of plates 3404*a*-3404*b* and amplifies the movement of the top of one or both of the plates 3404.

As will be understood by persons skilled in the relevant art(s), devices and methods other than those shown in FIG. 34B-E can be used to produce the same effects as plate inhibitors 3440 and 3460.

Figure 35:
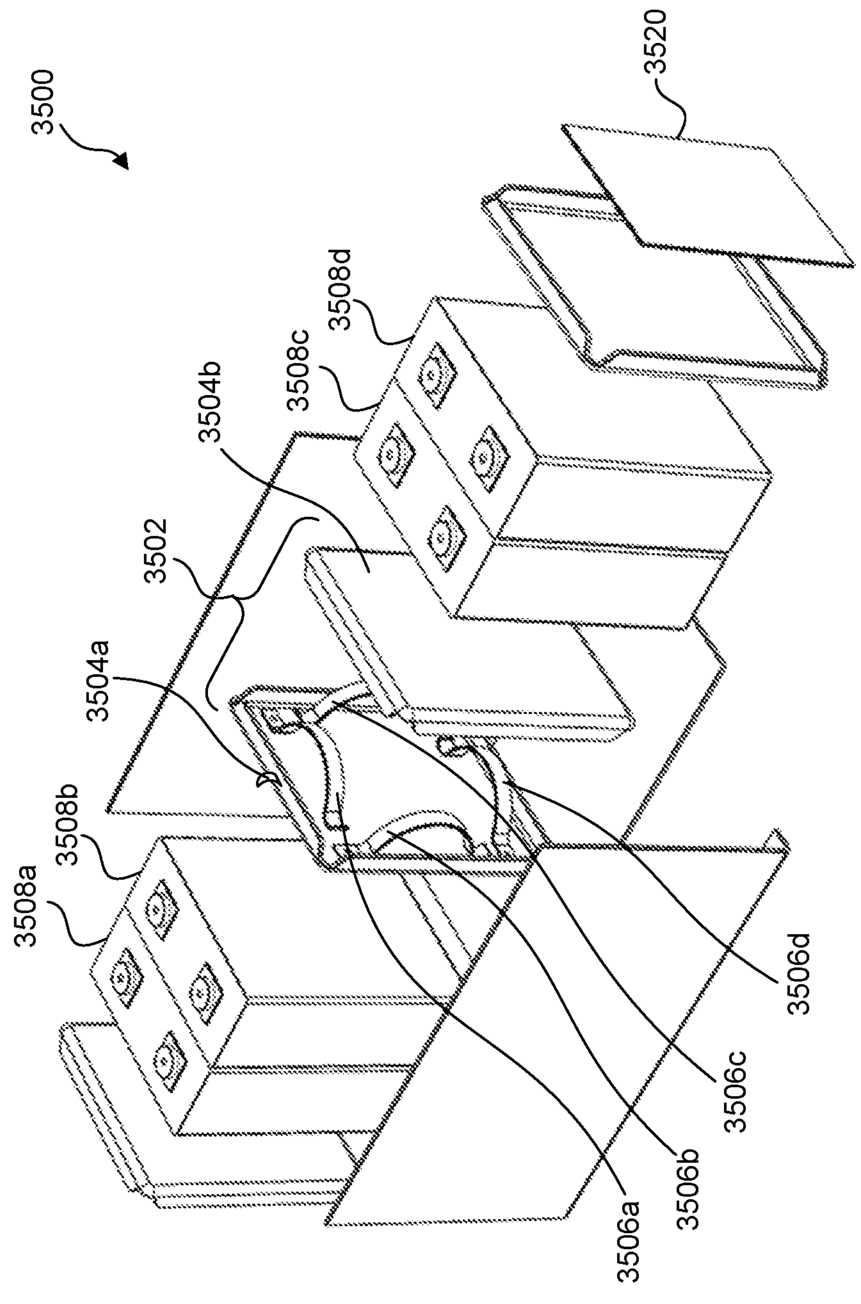
FIG. 35 illustrates an exploded view of a battery module according to an embodiment of the present invention.

FIG. 35 illustrates an exploded view of a battery module 3500 according to an embodiment of the present invention. Battery module 3500 includes a pressure assembly 3502 that includes two plates 3504*a* and 3504*b*, and leaf springs 3506*a*-3506*d*. In one embodiment, pressure assembly 3502 has four leaf springs 3506. In other embodiments, pressure assembly 3502 has more or less than four leaf springs 3506. When pressure is applied to one or both of the plates 3504, the leaf springs 3506 allow one or both of the plates 3504 to move. This movement can then be detected using a swelling/pressure sensor as described herein.

As illustrated in FIG. 35, battery module 3500 also includes a battery management circuit board 3520. The battery management circuit board 3520 includes electrical circuits similar to those described herein, for example, with references to FIGS. 10A-10Q. Battery module 3500 may include four battery cells 3508*a*-3508*d*.

Figure 36:
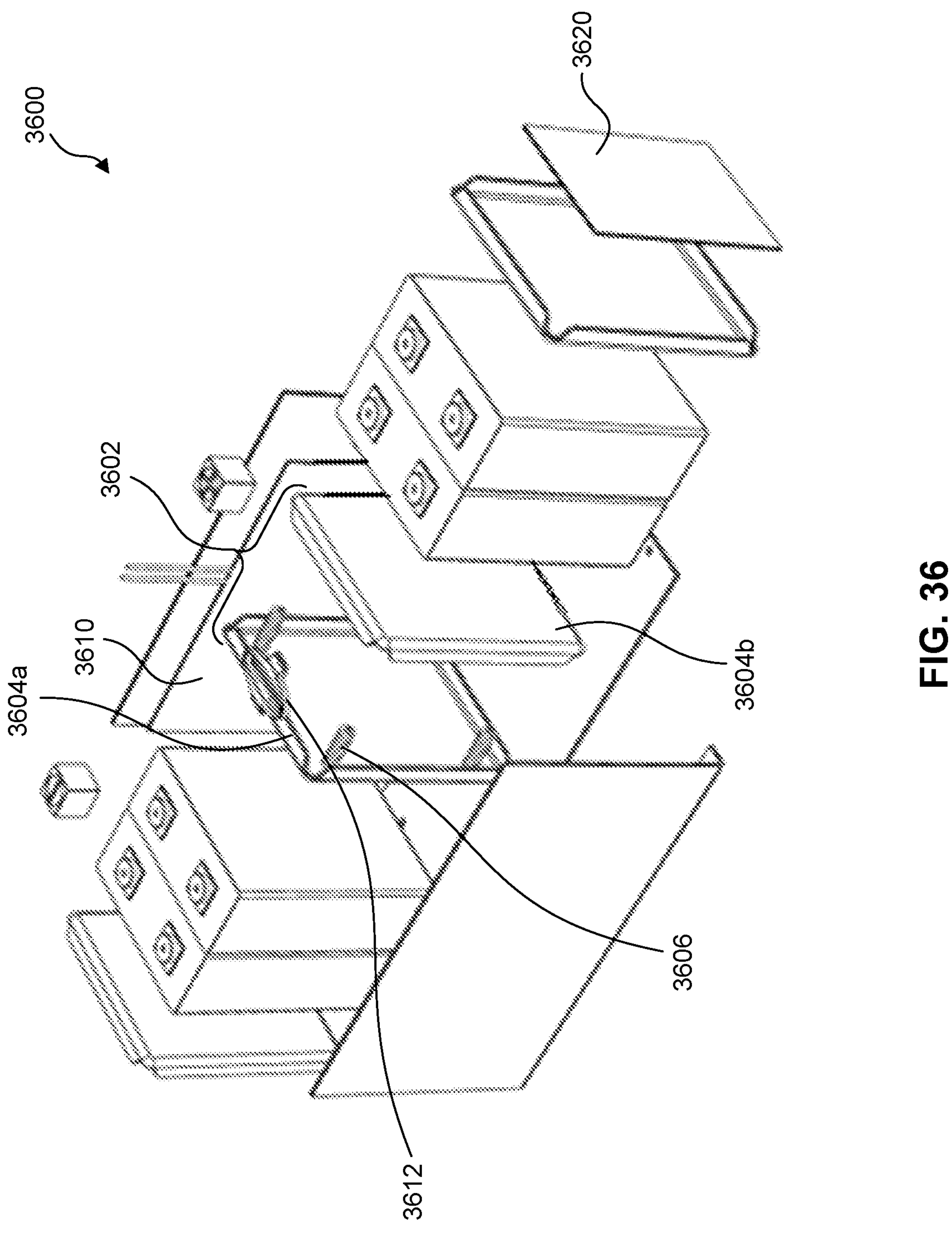
FIG. 36 illustrates an exploded view of a battery module according to an embodiment of the present invention.

FIG. 36 illustrates an exploded view of a battery module 3600 according to an embodiment of the present invention. Battery module 3600 includes a pressure assembly 3602 that includes two plates 3604*a* and 3604*b*, and die springs 3606. In one embodiment, pressure assembly 3602 has four die springs 3606. In other embodiments, pressure assembly 3602 has more or less than four die springs 3606. When pressure is applied to one or both of the plates 3604, the die springs 3606 allow one or both of the plates 3604 to move. This movement can then be detected using a swelling/pressure sensor 3612. Also included in battery module 3600 is a battery management circuit board 3620.

As shown in FIG. 36, in embodiments battery module 3600 includes an optional heating film or pad 3610. Heating battery module 3600 enables it to be used in cool environments such as, for example, a forklift truck in a food storage warehouse.

Figure 37:
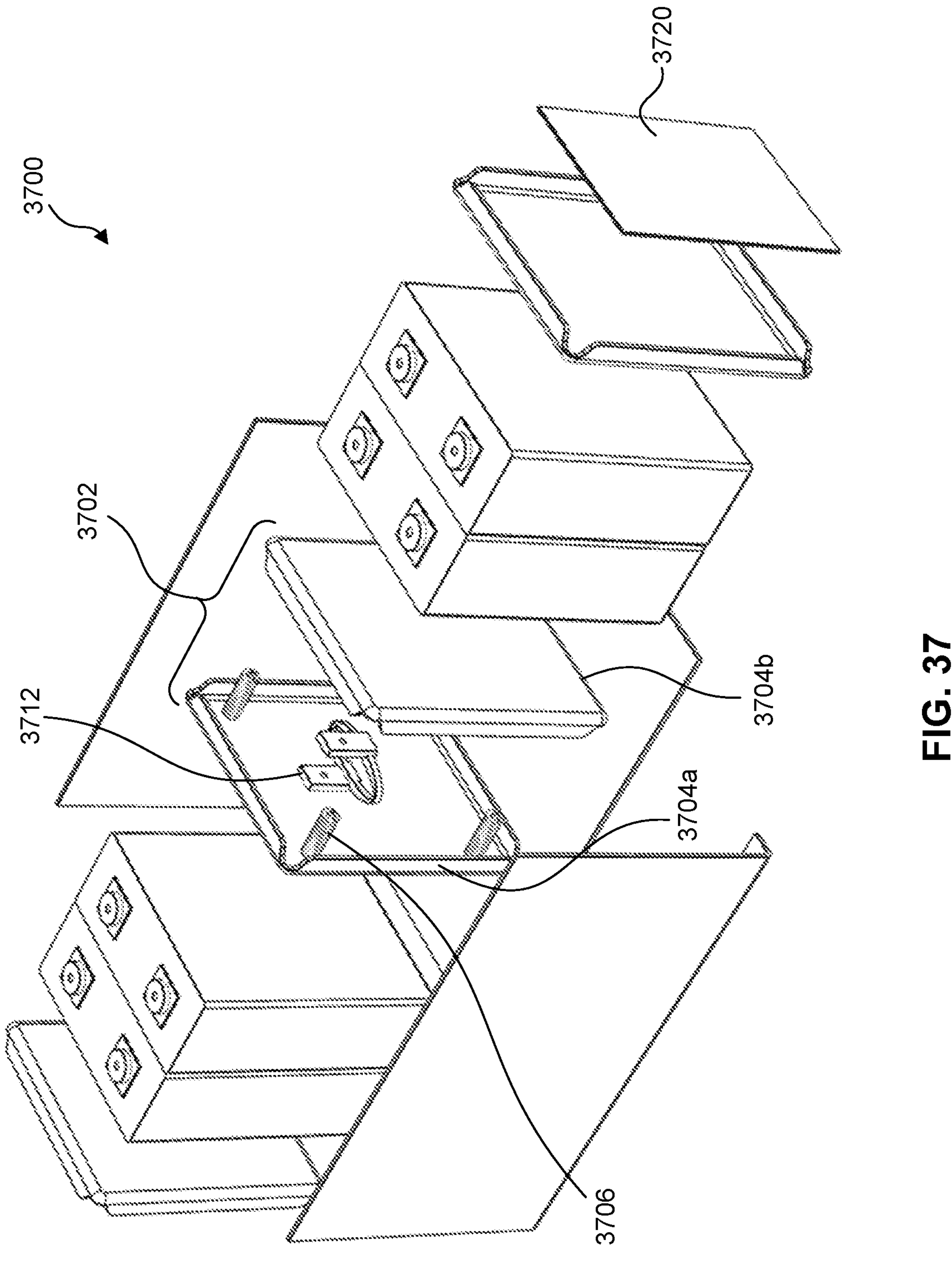
FIG. 37 illustrates an exploded view of a battery module according to an embodiment of the present invention.

FIG. 37 illustrates an exploded view of a battery module 3700 according to an embodiment of the present invention. Battery module 3700 includes a pressure assembly 3702 that includes two plates 3704*a* and 3704*b*, and die springs 3706. In one embodiment, pressure assembly 3702 has four die springs 3706. In other embodiments, pressure assembly 3702 has more or less than four die springs 3706. When pressure is applied to one or both of the plates 3704, the die springs 3706 allow one or both of the plates 3704 to move. This movement can then be detected using a swelling/pressure sensor 3712, which may be disposed between the plates 3704 and at a location within the perimeter of the plates 3704. Also included in battery module 3700 is a battery management circuit board 3720.

Figure 38:
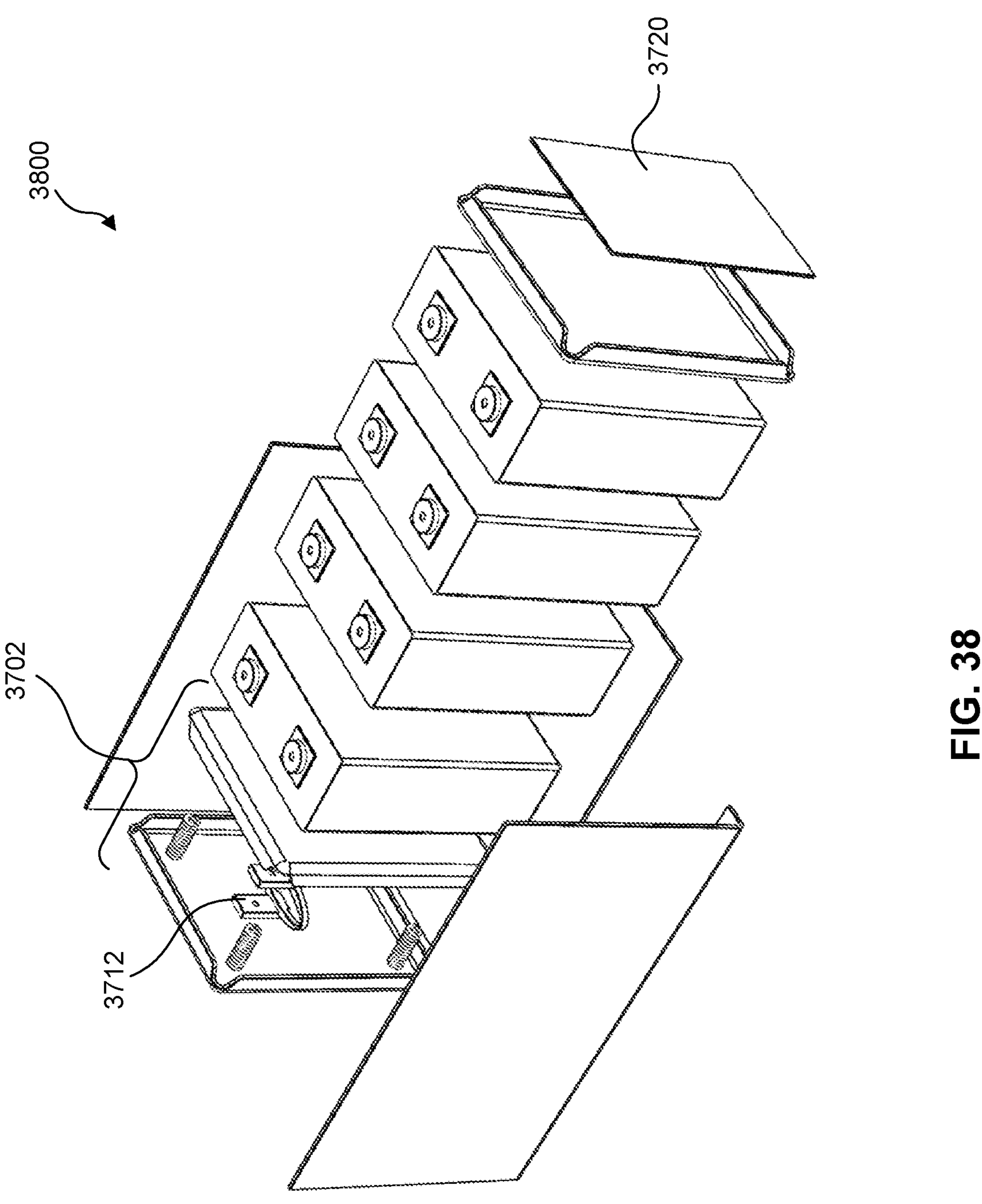
FIG. 38 illustrates an exploded view of a battery module according to an embodiment of the present invention.

FIG. 38 illustrates an exploded view of a battery module 3800 according to an embodiment of the present invention. Battery module 3800 is similar to battery module 3700 except that the pressure assembly 3702 has been relocated from the middle of the four battery cells to one end of battery module 3800. As shown in FIG. 38, pressure assembly 3702 includes a swelling/pressure sensor 3712. Also included in battery module 3800 is a battery management circuit board 3720.

Figure 39:
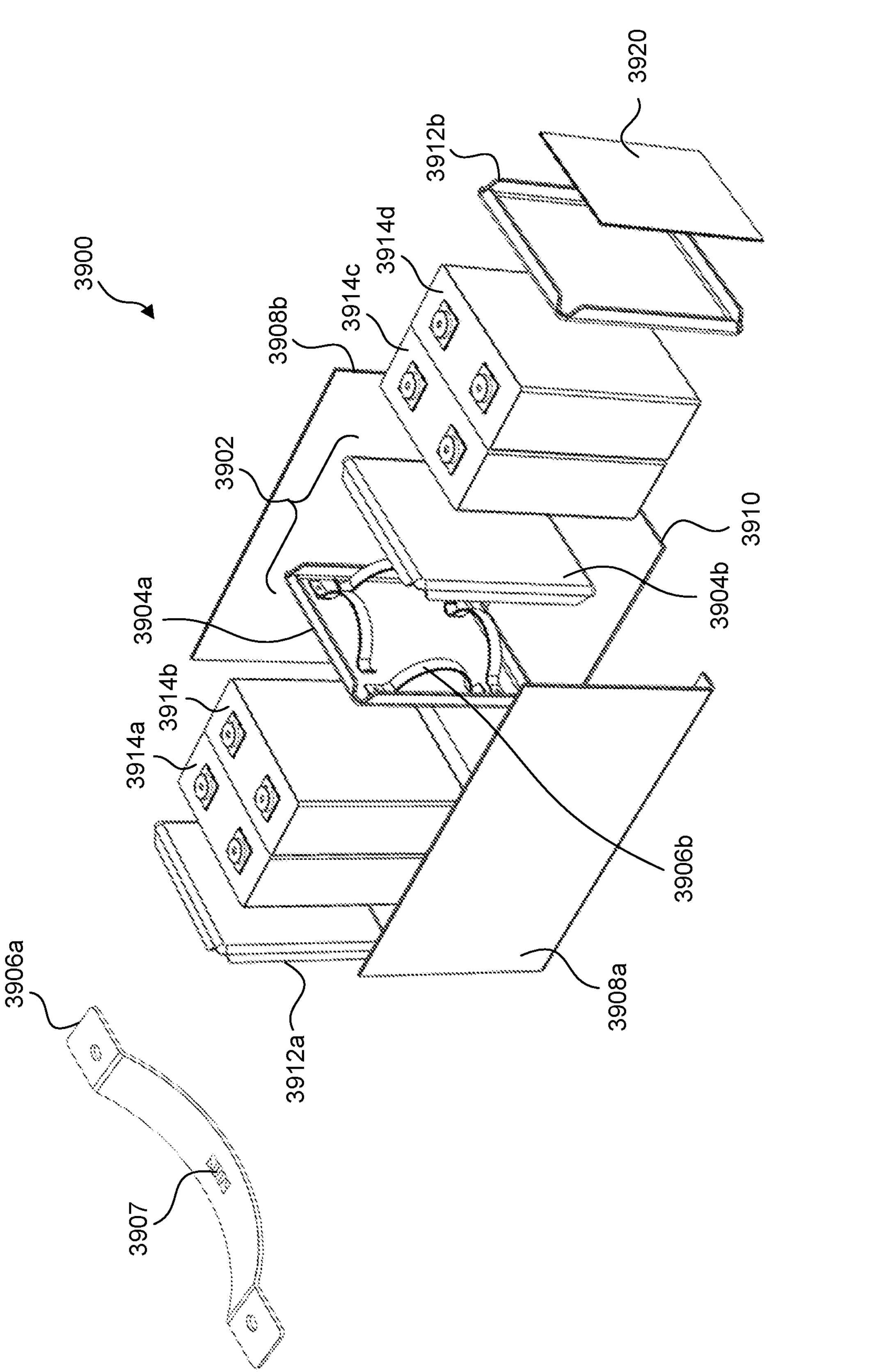
FIG. 39 illustrates an exploded view of a battery module according to an embodiment of the present invention.

FIG. 39 illustrates an exploded view of a battery module 3900 according to an embodiment of the present invention. Battery module 3900 includes a pressure assembly 3902 that includes two plates 3904*a* and 3904*b*, and leaf springs 3906 (such as leaf springs 3906*a*-3906*b*). In one embodiment, pressure assembly 3902 has four leaf springs 3906. In other embodiments, pressure assembly 3902 has more or less than four leaf springs 3906. When pressure is applied to one or both of the plates 3904, the leaf springs 3906 allow one or both of the plates 3904 to move. This movement can then be detected using a swelling/pressure sensor as described herein. In one embodiment, the swelling/pressure sensor is one or more leaf spring(s) 3906 having a strain gauge 3907.

As illustrated in FIG. 39, battery module 3900 also includes two side plates 3908*a* and 3908*b*, a bottom plate 3910, and two end plates 3912*a* and 3912*b*. As shown, battery module 3900 includes four battery cells 3914*a*-3914*d*, end plates 3912*a*-3912*b*, and bottom plate 3910. A battery management circuit board 3920 is coupled to end plate 3912*b*. The battery management circuit board 3920 includes electrical circuits similar to those described herein, for example, with references to FIGS. 10A-10Q.

Figure 40:
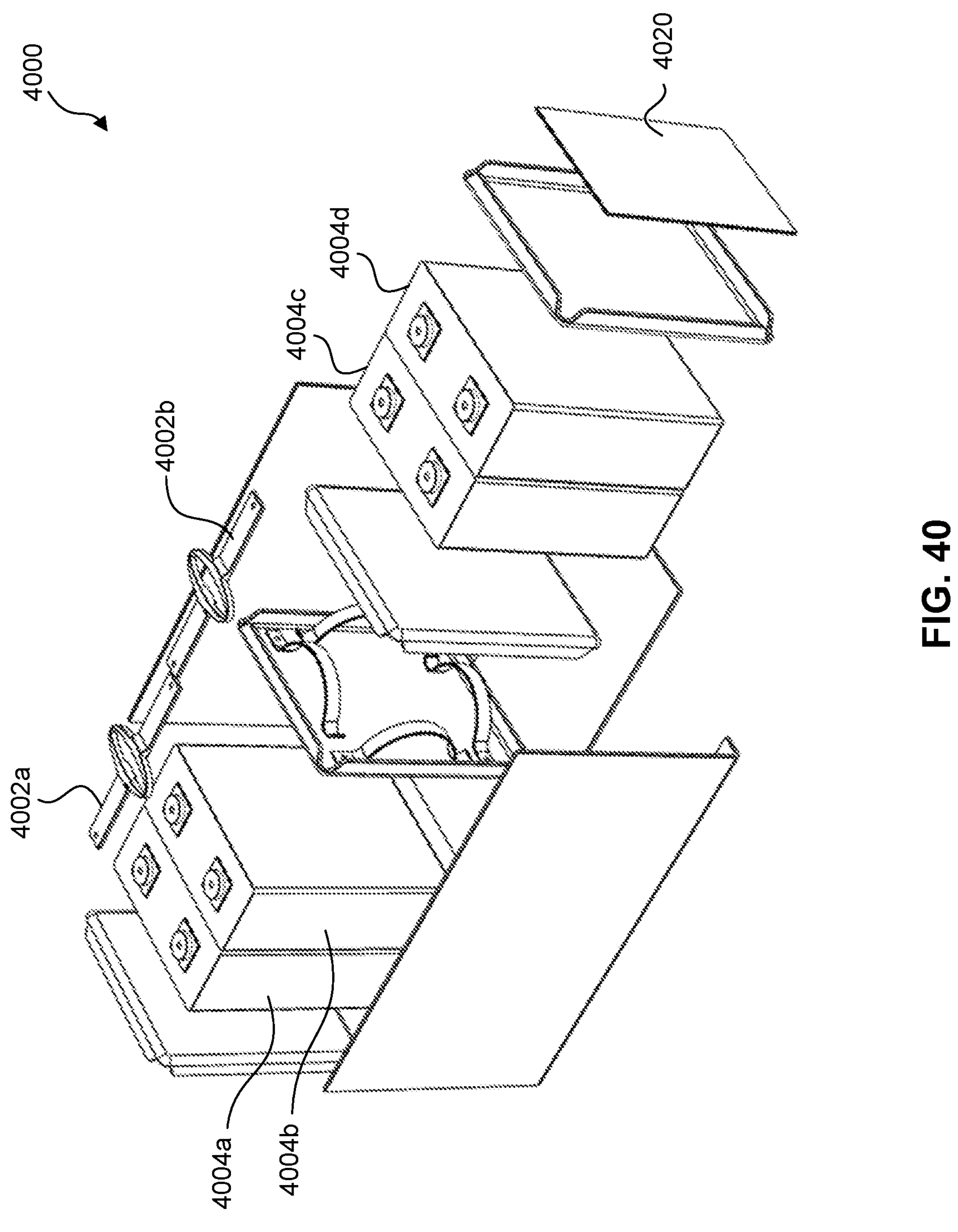
FIG. 40 illustrates an exploded view of a battery module according to an embodiment of the present invention.

FIG. 40 illustrates an exploded view of a battery module 4000 according to an embodiment of the present invention. Battery module 4000 is similar to battery module 3900 except that it has two swelling/pressure sensors 4002*a* and 4002*b* to detect swelling of the battery cells 4004*a*-4004*d*, or an increased internal pressure of the battery cells 4004*a*-4004*d*. Battery module 4000 also includes a battery management circuit board 4020.

Figure 41:
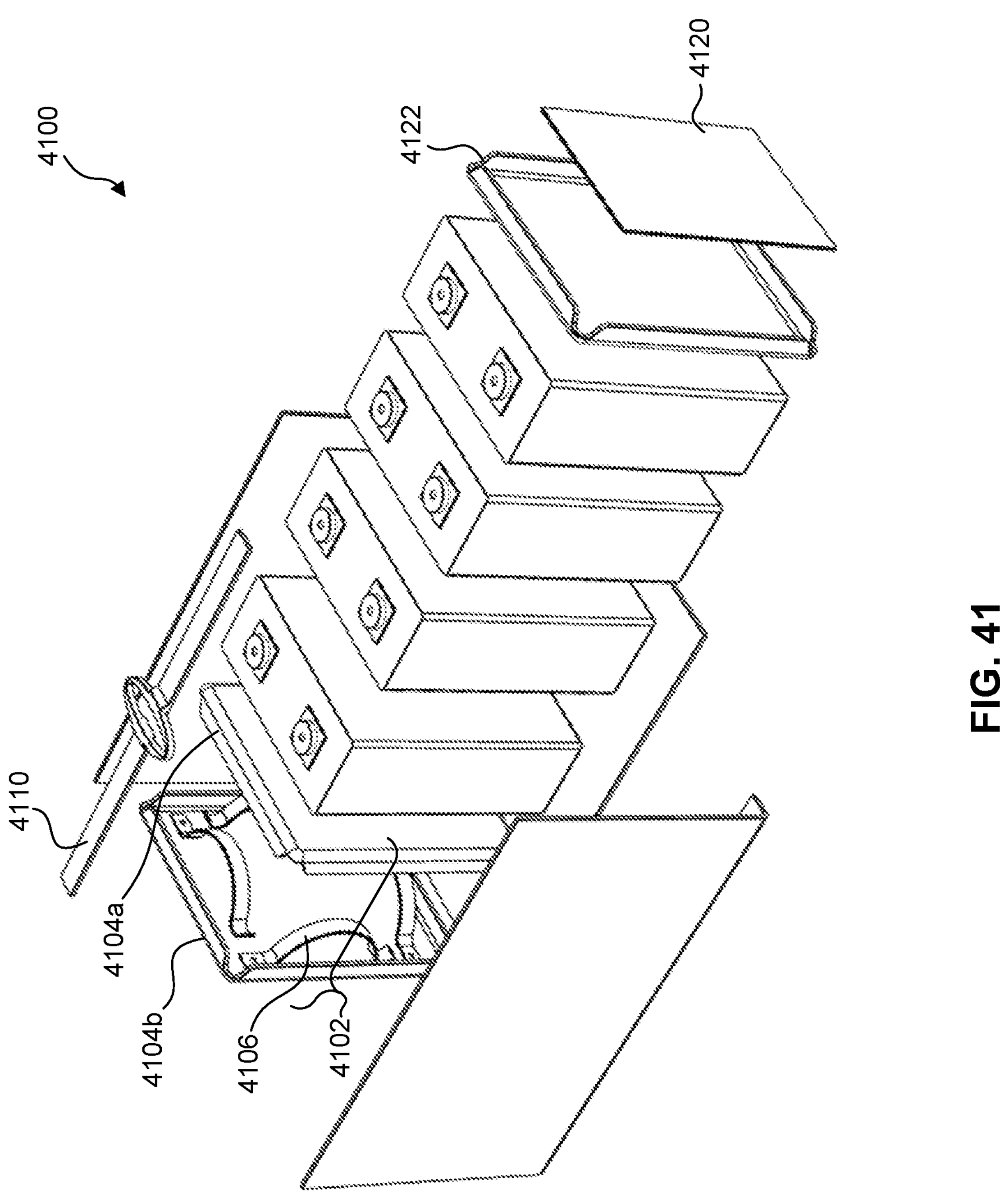
FIG. 41 illustrates an exploded view of a battery module according to an embodiment of the present invention.

FIG. 41 illustrates an exploded view of a battery module 4100 according to an embodiment of the present invention. Battery module 4100 includes a pressure assembly 4102 at one end of battery module 4100. As shown, pressure assembly 4102 includes two plates 4104*a* and 4104*b*. It also includes leaf springs 4106 and a swelling/pressure sensor 4110. There is a battery management circuit board 4120 attached to an end plate 4122.

Figure 42:
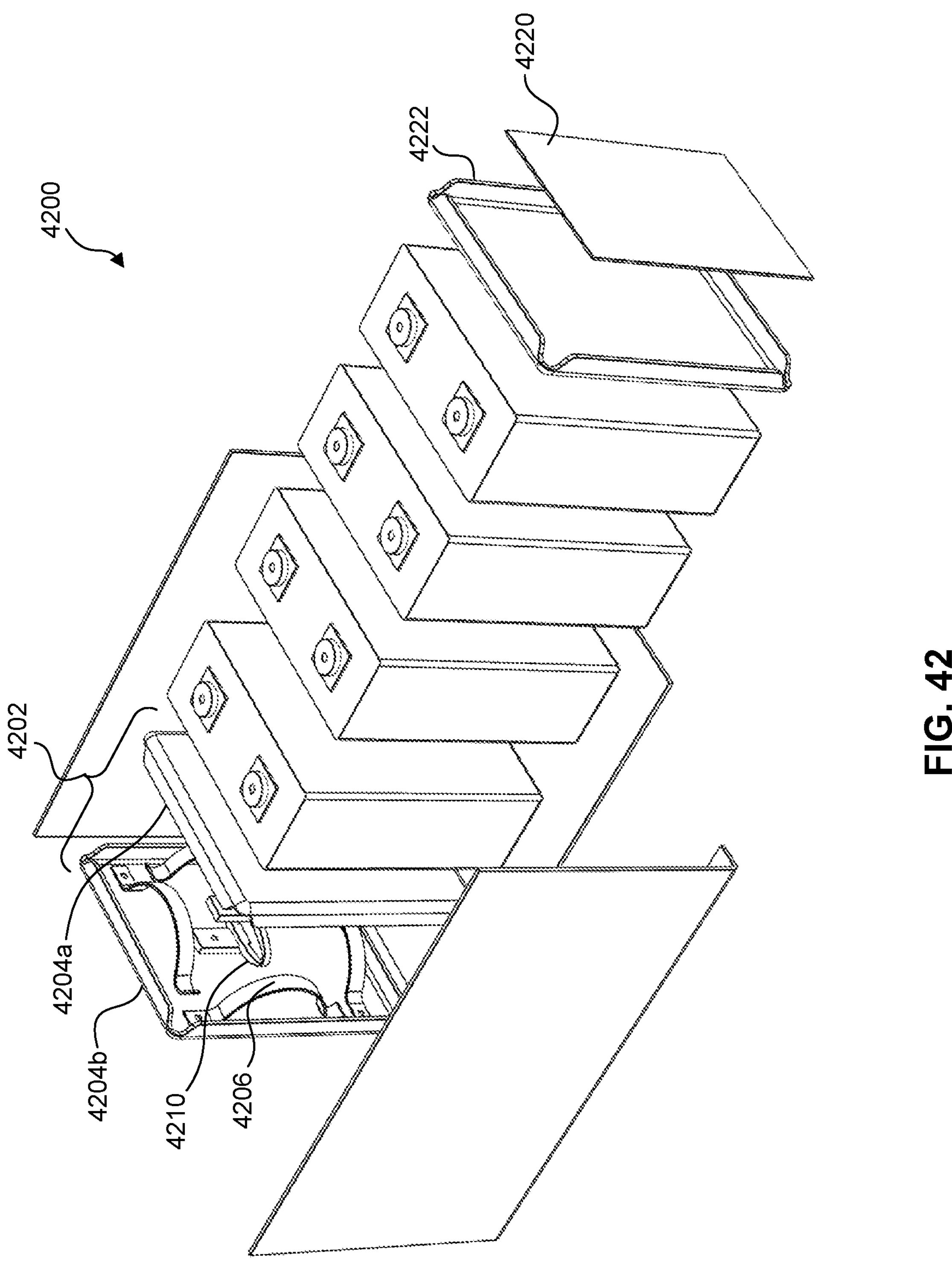
FIG. 42 illustrates an exploded view of a battery module according to an embodiment of the present invention.

FIG. 42 illustrates an exploded view of a battery module according to an embodiment of the present invention. Battery module 4200 includes a pressure assembly 4202 at one end of battery module 4200. As shown, pressure assembly 4202 includes two plates 4204*a* and 4204*b*. It also includes leaf springs 4206 and a swelling/pressure sensor 4210. The swelling/pressure sensor 4210 may be disposed between plates 4204*a*-4204*b* at a location within the perimeter of the plates 4204*a*-4204*b*. There is a battery management circuit board 4220 attached to an end plate 4222.

Figure 43:
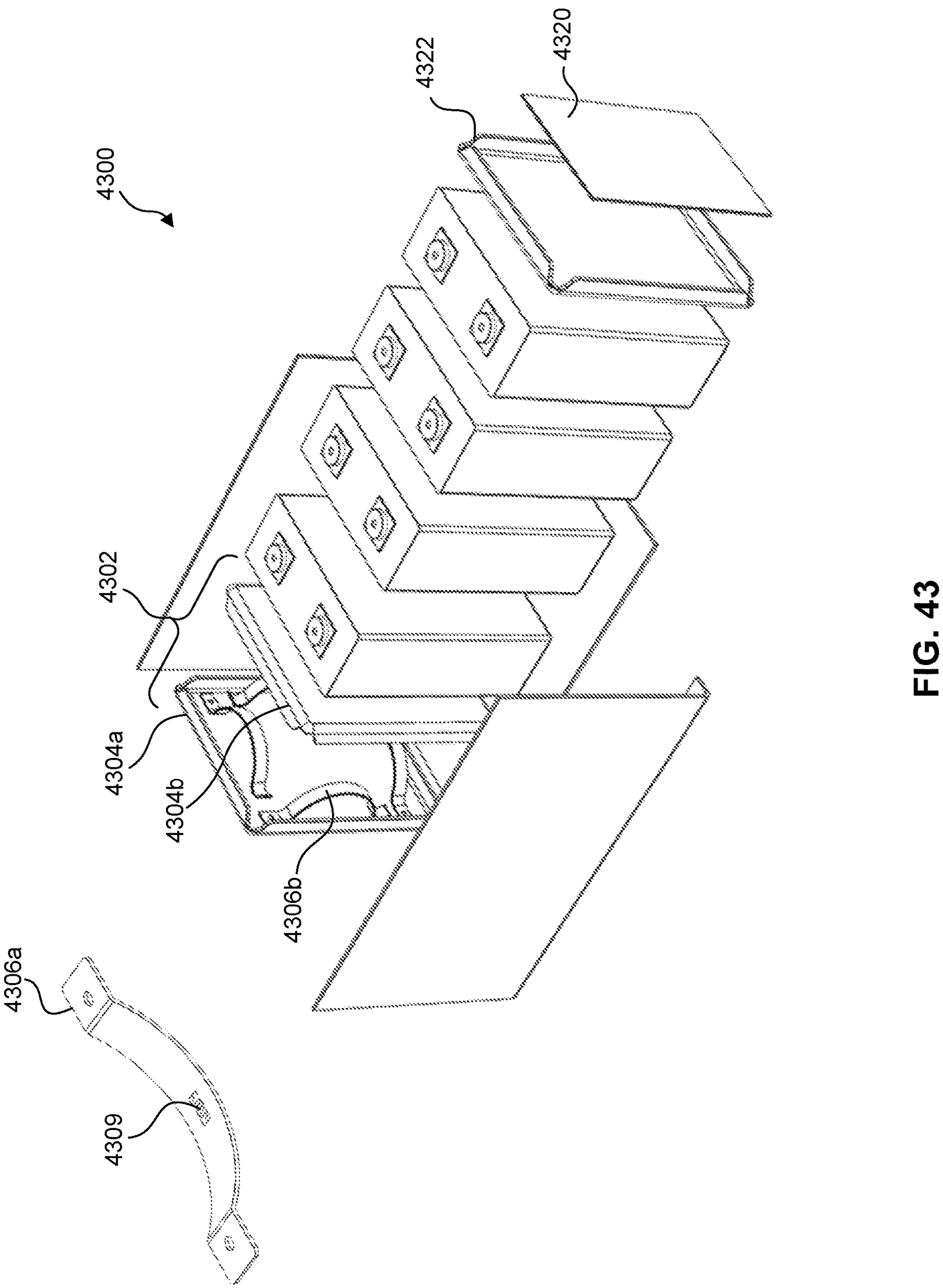
FIG. 43 illustrates an exploded view of a battery module according to an embodiment of the present invention.

FIG. 43 illustrates an exploded view of a battery module 4300 according to an embodiment of the present invention. Battery module 4300 includes a pressure assembly 4302 at one end of battery module 4300. As shown, pressure assembly 4302 includes two plates 4304*a* and 4304*b*. It also includes leaf springs 4306, such as leaf springs 4306*a* and 4306*b*. Leaf spring 4306*a* comprise strain gauge 4309 attached to it. In embodiments, more than one leaf spring 4306 with a strain gauge 4309 is included in pressure assembly 4302, such as four leaf springs. There is a battery management circuit board 4320 attached to an end plate 4322.

Figure 44:
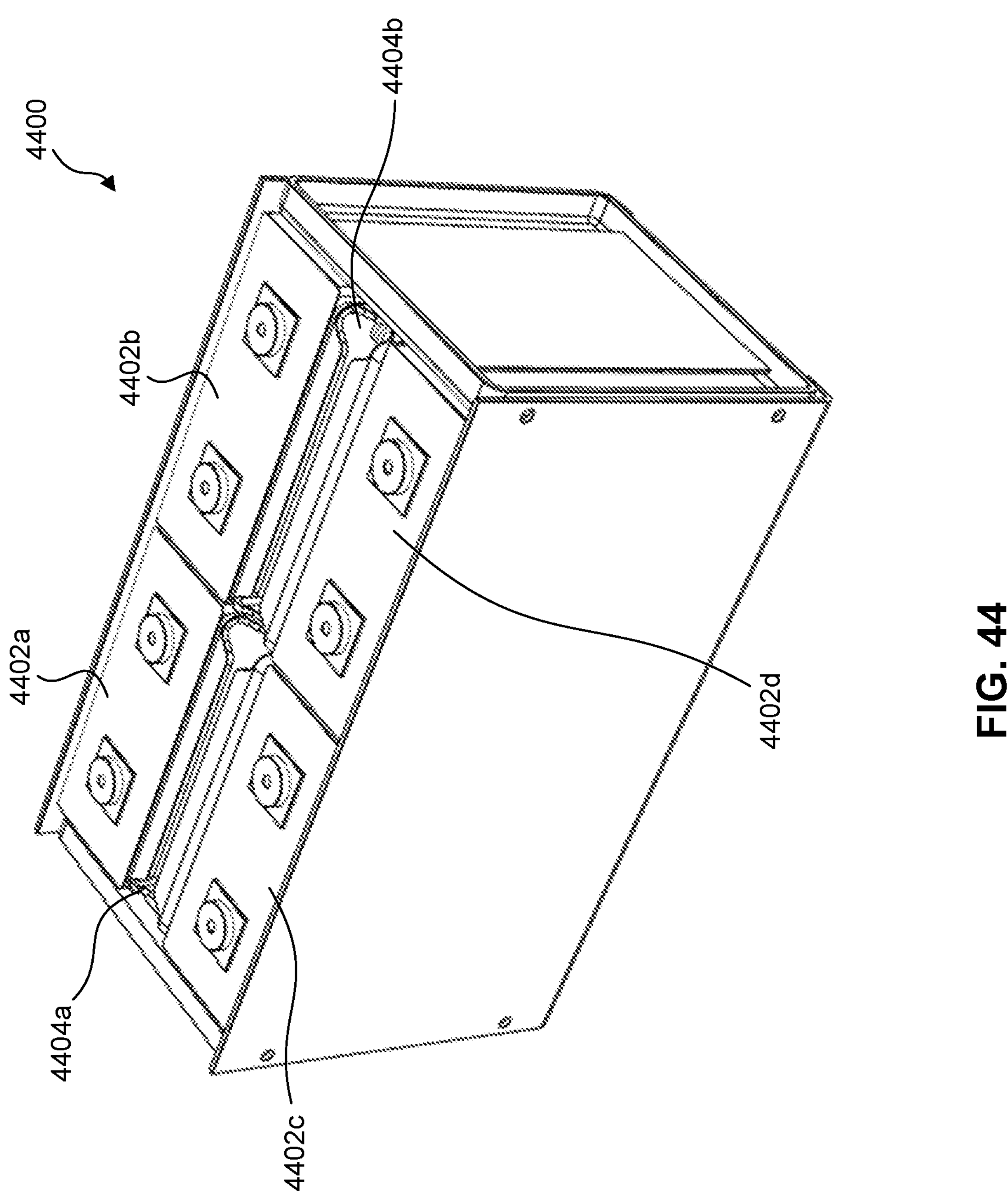
FIG. 44 illustrates a battery module according to an embodiment of the present invention.

FIG. 44 illustrates a battery module 4400 according to an embodiment of the present invention. As shown in FIG. 44, mattery module 4400 includes four battery cells 4402*a*-4402*d* and two pressure assemblies 4404*a* and 4404*b*. The pressure assemblies 4404 are similar to those described above with respect to other battery modules according to the present invention. Arranging the battery cells 4402 as shown in FIG. 44 makes the width of battery module 4400 smaller so that it can fit applications in which arranging the battery cells differently might make the module too wide.

Figure 45:
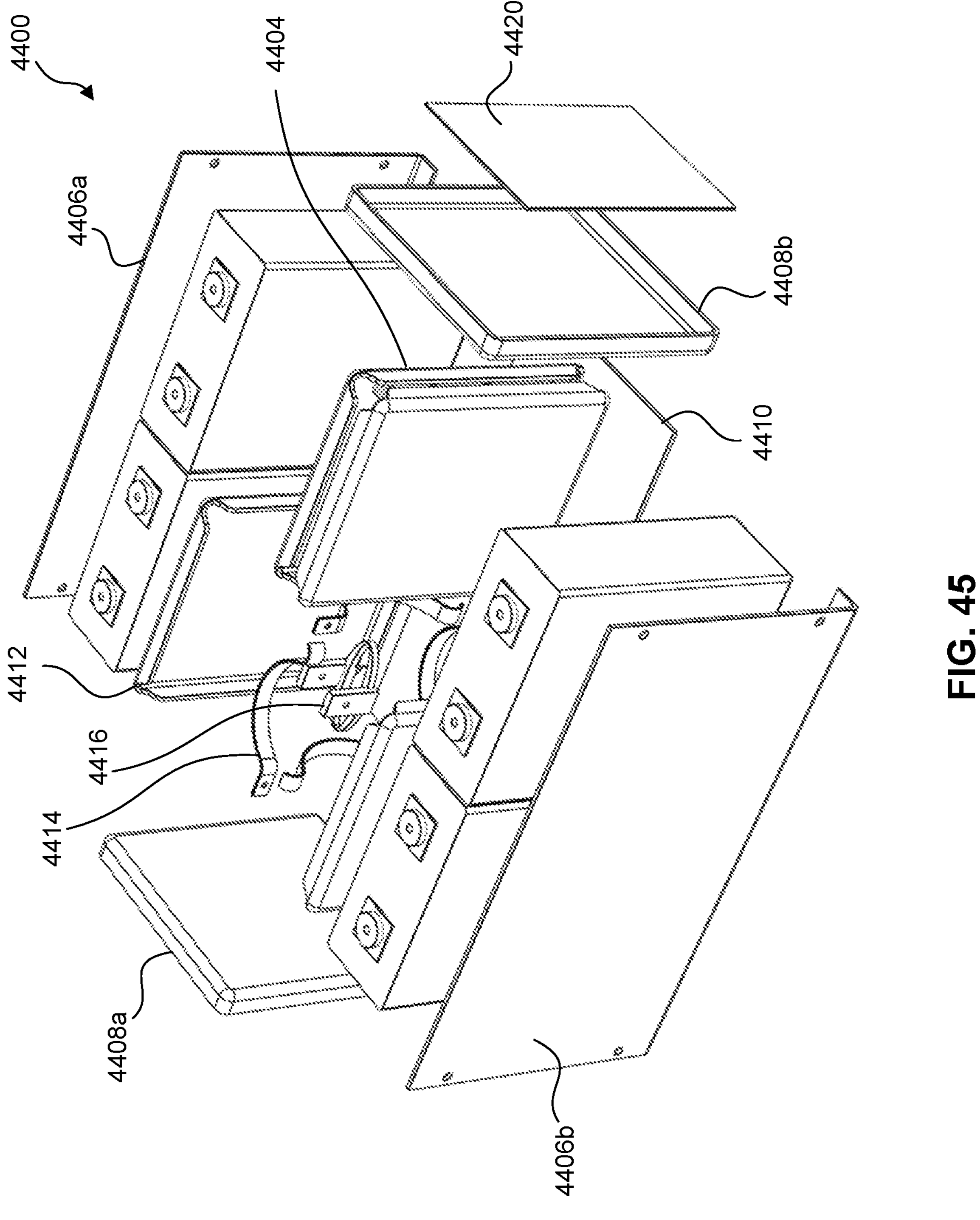
FIG. 45 illustrates a battery module according to an embodiment of the present invention.

FIG. 45 illustrates an exploded view of battery module 4400 according to an embodiment of the present invention. As shown in FIG. 45, battery module 4400 also includes two side plates 4406*a*-4406*b*, two end plates 4408*a*-4408*b*, and a bottom plate 4410. In an embodiment, each pressure assembly 4404 includes two plates 4412, leaf springs 4414 and a swelling/pressure sensor 4416. In other embodiments of the present invention, the pressure assemblies use die springs and/or other types of swelling/pressure sensors as described herein.

Figure 46:
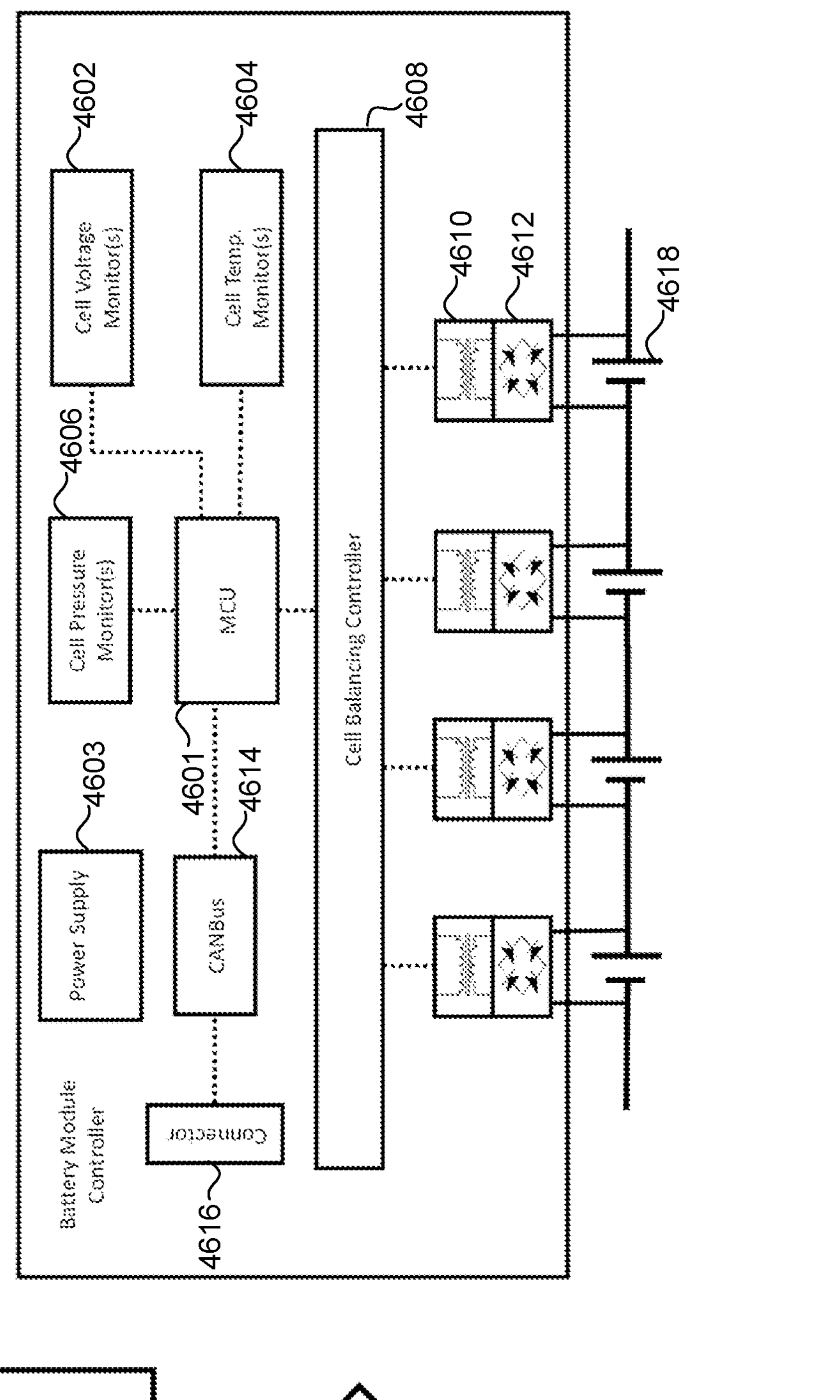
FIG. 46 illustrates a battery module controller according to an embodiment of the present invention.
Figure 46:
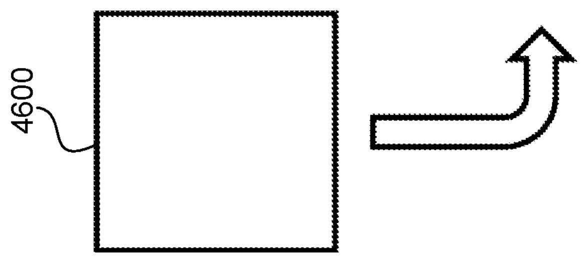

FIG. 46 illustrates a battery management circuit board 4600 according to an embodiment of the present invention. In an embodiment, battery management circuit board 4600 includes a power supply 4603, a microcontroller unit (MCU) 4601, cell voltage monitors 4602, cell temperature monitors 4604, cell pressure monitors 4606, a cell balancing controller 4608, balancing transformers 4610, and balancing rectifiers 4612. In an embodiment, MCU 4601 communicates with a higher-level controller using a CANBus communications circuit 4614. The CANBus communications circuit is connected to the higher-level controller using a connector 4616. In an embodiment, the higher-level controller is a battery system controller as described herein with reference to FIG. 47.

In operation, power supply 4603 draws power from either a power grid, battery cells of a battery module, or both, and converts this power to AC power and DC voltages needed to operate the components of battery module controller 4600. The AC power output by power supply 4604 is supplied to the cell balancing transformers 4610 and balancing rectifiers 4612 for balancing cells 4618. Power supply 4604 produces DC power required to operate the various components of battery management circuit board 4600 such as, for example, MCU 4601, cell voltage monitors 4602, cell temperature monitors 4604, cell pressure monitors 4606, and cell balancing controller 4608. MCU 4601 runs the firmware and software that controls the operation and functions of battery management circuit board 4600. These functions include monitoring the voltage, temperature and pressure of the battery cells that make up a battery module controlled by battery management circuit board 4600. The functions also include balancing the battery cells of the battery module and communicating data about the battery module and battery cells to a higher-level controller such as, for example, a battery system controller as described below. Cell voltage monitor(s) 4602, cell temperature monitor(s) 4604, and cell pressure monitor(s) 4606 are the hardware sensors and circuits needed to monitor the battery cell voltages, temperatures, and pressures. Cell balancing controller 4608 is the hardware needed to provide balancing current/power to the individual battery cells 4618 of the battery module controlled by battery management circuit board 4600. More details regarding these functions and the associated hardware are provided above, for example, with reference to FIGS. 10A-10Q. As will be understood by persons skilled in the relevant art(s), hardware other than that described herein can be used to monitor battery cell voltages and temperatures, and to balance battery cells of a battery module according to the present invention.

Figure 47:
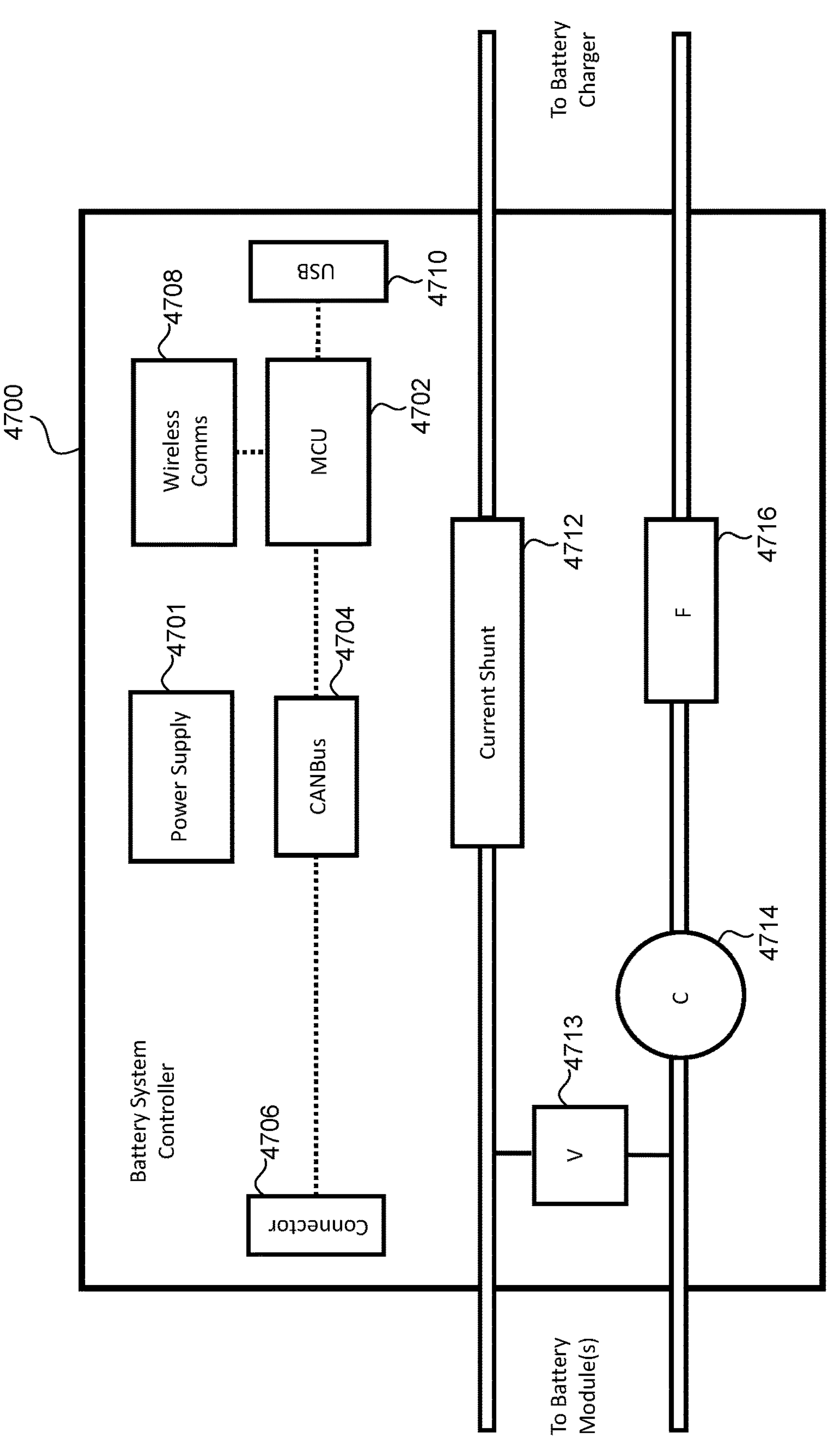
FIG. 47 illustrates a battery system controller according to an embodiment of the present invention.

FIG. 47 illustrates a battery system controller 4700 according to an embodiment of the present invention. Battery system controller includes a power supply 4701, an MCU 4702, CANBus communications 4704 and wireless communications 4708. In an embodiment, MCU 4702 uses CANBus communications 4704 to exchange messages and data with one or more battery modules as described herein. In an embodiment, this data is the same or similar to the data shown in GUI 1300 of FIG. 13. The battery module(s) CANbus communications are coupled to the battery system controller's CANbus communications 4704 using a connector 4706. MCU 4702 uses wireless communications 4708 to talk to higher level software, for example, a monitoring or controlling computer. In an embodiment, the wireless communications use TCP/IP. Battery system controller 4700 also includes an optional USB 4710 that can be used for connecting, for example, to a laptop computer during maintenance and/or testing, or when programming MCU 4702 or when changing software and/or firmware settings.

In embodiments, battery system controller 4700 also includes a current measuring circuit 4712, a voltage measuring circuit 4713, a contactor 4714, and a fuse 4716. The current measuring circuit is used to monitor the charging and discharging current of controlled battery modules. The voltage measuring circuit 4713 is used to monitor the voltage of battery module(s) controlled by battery system controller 4700. The contactor, controlled by MCU 4702, can be closed to allow the charging and discharging of connected battery module(s), or opened to prevent the charging and discharging of connected battery modules. The fuse is for short circuit protection and to disconnect battery modules should the contactor not open during a short circuit. In embodiments, MCU 4702 opens contactor 4714 if there is an over-current event, over-voltage event, or an under-voltage event. The output of the current measuring circuit 4712 and the voltage measuring circuit 4713 can be multiplied together to get power, which is also monitored in embodiments of the present invention.

In embodiments, the battery management circuit boards of the various battery modules described herein send warning messages and alarm messages to battery system controller 4700, and when these warnings and alarms are received, battery system controller 4700 will take action to respond to the warning and alarms such as, for example, sending a message to a connected charger to stop charging or by opening contactor 4714 to prevent the over-charging or over-discharging of connected battery modules.

Figure 48:
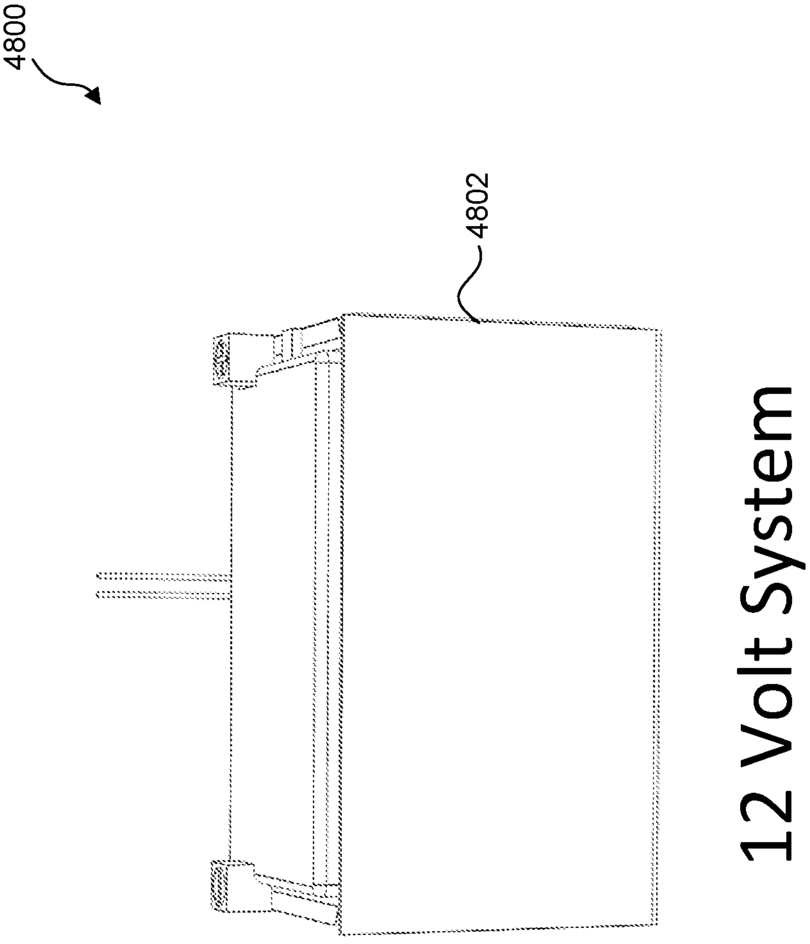
FIG. 48 illustrates a 12 Volt battery system according to an embodiment of the present invention.

FIG. 48 illustrates a 12 Volt battery system 4800 according to an embodiment of the present invention. Battery system 4800 includes one or more battery modules 4802. If there are more than one battery module 4802, these battery modules are connected in parallel.

Figure 49:
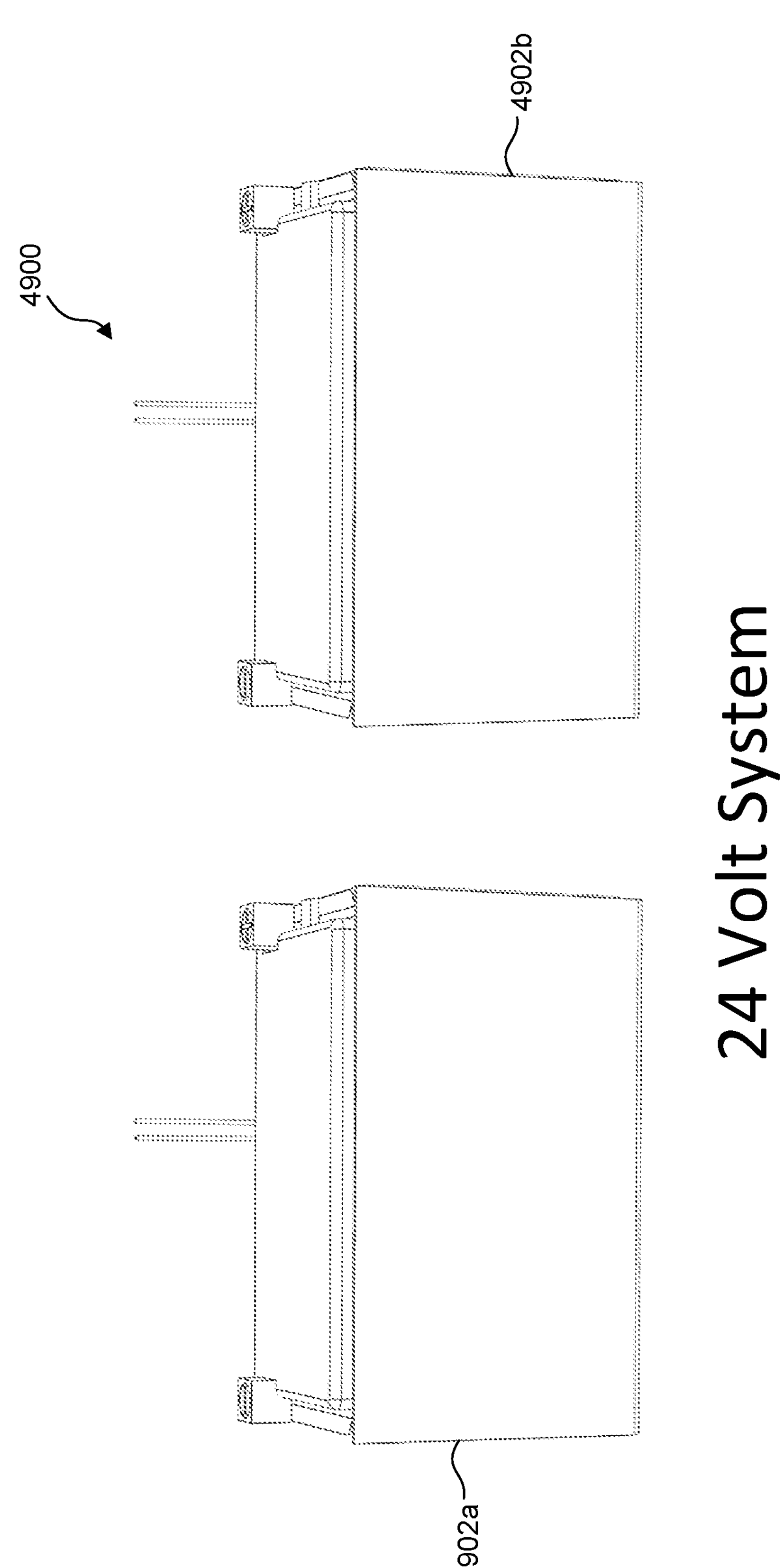
FIG. 49 illustrates a 24 Volt battery system according to an embodiment of the present invention.

FIG. 49 illustrates a 24 Volt battery system 4900 according to an embodiment of the present invention. Battery system 4900 includes at least two battery modules 4902*a* and 4902*b*. These two battery modules are connected in series. In embodiments, battery system 4900 includes additional sets of two battery modules 4902, which are connected in parallel to the two battery modules shown in FIG. 49.

Figure 50:
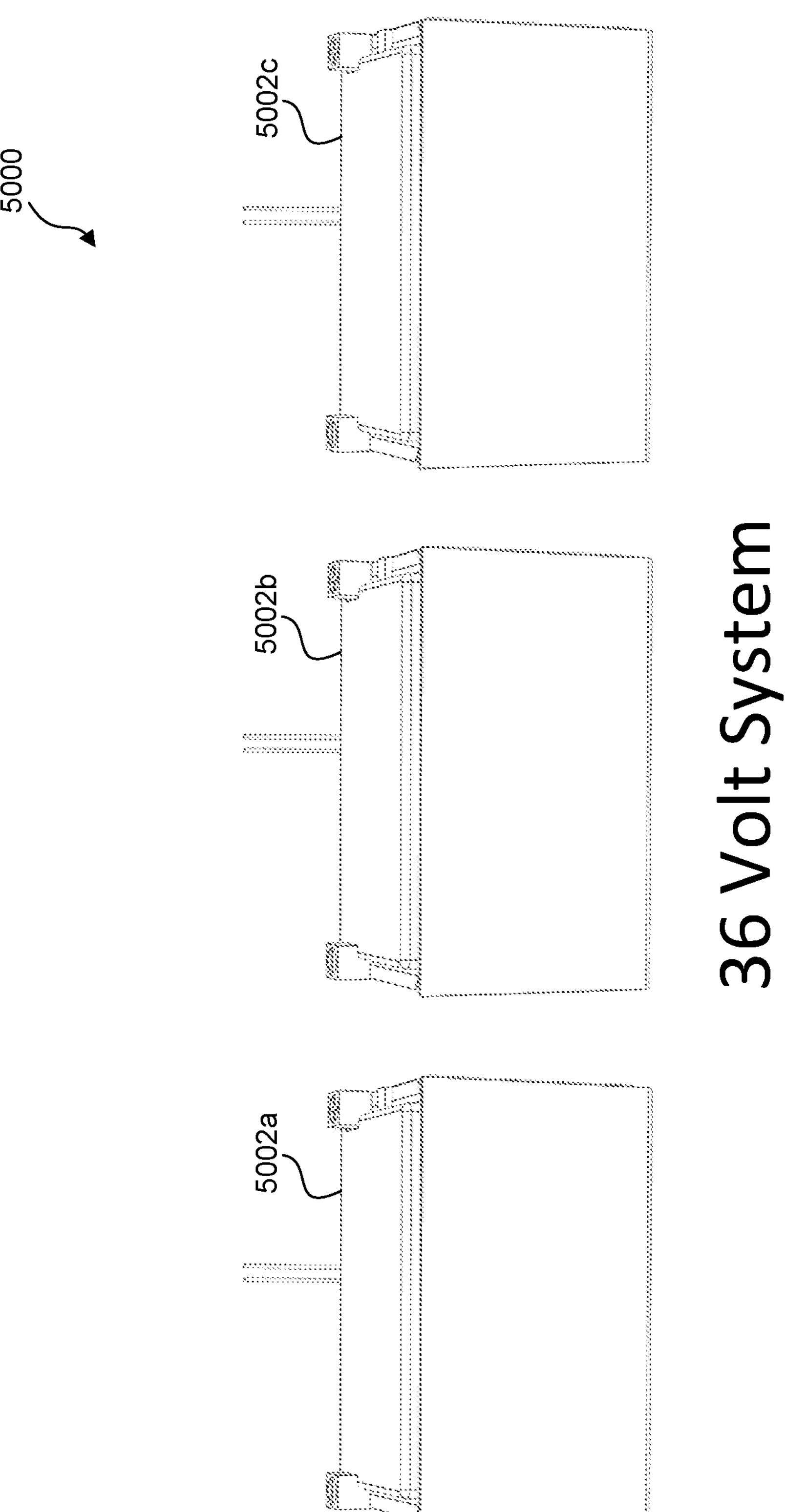
FIG. 50 illustrates a 36 Volt battery system according to an embodiment of the present invention.

FIG. 50 illustrates a 36 Volt battery system 5000 according to an embodiment of the present invention. Battery system 5000 includes at least three battery modules 5002*a*, 5002*b*, and 5002*c*. These three battery modules are connected in series. In embodiments, battery system 5000 includes additional sets of three battery modules 5002, which are connected in parallel to the three battery modules shown in FIG. 50.

Figure 51:
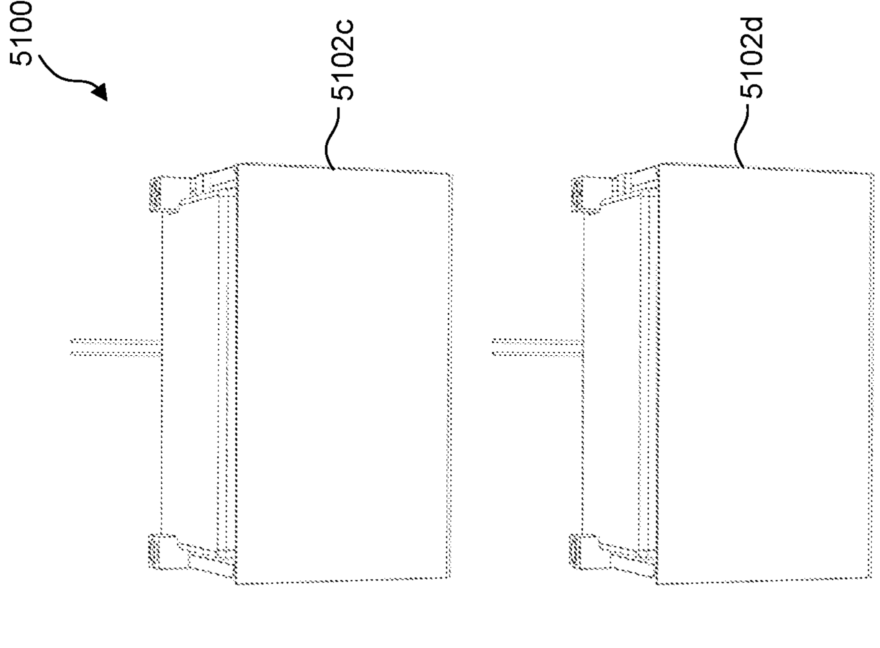
FIG. 51 illustrates a 48 Volt battery system according to an embodiment of the present invention.
Figure 51:
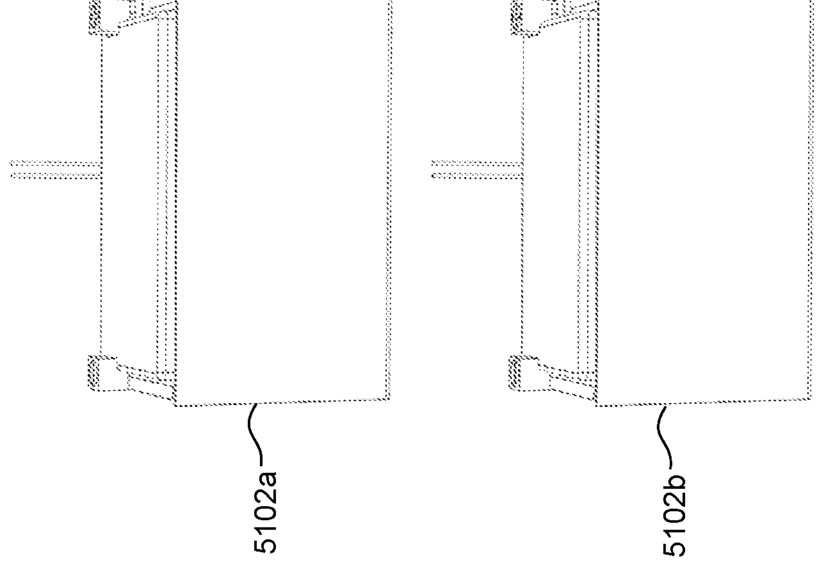

FIG. 51 illustrates a 48 Volt battery system 5100 according to an embodiment of the present invention. Battery system 5100 includes at least four battery modules 5102*a*, 5102*b*, 5102*c*, and 5102*d*. These four battery modules are connected in series. In embodiments, battery system 5100 includes additional sets of four battery modules 5102, which are connected in parallel to the four battery modules shown in FIG. 51.

Additional battery systems can be implemented using battery modules according to the present invention. How to configure and arrange these battery modules to achieve a desired battery system voltage and a desired energy storage capacity will be understood by persons skilled in the relevant art(s).

Figure 52:
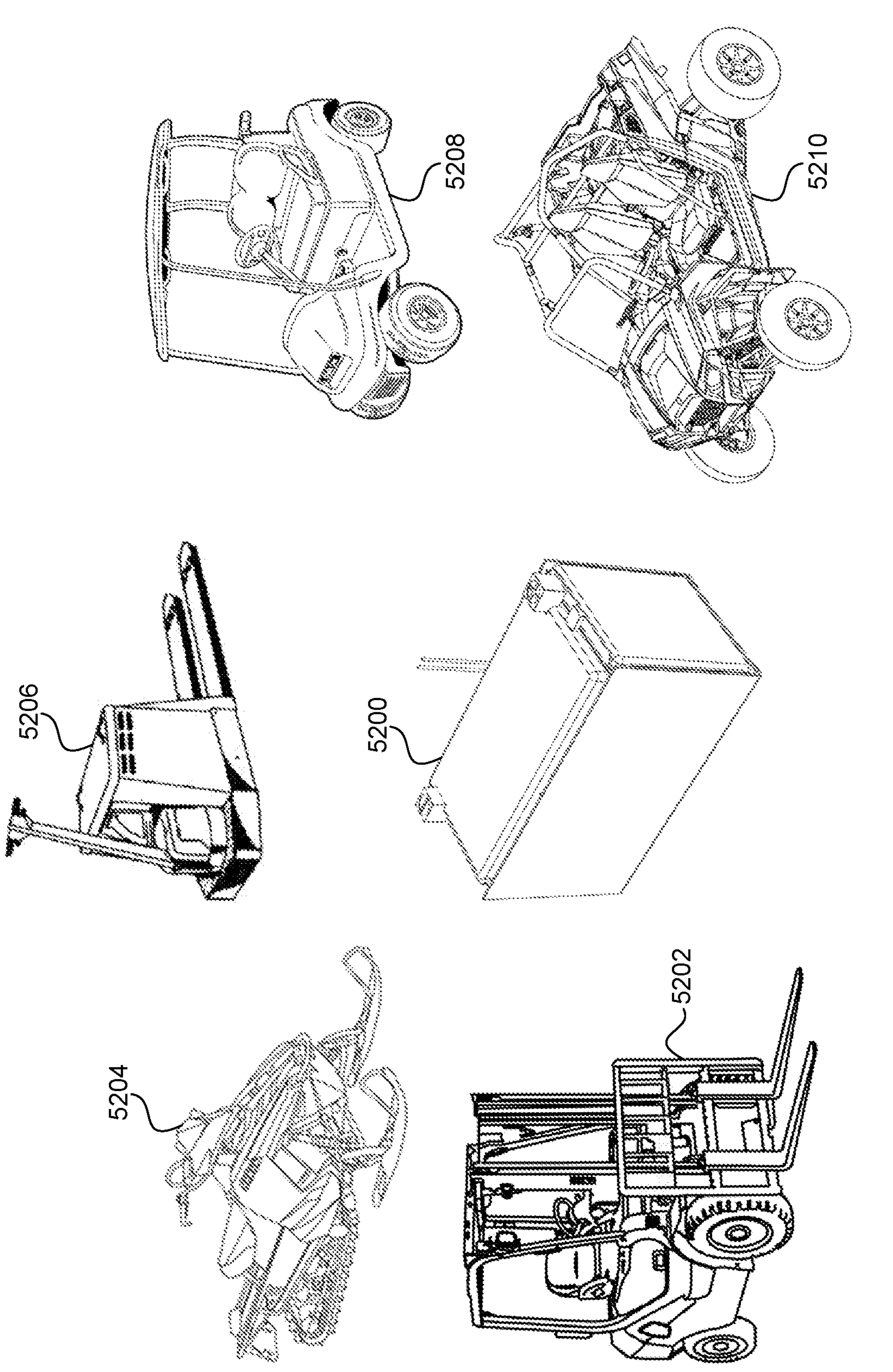
FIG. 52 illustrates various example vehicles that can be powered by battery modules according to the present invention.

FIG. 52 illustrates various example vehicles that can be powered by battery modules 5200 according to the present invention. In embodiments, battery module 5200 is one of the battery modules described herein. These battery modules can be combined in series and/or parallel to make a battery system for powering the vehicles shown, as well as others not shown. As shown in FIG. 52, the vehicles that can be powered include an electric counter-balanced forklift truck 5202, a snowmobile 5204, an electric pallet jack 5206, an electric golf cart 5208, and an electric recreational vehicle 5210. Other vehicles that can be powered will be known to person(s) skilled in the relevant art(s) given the description herein.

Figure 53:
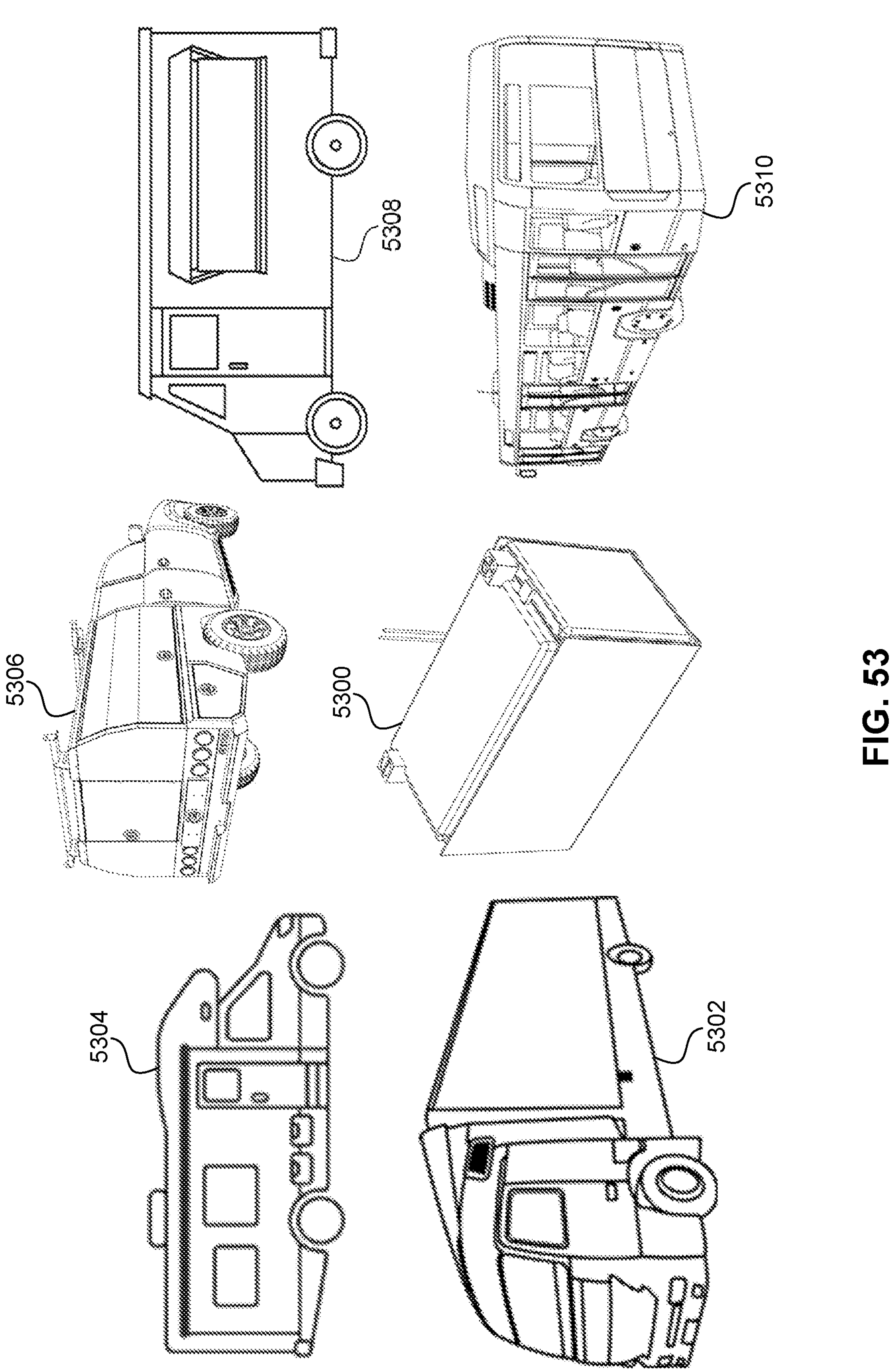
FIG. 53 illustrates various example vehicles having auxiliary electrical systems that can be powered by battery modules according to the present invention.

FIG. 53 illustrates various example vehicles having auxiliary electrical systems that can be powered by battery modules 5300 according to the present invention. In embodiments, battery module 5300 is one of the battery modules described herein. These battery modules can be combined in series and/or parallel to make a battery system for an auxiliary power system included, for example, in the vehicles shown, as well as others not shown. As shown in FIG. 53, vehicles having an auxiliary power system that can be powered using battery modules according to the present invention include a tractor-trailer 5302, a camper or recreational vehicle 5304, a work truck 5306, a food truck 5308, and a bus 5310. Other vehicles having an auxiliary power system that can be powered by battery modules according to the present invention will be known to person(s) skilled in the relevant art(s) given the description herein.

Figure 54:
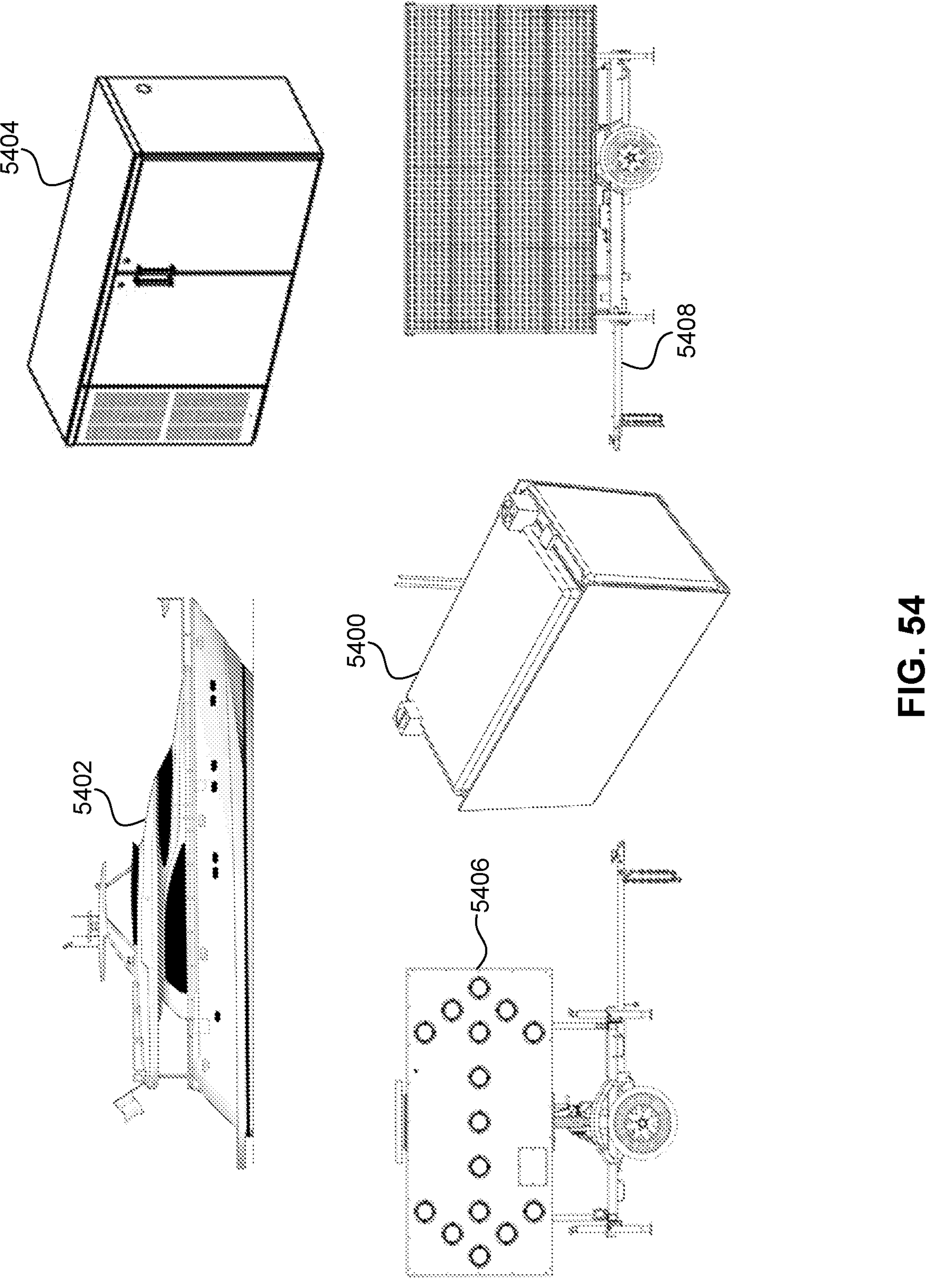
FIG. 54 illustrates various example equipment that can be powered by battery modules according to the present invention.

FIG. 54 illustrates various example equipment that can be powered by battery modules 5400 according to the present invention. In embodiments, battery module 5400 is one of the battery modules described herein. These battery modules can be combined in series and/or parallel to make a battery system for the equipment shown, as well as other equipment not shown. As shown in FIG. 54, the equipment that can be powered using battery modules according to the present invention include a boat 5402, an residential battery energy storage unit 5404, and construction signs 5406 and 5408. Other equipment that can be powered by battery modules according to the present invention will be known to person(s) skilled in the relevant art(s) given the description herein.

In an embodiment, a battery module may include a plurality of battery cells, wherein at least one of the battery cells is in contact with a moveable plate; and a sensor coupled to the movable plate that is configured to detect swelling of at least one of the plurality of battery cells.

In some further embodiments, the sensor comprises a first flexible section having a circular or oval shape, and wherein a first strain gauge is attached to the first flexible section.

In some further embodiments, the first flexible section comprises at least one of metal or plastic.

In some further embodiments, the sensor comprises a second flexible section, wherein a second strain gauge is attached to the second flexible section, and wherein the first strain gauge and the second strain gauge are electrically connected in series.

In some further embodiments, the battery module may include a tray, in contact with the battery module, configured to collect water and direct the water toward at least one of the plurality of plates.

In some further embodiments, the battery module may include an internal plate, in contact with one of the plurality of battery cells and extending at least partially into the battery module, wherein the tray is configured to direct water to the internal plate to cool the battery module.

In some further embodiments, the battery module may include a controller configured to receive an output signal from the sensor and to generate a control signal, responsive to the output signal from the sensor, wherein the control signal is configured to cause the battery module halt charging and discharging of the at least one of the plurality of battery cells of the battery module.

In some further embodiments, the battery module may include a controller configured to receive an output signal from the sensor and to generate a control signal, responsive to the output signal from the sensor, wherein the control signal is configured to cause the battery module to be electrically disconnected from an electrical bus.

In some further embodiments, the controller comprises a power supply configured to generate an electrical output having an AC frequency greater than 40,000 Hz and less than 280,000 Hz, and wherein the electrical output from the power supply is provided to a balancing circuit configured to balance electrical input to at least two battery cells of the plurality of battery cells.

In some further embodiments, the power supply is coupled to the plurality of battery cells using at least one isolation transformer.

In another embodiment, the battery module includes a plurality of battery assemblies, wherein each battery assembly includes a first battery cell and a second battery cell; an internal plate between the first battery cell and the second battery cell; a first side plate in contact with the first battery cell; a second side plate in contact with the second battery cell; and a sensor coupled to at least one of the first side plate or the second side plate, wherein the sensor is configured to detect movement of at least one of the first side plate or the second side plate, wherein the movement is due to swelling of at least one of the first battery cell or the second battery cell.

In some further embodiments, the sensor comprises a first flexible section having a circular or oval shape, and wherein a first strain gauge is attached to the first flexible section.

In some further embodiments, the first flexible section comprises metal or plastic.

In some further embodiments, the sensor comprises a second flexible section, wherein a second strain gauge is attached to the second flexible section, and wherein the first strain gauge and the second strain gauge are electrically connected in series.

In some further embodiments, the battery module may include a tray, in contact with the battery module, configured to collect water and to direct the water to the first side plate and the second side plate.

In some further embodiments, the battery module may include a tray, in contact with the battery module, configured to collect water and to direct water to the internal plate.

In some further embodiments, the battery module may include a controller configured to receive at least one output signal from the sensor and to generate a control signal, in response to the at least one output signal, wherein the control signal is configured to cause the battery module to halt charging and discharging of at least one of the plurality of battery cells of the battery module.

In some further embodiments, the battery module may include a controller configured to receive at least one output signal from the sensor and to generate a control signal, in response to the at least one output signal, wherein the control signal is configured to cause the battery module to be electrically disconnected from an electrical bus.

In some further embodiments, the controller comprises a power supply configured to generate an electrical output having an AC frequency greater than 40,000 Hertz and less than 280,000 Hertz, and wherein the electrical output from the power supply is provided to a balancing circuit configured to balance electrical input to at least two battery cells of the plurality the battery cells of the plurality of battery assemblies.

In some further embodiments, the power supply is coupled to the battery cells of the battery assemblies using at least one isolation transformer.

In an embodiment, a battery rack, includes a plurality of battery modules, wherein each battery module includes a plurality of battery cells, each battery cell being in contact with a side plate; a sensor, coupled to the side plate, and configured to detect movement of the side plate due to swelling of a battery cell, and a battery module controller configured to receive an output signal from the sensor and to generate a control signal, in response to the output signal, wherein the control signal is configured to cause the battery module to halt charging and discharging of the plurality of battery cells of the battery module; and a battery rack controller having a contactor, wherein the battery rack controller receives the control signal and opens the contactor sufficiently to halt charging and discharging of the battery module having the battery module controller that generated the control signal.

In some further embodiments, the battery rack or any of the battery modules may further include a tray, in contact with the battery module, configured to collect water and to direct water to the side plates of the battery module.

In some further embodiments, the sensor comprises a flexible section having a circular or oval shape, and wherein a strain gauge is attached to the flexible section.

In some further embodiments, the flexible section comprises at least one of metal or plastic.

In some further embodiments, the battery module controller comprises a power supply configured to generate an electrical output, and wherein the electrical output from the power supply is provided to a balancing circuit configured to balance electrical input to at least two of the battery cells of the battery module.

In some further embodiments, the power supply is coupled to the battery cells of the battery module using at least one isolation transformer.

In some further embodiments, the battery rack may include a water sprinkler system configured to spray water on the battery modules.

In some further embodiments, the water sprinkler system is configured to connect to a fire system of a building.

In some further embodiments, the water sprinkler system is configured to connect to a pipe configured to allow water to be pumped into the battery rack.

In some further embodiments, the battery rack may include a hood connected to exhaust ducting, wherein the exhaust ducting is configured to remove gases released by a battery cell of the battery rack.

In some further embodiments, the battery rack may further include a first housing comprising the battery rack controller and a first plurality of battery modules, and a second housing, coupled to the first housing, comprising a second plurality of battery modules.

In some further embodiments, the battery rack may include a third housing, coupled to the first housing, comprising a third plurality of battery modules.

In some further embodiments, a battery rack may include a plurality of battery modules, wherein each battery module includes a plurality of battery cells, each battery cell being in contact with a side plate; a sensor, coupled to the side plate, and configured detect movement of the side plate due to swelling of a battery cell, a tray, in contact with the battery module, configured to collect water and to direct the water to the side plates of the battery module, and a battery module controller configured to receive an output signal from the sensor and to generate a control signal, in response to the output signal, wherein the control signal is configured to cause the battery module to halt charging and discharging of the battery module; a battery rack controller comprising a contactor, wherein the battery rack controller receives the control signal and opens the contactor sufficiently to halt charging and discharging of the battery module having the battery module controller that generated the control signal; and a water sprinkler system configured to spray water on the battery modules.

In some further embodiments, the water sprinkler system is configured to connect to a fire system of a building.

In some further embodiments, the water sprinkler system is configured to connect to a pipe that is configured to allow water to be pumped into the battery rack.

In some further embodiments, the battery rack further includes a hood connected to exhaust ducting, wherein the exhaust ducting is configured to remove gases released by a battery cell of the battery rack.

In some further embodiments, the sensor comprises a flexible section having a circular or oval shape, and wherein a strain gauge is attached to the flexible section.

In some further embodiments, the flexible section comprises at least one of metal or plastic.

In some further embodiments, the battery module controller includes a power supply configured to generate an electrical output, and wherein the electrical output from the power supply is provided to a balancing circuit configured to balance electrical input to at least two of the battery cells of the battery module.

In some further embodiments, the power supply is coupled to the battery cells of the battery module using at least one isolation transformer.

In an embodiment, a battery module may include a sensor configured to detect swelling of a battery cell.

In some further embodiments, an output of the sensor is configured to halt operation of a battery system containing the battery module.

In some further embodiments, an output of the sensor is configured to halt charging and discharging of the battery module.

In some further embodiments, the battery module may include a cell balancing circuit that uses an AC-to-AC power supply to provide audio frequency power for balancing battery cells of the battery module.

In some further embodiments, the AC-to-AC power supply provides an electrical output having an AC frequency greater than 5,000 Hz.

In some further embodiments, the AC-to-AC power supply provides an electrical power having an AC frequency greater than 5,000 Hz but less than 20,000 Hz.

In some further embodiments, the battery module may include an applied pressure sensing assembly for detecting the swelling of a battery cell of the battery module.

In some further embodiments, the battery module is further configured to allow water to flow through tubing that is configured to direct the water to predetermined locations within the battery rack.

In some further embodiments, the fire-suppression system configured to connect to a fire system of a building.

In some further embodiments, the battery module or the fire-suppression system is further configured to connect to a pipe configured to allow water to be pumped into the battery rack.

In some further embodiments, the sensor may be further configured to detect movement of a plate in contact with the battery module.

In some further embodiments, the sensor may include a metal band with at least one strain gauge attached to the metal band.

In some further embodiments, the sensor may be made of plastic and has at least one strain gauge attached to the plastic.

In some further embodiments, the sensor may include a flexible section having a circular or oval shape, and wherein a strain gauge is attached to the flexible section.

In some further embodiments, the battery module may further include a tray in contact with the battery module configured to direct water to a plate of the battery module.

In an embodiment, a battery module may include a sensor configured to detect movement of a plate in contact with the battery module, wherein the movement is caused by expansion of a battery cell within the battery module.

In some further embodiments, the sensor may include a load cell.

In some further embodiments, the sensor may include a metal band with at least one strain gauge attached to the metal band.

In some further embodiments, the sensor may be made of plastic and has at least one strain gauge attached to the plastic.

In some further embodiments, the sensor may include a flexible section having a circular or oval shape, and wherein a strain gauge is attached to the flexible section.

In another embodiment, an applied pressure assembly for a battery module, may includea spring for applying a force; a bolt in contact with the spring; a nut coupled to the bolt; and a metal bracket that transfers force from the spring to a pressure plate of a battery module.

In some further embodiments, the spring is one of a leaf spring and a die spring.

In some further embodiments, the applied pressure assembly may include a sensor that detects swelling of a battery cell of the battery module.

In an embodiment, a battery rack may be configured to house a battery module and to allow water to be sprayed onto a plurality of battery cells of the battery module from a fire-suppression system.

Those skilled in the relevant art(s) will readily appreciate that various adaptations and modifications of the exemplary embodiments described above can be achieved without departing from the scope and spirit of the present disclosure. Therefore, it is to be understood that, within the scope of the appended claims, the teachings of the disclosure may be practiced other than as specifically described herein.

What is claimed is:

1. A battery module, comprising:

a plurality of battery cells;

a pressure assembly, in contact with at least one of the plurality of battery cells, comprising:

a first plate and a second plate, at least one of the first plate and the second plate being configured to move due to swelling of the at least one of the plurality of battery cells; and a plurality of springs, in contact with the first plate and the second plate, configured to apply a force to the first plate and the second plate; and a sensor configured to detect the swelling of the at least one of the plurality of battery cells.

2. The battery module of claim 1, wherein the sensor comprises a first flexible section having one of a circular shape and an oval shape, and wherein a first strain gauge is attached to the first flexible section.

3. The battery module of claim 2, wherein the first flexible section comprises plastic.

4. The battery module of claim 2, wherein the sensor comprises a second flexible section, wherein a second strain gauge is attached to the second flexible section, and wherein the first strain gauge and the second strain gauge are electrically connected in series.

5. The battery module of claim 1, wherein the plurality of springs comprise one of die springs and leaf springs.

6. The battery module of claim 5, wherein the sensor comprises at least one leaf spring having a strain gauge attached to a surface of the leaf spring.

7. The battery module of claim 1, wherein the sensor is coupled to the first plate of the pressure assembly.

8. The battery module of claim 1, further comprising:

a battery management circuit board, coupled to the sensor, configured to receive an output from the sensor in response to the swelling of the at least one of the plurality of battery cells.

9. The battery module of claim 8, wherein the battery management circuit board is configured to generate a digital value for the output from the sensor.

10. The battery module of claim 1, wherein the pressure assembly further comprises a plate inhibitor configured to inhibit movement of a bottom portion of the first plate or the second plate while permitting movement of a top portion of the first plate or the second plate.

11. A battery module, comprising:

a plurality of battery cells;

a pressure assembly in contact with at least one of the plurality of battery cells, the pressure assembly comprising:

a first plate and a second plate, at least one of the first plate and the second plate comprising a first surface in contact with at least one of the plurality of battery cells, the first surface being configured to move due to swelling of the at least one of the plurality of battery cells; and a plurality of springs, in contact with the first plate and the second plate, configured to apply a force to the first plate and the second plate; and a sensor configured to detect the swelling of the at least one of the plurality of battery cells.

12. The battery module of claim 11, wherein the sensor is further configured to detect movement of the first surface due to the swelling of the at least one of the plurality of battery cells.

13. The battery module of claim 11, wherein the sensor comprises a first flexible section having one of a circular shape and an oval shape, and wherein a first strain gauge is attached to the first flexible section.

14. The battery module of claim 13, wherein the first flexible section comprises plastic.

15. The battery module of claim 13, wherein the sensor further comprises a second flexible section, wherein a second strain gauge is attached to the second flexible section, and wherein the first strain gauge and the second strain gauge are electrically connected in series.

16. The battery module of claim 11, wherein a movement of the first surface applies a force to a spring from among the plurality of springs.

17. The battery module of claim 16, wherein the spring comprises one of a die spring and a leaf spring.

18. The battery module of claim 17, wherein the sensor comprises another leaf spring.

19. The battery module of claim 11, further comprising:

a battery management circuit board, coupled to the sensor, configured to receive an output from the sensor in response to the swelling of the at least one of the plurality of battery cells.

20. The battery module of claim 19, wherein the battery management circuit board is further configured to generate a digital value for the output from the sensor.

* * * * *